United States Patent
Lee et al.

(10) Patent No.: US 9,986,283 B2
(45) Date of Patent: May 29, 2018

(54) DISPLAY DEVICE, METHOD OF PROVIDING PERSONALIZED OBJECT, AND METHOD OF PROVIDING INFORMATION

(71) Applicant: SAMSUNG ELECTRONICS CO., LTD., Suwon-si (KR)

(72) Inventors: Jae-young Lee, Hwaseong-si (KR); Mi-young Lee, Seoul (KR); Tae-ho Wang, Seoul (KR); Hyo-ri Park, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days. days.

(21) Appl. No.: 14/581,078

(22) Filed: Dec. 23, 2014

(65) Prior Publication Data
US 2015/0189368 A1    Jul. 2, 2015

(30) Foreign Application Priority Data

Dec. 27, 2013 (KR) .................. 10-2013-0165642
Sep. 26, 2014 (KR) .................. 10-2014-0129523

(51) Int. Cl.
*G06F 3/00* (2006.01)
*H04N 21/431* (2011.01)
(Continued)

(52) U.S. Cl.
CPC ..... *H04N 21/4316* (2013.01); *H04N 21/4223* (2013.01); *H04N 21/4331* (2013.01);
(Continued)

(58) Field of Classification Search
CPC ........... H04N 21/4725; H04N 21/4728; H04N 21/8586
See application file for complete search history.

(56) References Cited

U.S. PATENT DOCUMENTS

| 6,338,094 | B1 | 1/2002 | Scott et al. | |
| 2008/0226119 | A1* | 9/2008 | Candelore | G06F 17/30256 |
| | | | | 382/100 |

(Continued)

FOREIGN PATENT DOCUMENTS

| GB | 2258102 A | 1/1993 |
| KR | 1020110033629 A | 3/2011 |

(Continued)

OTHER PUBLICATIONS

Communication dated Feb. 23, 2015 issued by the European Patent Office in counterpart European Patent Application No. 14199220.6.
Communication dated Mar. 22, 2017, from the European Patent Office in counterpart European Application No. 14199220.6.

*Primary Examiner* — Gigi L Dubasky
(74) *Attorney, Agent, or Firm* — Sughrue Mion, PLLC

(57) ABSTRACT

A method and an apparatus of a display device for providing a personalized object are provided. The method including reproducing content, receiving an input from a first user selecting a first section of the content being reproduced, and generating a first personalized object corresponding to reproducing the selected first section, based on information about the selected first section, link information of the content, and information about an image corresponding to the content, is provided.

16 Claims, 44 Drawing Sheets

(51) Int. Cl.
*H04N 21/433* (2011.01)
*H04N 21/4223* (2011.01)
*H04N 21/4722* (2011.01)
*H04N 21/478* (2011.01)
*H04N 21/81* (2011.01)
*H04N 21/845* (2011.01)
*H04N 21/8545* (2011.01)
*H04N 21/858* (2011.01)

(52) U.S. Cl.
CPC ..... *H04N 21/4334* (2013.01); *H04N 21/4722* (2013.01); *H04N 21/47815* (2013.01); *H04N 21/8126* (2013.01); *H04N 21/8456* (2013.01); *H04N 21/8545* (2013.01); *H04N 21/8586* (2013.01)

(56) References Cited

U.S. PATENT DOCUMENTS

2010/0325668 A1* 12/2010 Young ................ G04G 15/006
 725/52
2014/0115096 A1* 4/2014 Burba ................ H04L 65/4084
 709/217

FOREIGN PATENT DOCUMENTS

| | | |
|---|---|---|
| KR | 1020130001717 A | 1/2013 |
| WO | 02082698 A2 | 10/2002 |
| WO | 02/102079 A1 | 12/2002 |
| WO | 2007/125474 A1 | 11/2007 |
| WO | WO 2007125474 A1 * | 11/2007 ........... G11B 27/034 |

* cited by examiner

FIG. 3
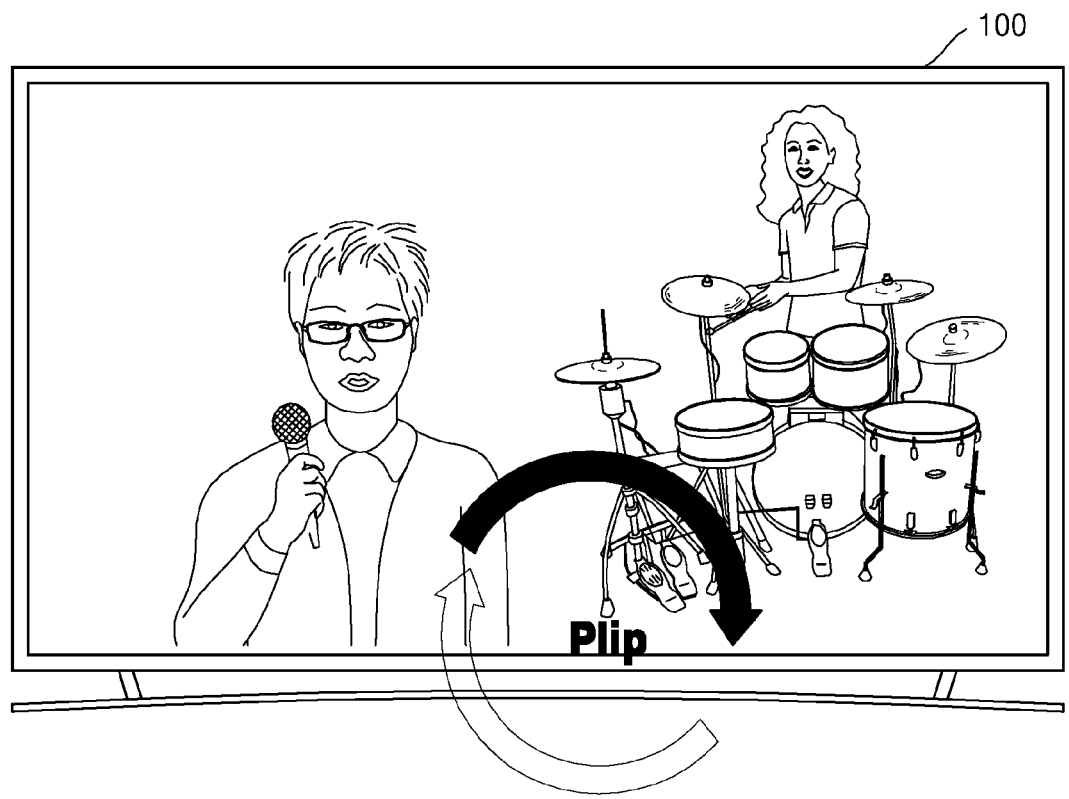
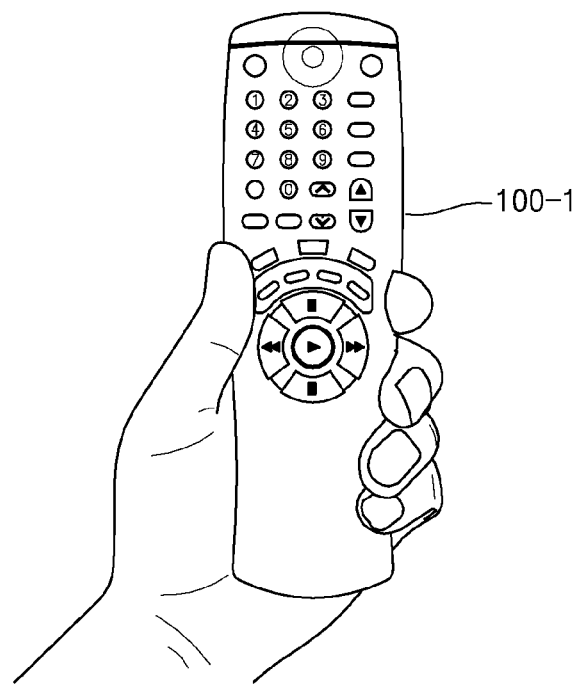

FIG. 15
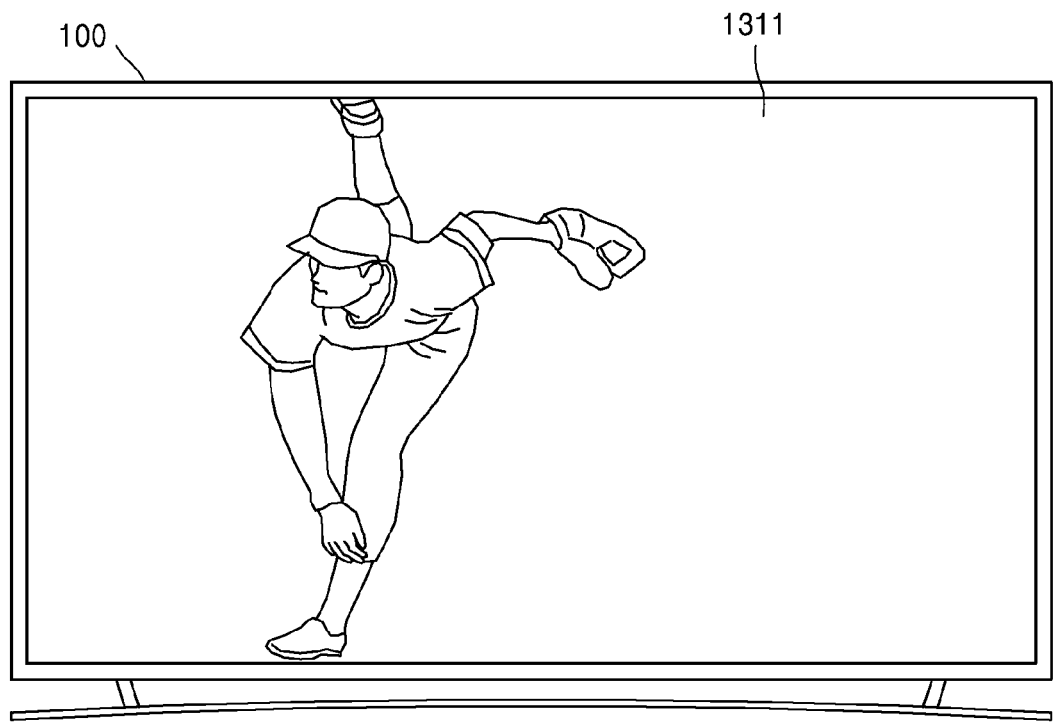
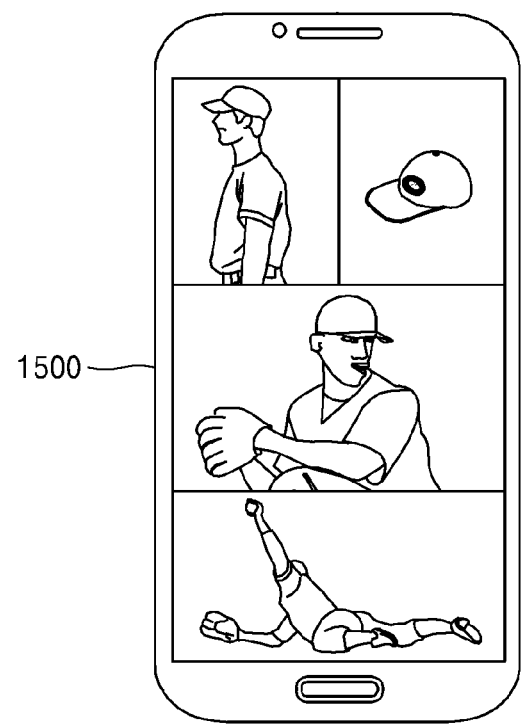

FIG. 36
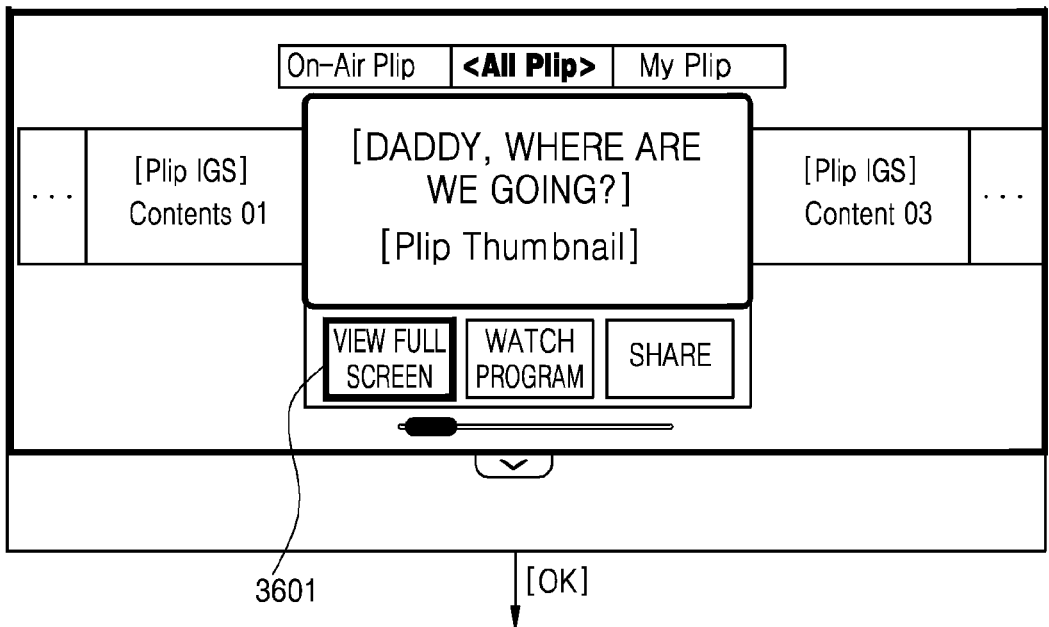
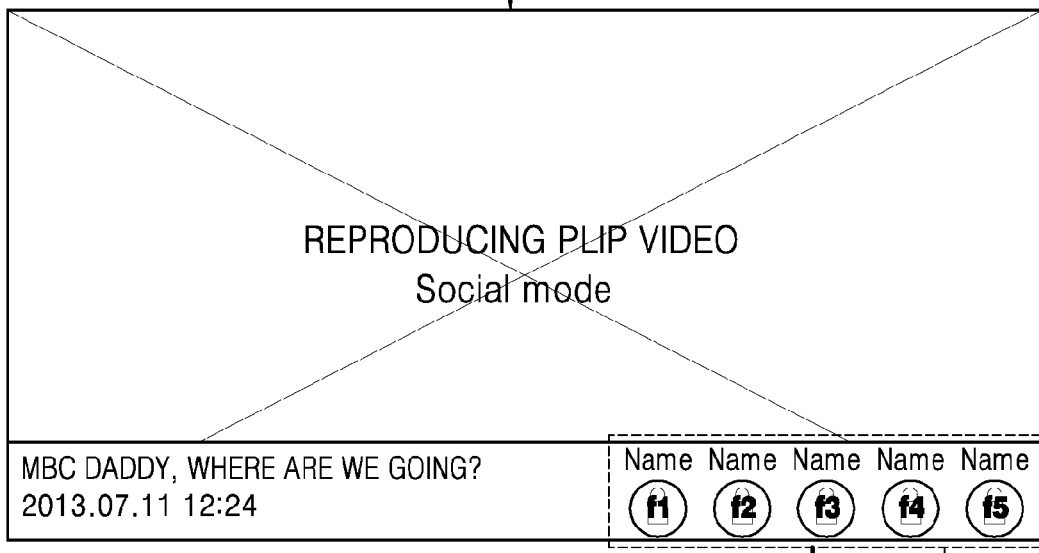
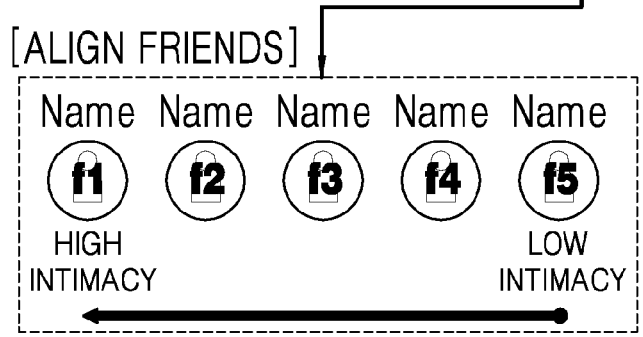

FIG. 41
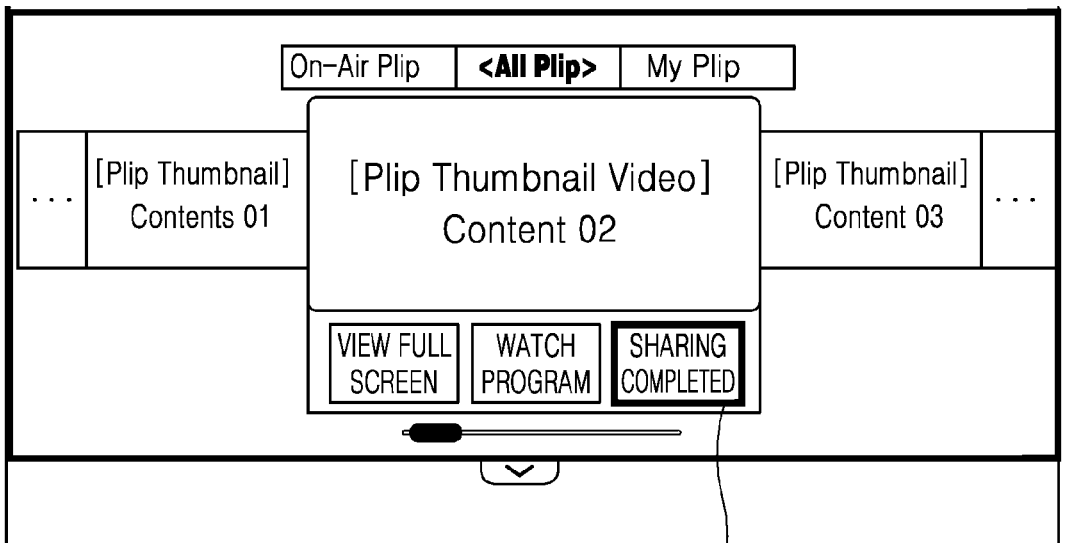
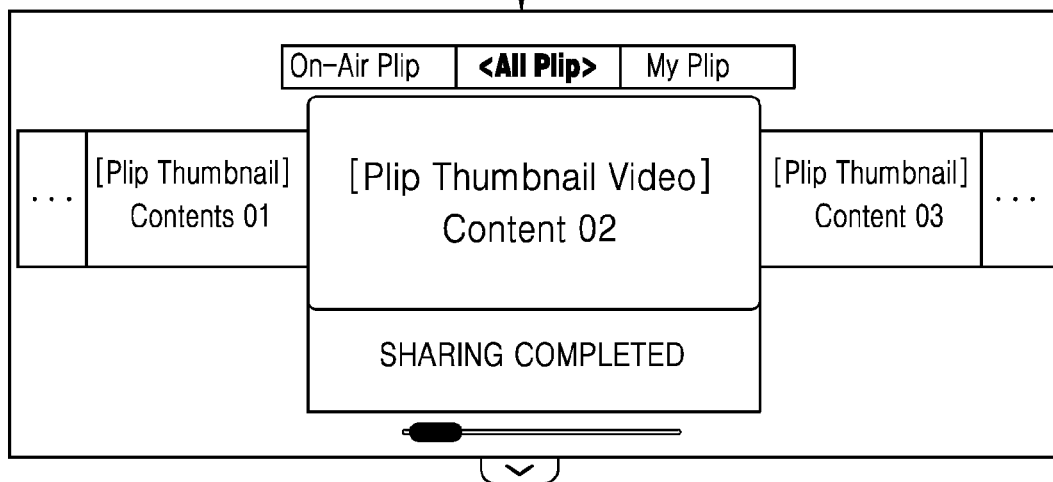

DISPLAY DEVICE, METHOD OF PROVIDING PERSONALIZED OBJECT, AND METHOD OF PROVIDING INFORMATION

CROSS-REFERENCE TO RELATED APPLICATIONS

This application claims priority from Korean Patent Application No. 10-2013-0165642, filed on Dec. 27, 2013, and Korean Patent Application No. 10-2014-0129523, filed on Sep. 26, 2014, in the Korean Intellectual Property Office, the disclosures of which are incorporated herein in their entirety by reference.

BACKGROUND

1. Field

Apparatuses and methods consistent with exemplary embodiments relate to a method of providing, by a display device, a personalized object, a method of providing, by a server, information about a personalized object, and a system for providing a personalized object.

2. Description of Related Art

A smart television (TV) is a multi-functional TV that enables a user to access various functions. For example, the user may use a smart TV for web surfing, watching video on demand (VOD), accessing a social network service (SNS), playing video games, and the like, because a smart TV is able to connect to the internet and also various applications related to such functions may be installed in the TV.

A popular feature of a smart TV is that the smart TV is interactive. For example, information may be exchanged between a user and the smart TV. Such a feature of the smart TV provides a significant advantage over a general TV that only unilaterally transmits information to a user without allowing user interactivity. Thus, the smart TV is also referred to as an interactive TV.

SUMMARY

Exemplary embodiments overcome the above disadvantages and other disadvantages not described above. Also, an exemplary embodiment is not required to overcome the disadvantages described above, and an exemplary embodiment may not overcome any of the problems described above.

According to an aspect of an exemplary embodiment, there is provided a method of a display device for providing a personalized object, which is performed by a display device that generates and provides a personalized object about a partial section (for example, a section of interest of a user) of content reproduced by the display device based on a user input, and a method of providing information, which is performed by a server.

Additional aspects are set forth in part in the description which follows and, in part, will be apparent from the description, or may be learned by practice of one or more of the exemplary embodiments.

According to an aspect of an exemplary embodiment, there is provided a method of a display device providing a personalized object, the method including reproducing content, receiving an input from a first user selecting a first section of the content being reproduced, and generating a first personalized object of the first user corresponding to the first section of the content, based on the information about the first section of the content, the information about the image of the content, and the link information of the content.

The information about the selected first section may include at least one of information about a frame included in the selected first section, time information defining the selected first section, and additional information related to the selected first section.

The receiving of the input from the first user may include receiving an input from the first user selecting the first section comprising a first frame that is displayed at a point in time at which the input from the first user is received, a number of second frames that are displayed before the first frame, and a number of third frames displayed after the first frame.

The method of claim 1, wherein the generating of the first personalized object comprises extracting at least one of the information about the selected first section, the link information of the content, and the information about the image, from attribute information of the content.

The method may further include obtaining identification (ID) information of the first user, and mapping and storing the ID information of the first user and the first personalized object.

The method may further include transmitting the first personalized object to a server that is connected to the display device.

The method may further include receiving a recommended item related to the first personalized object from the server, and mapping and storing the first personalized object and the received recommended item.

The method may further include receiving, from a server, a second personalized object generated by a display device of a second user connected to the first user, and displaying a notification window indicating that the second personalized object is received.

The method may further include displaying a panel comprising a plurality of personalized objects, receiving an input for selecting the first personalized object from among the plurality of personalized objects included in the panel, and reproducing the selected first section based on the input for selecting the first personalized object.

The displaying of the panel may include displaying an indicator indicating an existence of the panel on a partial region of a screen, and calling and displaying the panel on the screen based on an input for displaying the panel.

The panel may include at least one of a first tab providing a list of personalized objects related to a broadcast program being reproduced in the display device, a second tab providing a list of personalized objects generated by the first user, and a third tab providing a list of personalized objects generated by the second user connected to the first user.

The displaying of the panel may include displaying thumbnail images on the panel that respectively correspond to the plurality of personalized objects.

The reproducing of the selected first section may include, in response to a pointer being positioned on a thumbnail image of the first personalized object from among the thumbnail images, reproducing the selected first section in a region in which the thumbnail image of the first personalized object is displayed.

The reproducing of the selected first section may include extracting a recommended item corresponding to the first personalized object, and displaying the extracted recommended item on the panel.

The method may further include receiving information about a second user that generated a second personalized object corresponding to a second section that entirely or partially overlaps the selected first section of the content, and displaying the information about the second user.

According to an aspect of an exemplary embodiment, there is provided a method of a display device for providing a personalized object, the method including displaying an indicator indicating an existence of a panel comprising a plurality of personalized objects on a screen at a pre-set point of time, each personalized object corresponding to a section of content, receiving an input from a first user for displaying the panel, calling the panel based on the input from the first user, and displaying the called panel on the screen.

The pre-set point of time may include at least one of a point in time at which power is supplied to the display device, a point in time at which a zapping input is received from the first user, and a point of time at which commercial content is reproduced.

The displaying of the indicator may include measuring an inattentive time of the first user regarding content being reproduced on the screen, using a camera, and in response to the measured inattentive time exceeding a threshold time, displaying the indicator on the screen.

The displaying of the indicator may include, in response to at least one new personalized object being added to the panel, displaying, in the indicator, the number of personalized objects added to the panel.

The panel may include at least one of a first tab providing a list of personalized objects related to a broadcast program being reproduced in the display device, a second tab providing a list of personalized objects generated by the first user, and a third tab providing a list of personalized objects generated by a second user connected to the first user.

The displaying of the called panel may include displaying thumbnail images that respectively correspond to the plurality of personalized objects on the panel.

The method may further include, in response to a pointer being positioned on a thumbnail image of the first personalized object from among the thumbnail images, reproducing a first section of content corresponding to the first personalized object.

The reproducing of the first section may include reproducing the first section of the content at a region in which the thumbnail image of the first personalized object is displayed or on an entire region of the screen.

The method may further include calling and displaying a broadcast screen providing content related to the first personalized object or a purchase screen of content related to the first personalized object, according to a request of the first user.

The method may further include receiving a share request regarding the first personalized object, and providing the first personalized object to a display device of a second user connected to the first user, in response to the share request.

According to an aspect of one or more exemplary embodiments, there is provided a display device including an output unit configured to reproduce content, a user input unit configured to receive an input from a first user for selecting a first section of the content being reproduced, and a controller configured to generate a first personalized object for reproducing the selected first section, based on information about the selected first section, link information of the content, and information about an image corresponding to the content.

According to an aspect of another exemplary embodiment, there is provided a display device including a display configured to display an indicator indicating a existence of a panel comprising a plurality of personalized objects at a pre-set point of time, a user input unit configured to receive an input from a first user for requesting of the panel, and a controller configured to call the panel according to the input from the first user and control the display unit to display the called panel.

According to an aspect of another exemplary embodiment, there is provided a non-transitory computer-readable medium having recorded thereon a program that is executable by a computer to perform the method described herein.

According to an aspect of another exemplary embodiment, there is provided a method of a server for providing information, the method including receiving a first personalized object for reproducing a first section of content, from a first display device of a first user, receiving a second personalized object for reproducing a second section of the content, from a second display device of a second user, determining whether the first section and the second section overlap each other, and transmitting information about the first user to the second display device and information about the second user to the first display device based on the determination.

The information about the first user includes at least one of identification (ID) information of the first user, information about a point in time in which the first personalized object is generated, and information about the number of personalized objects generated in the first display device with respect to the content, and the information about the second user comprises at least one of ID information of the second user, information about a point in time at which the second personalized object is generated, and information about the number of personalized objects generated in the second display device with respect to the content.

The content may include content that is being simultaneously reproduced by the first display device and the second display device.

According to an aspect of another exemplary embodiment, there is provided a method of a server for providing information, the method including receiving a first personalized object for reproducing a first section of content from a first display device of a first user, receiving a second personalized object for reproducing a second section of the content from a second display device of a second user, analyzing a relationship between the first user and the second user, generating a combined object by combining the first personalized object and the second personalized object, based on a result of the analyzing, and transmitting the combined object to at least one of the first display device and the second display device.

The content may include content that is being simultaneously reproduced by the first display device and the second display device.

The analyzing may include determining whether identification (ID) information of the first user and ID information of the second user are connected to each other.

The first personalized object may include information about the first section of the content, information about an image corresponding to the first section of the content, and link information of the content, and the second personalized object may include information about the second section of the content, information about an image corresponding to the second section of the content, and the link information of the content.

According to an aspect of another exemplary embodiment, there is provided a method of a server for providing information, the method including receiving a plurality of first personalized objects corresponding to a first section of content being reproduced by a plurality of display devices and a plurality of second personalized objects corresponding to a second section of the content, from each of the plurality of display devices, in response to a number of the plurality of first personalized objects and the number of the plurality of second personalized objects each exceeding a pre-set number, generating a highlighted object for reproducing both the first section and the second section, and providing the generated highlighted object to at least one of the plurality of display devices

BRIEF DESCRIPTION OF THE DRAWINGS

These and/or other aspects will become apparent and more readily appreciated from the following description of the exemplary embodiments, taken in conjunction with the accompanying drawings in which:

FIG. 3 is a diagram illustrating a user input for generating a personalized object, according to an exemplary embodiment;

FIG. 15 is a diagram illustrating an example of displaying, by an external device connected to a display device, a recommended item, according to an exemplary embodiment;

FIG. 36 is a diagram illustrating an example of reproducing, by a display device, a personalized object video on a full screen, according to an exemplary embodiment;

FIG. 41 is a diagram illustrating an example of sharing, by a display device, a personalized object selected by a user with an external display device, according to an exemplary embodiment;

DETAILED DESCRIPTION

Figure 1:
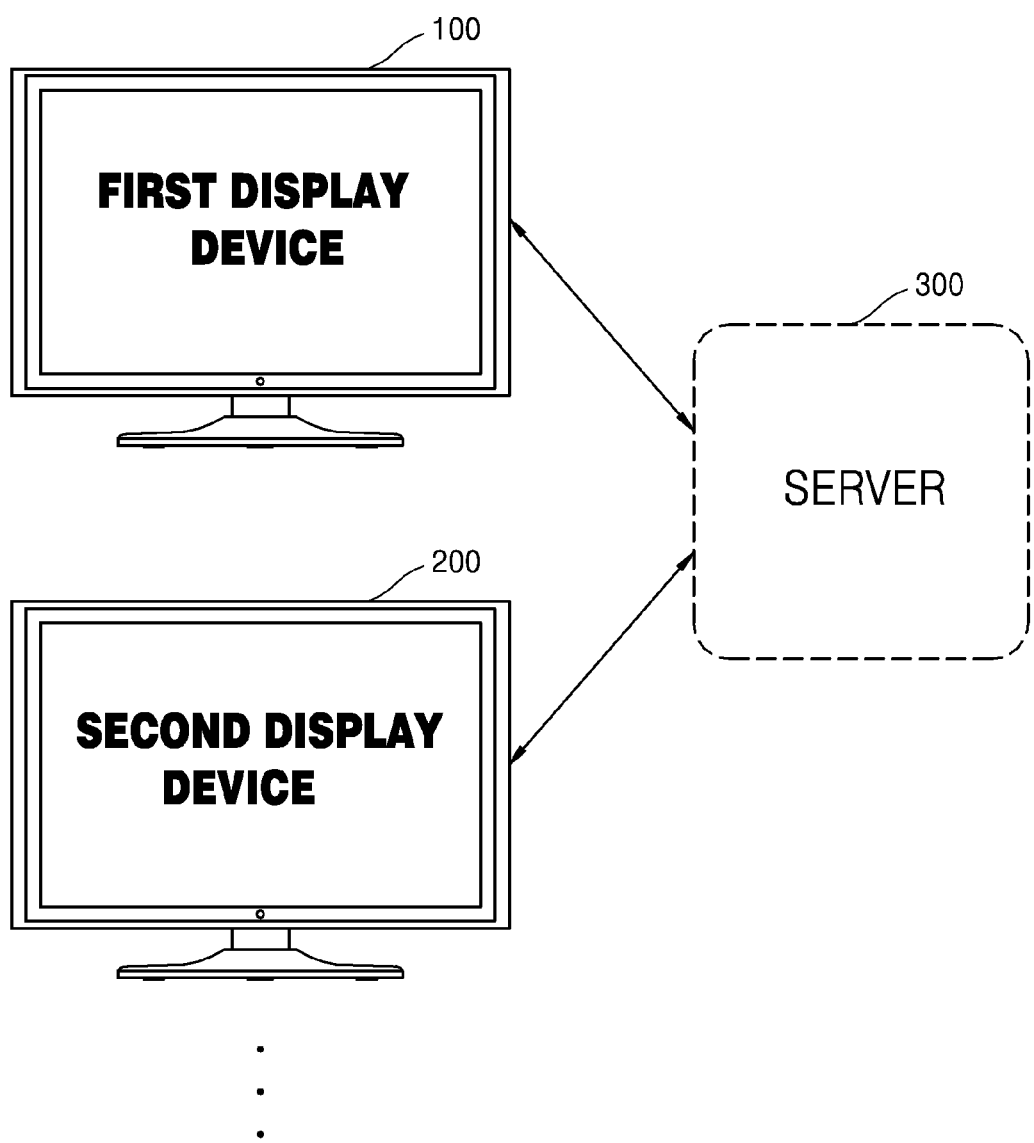
FIG. 1 is a diagram illustrating a system for providing a personalized object, according to an exemplary embodiment.

Terms used herein will now be briefly described, and one or more exemplary embodiments will be described in detail. Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

Terms including descriptive or technical terms which are used herein should be construed as having meanings that are obvious to one of ordinary skill in the art. However, the terms may have different meanings according to an intention of one of ordinary skill in the art, precedent cases, or the appearance of new technologies. Also, some terms may be arbitrarily selected by the applicant, and in this case, the meaning of the selected terms will be described in detail in the detailed description. Thus, the terms herein may be defined based on the meaning of the terms together with the description throughout the specification.

Also, when a part "includes" or "comprises" an element, unless there is a particular description contrary thereto, the part can further include other elements, and should not be considered as excluding other elements. In the following description, terms such as "unit" and "module" indicate a unit for processing at least one function or operation, wherein a unit and a block may be embodied as hardware or software or embodied by combining hardware and software.

Throughout the specification, for example, the term "first screen" may be a screen initially displayed on a display device when the display device is turned on, when the display device is unlocked, or when an operation mode of the display device switches from a standby mode to an active mode. According to one or more exemplary embodiments, the first screen may be a home screen, a menu screen, or a background screen of the display device, but is not limited thereto. According to one or more exemplary embodiments, the first screen may be a gateway for providing, by the display device, a certain service. For example, the display device may provide a recommended service through the first screen.

One or more exemplary embodiments will now be described more fully with reference to the accompanying drawings. However, the one or more embodiments may be embodied in many different forms, and should not be construed as being limited to the embodiments set forth herein; rather, these embodiments are provided so that this disclosure will be thorough and complete, and will fully convey the concept of the one or more embodiments to those of ordinary skill in the art. In the following description, well-known functions or constructions are not described in detail because they would obscure the one or more embodiments with unnecessary detail, and like reference numerals in the drawings denote like or similar elements throughout the specification.

As used herein, the term "and/or" includes any and all combinations of one or more of the associated listed items. Expressions such as "at least one of," when preceding a list of elements, modify the entire list of elements and do not modify the individual elements of the list.

FIG. 1 is a diagram of a system for providing a personalized object, according to an exemplary embodiment.

As shown in FIG. 1, the system may include at least one display device, for example, a first display device 100 and a second display device 200, and also includes a server 300. However, not all components shown in FIG. 1 are essential. For example, the system may include only the first display device 100, or may include the first display device 100 and the server 300.

The first display device 100 may be any type of display device including a display panel. For example, the display device may be a smart television (TV), an internet protocol TV (IPTV), a digital TV (DTV), a computer, a digital broadcasting terminal, a mobile phone, a tablet, a consumer electronics (CE) device (for example, a refrigerator or air conditioner including a display panel), and the like, but is not limited thereto. The first display device 100 described herein may also be a wearable device. For example, the first display device 100 according to an exemplary embodiment may be a wrist watch, glasses, a bracelet, a necklace, and the like.

The first display device 100 may reproduce various types of contents. For example, the first display device 100 may reproduce video contents, such as TV programs, video on demands (VODs), personal videos, for example, user-created contents (UCC), music videos, YouTube videos, still image contents, such as pictures and drawings, text contents, such as electronic books (poems and novels), letters, business files, web pages, music contents, such as music, musical programs, and radio broadcasts, applications, such as widgets, games, video calls, and the like.

According to an exemplary embodiment, the first display device 100 may generate a personalized object regarding a partial section of content in which a user is interested. Herein, the term 'personalized object' may denote a user interface (UI) for using a service of a service provider. For example, a personalized object may include a UI for reproducing a partial section of content. The personalized object may include an icon, a text, an image, link information such as a uniform resource locator (URL), information about the partial section, and the like. Here, information included in the personalized object may be in the form of metadata. For convenience of description, the personalized object may also be referred to as a 'plip' of personalized content, and the like.

According to an exemplary embodiment, the first display device 100 may communicate with the server 300 via a network. According to an exemplary embodiment, the network may be implemented via a wireless communication technology, for example, a wireless fidelity (Wi-Fi), home radio frequency (RF), Bluetooth, high-rate wireless personal area network (HR WPAN), ultra wideband (UWB), low-rate wireless personal area network (LR WPAN), IEEE 1394, and the like.

For example, the first display device 100 may transmit a personalized object of the user to the server 300, or may receive recommendation information from the server 300 that is recommended based on the personalized object.

According to an exemplary embodiment, the first display device 100 may receive an input from the user through a remote controller. According to an exemplary embodiment, the remote controller may be implemented in any form. For example, the remote controller may be a display device-exclusive remote controller, a smart phone, a tablet personal computer (PC), and the like.

According to an exemplary embodiment, the first display device 100 may receive a voice input from the user through a microphone. Also, the first display device 100 may receive a touch input from the user through a touch pad. Examples of the touch input include a tap, a touch and hold, a double tap, a drag, panning, a flick, a drag and drop operation, and the like.

The second display device 200 may be a display device of a second user connected to a first user of the first display device 100. According to an exemplary embodiment, the first and the second users may be connected to each other via a social media. Social media enables users who subscribed to a social networking service (SNS), such as Twitter™, Facebook™, and the like, to share information and opinions while expanding personal relationships.

For convenience of description herein, a relationship between the first and second users who are connected to each other via social media are referred to as 'social friends'. Also, a mode for providing information about a social friend to the first and second display devices 100 and 200 may be referred to as a 'social mode'. When the first user has at least two social friends, there is a plurality of the second display devices 200.

The second display device 200 may reproduce various types of contents. Also, the second display device 200 may generate a personalized object based on a partial section of content in which the second user is interested in. Also, the second display device 200 may communicate with the server 300 via a network.

The server 300 may communicate with the first display device 100 and the second display device 200. For example, the server 300 may receive account information from the first and/or second display devices 100 200. Here, the server 300 may authenticate the received account information to recognize the first or second user of the first or second display devices 100 or 200. It should also be appreciated that the server may authenticate received account information to recognize the first user of the first display device 100 and the second user of the second display device 200

The server 300 may receive a personalized object from the first or second display device 100 or 200. The server 300 may map and manage a personalized object and account information of a user.

The server 300 may receive a request for a recommended item from at least one of the first or second display device 100 or 200, and select a recommended item based on a personalized object. For example, a recommended item may be content, an application, a service, and the like. The content may be a still image, a video, a text, a web page, and the like, but is not limited thereto.

According to an exemplary embodiment, the application may be a group or a series of computer programs designed to execute a certain operation. Also, the application described herein may be various. Examples of the application include a game application, a musical instrument playing application, a video reproducing application, a map application, a broadcasting application, an exercise supporting application, a payment application, and the like, but are not limited thereto.

According to an exemplary embodiment, the service may be, for example, a service provided via an application, a service provided via a widget, a service provided via an application processor (AP), and the like. For example, the service according to an exemplary embodiment may be SNS, a financial payment service, a search service, and the like, but is not limited thereto.

In some examples, the server 300 may include an intelligence engine, and may analyze a personalized object received from each of the first and second display devices 100 and 200 via the intelligence engine. For example, the server 300 may analyze a personalized object to infer interests of a user of the respective devices.

Hereinafter, a method of providing, by the first display device 100, a personalized object corresponding to a partial section of content, described with reference to FIG. 2.

Figure 2:
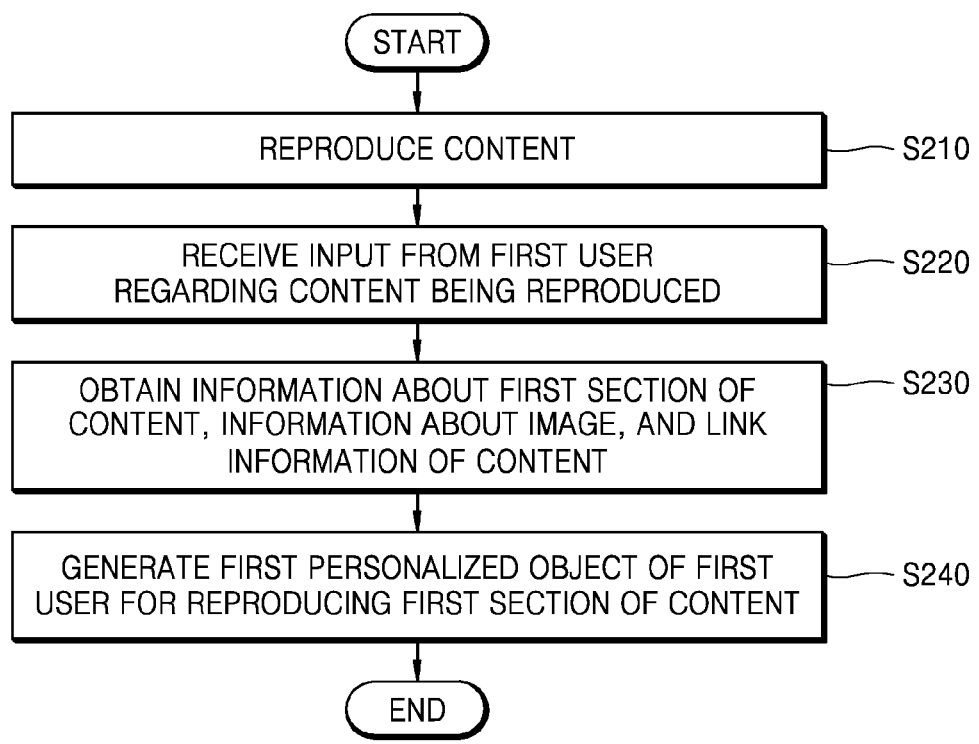
FIG. 2 is a flowchart illustrating a method for providing a personalized object, according to an exemplary embodiment.

FIG. 2 is a flowchart illustrating a method of providing a personalized object, according to an exemplary embodiment.

Referring to FIG. 2, in operation S210, the first display device 100 may reproduce content.

The content described herein may include multimedia content. For example, the content reproduced by the first display device 100 may be education content, movie content, or game content, but is not limited thereto. Alternatively, the content reproduced by the first display device 100 may be real-time broadcasting content or recorded content, such as video-on-demand (VOD) content.

In operation S220, the first display device 100 may receive an input from the first user regarding the content being reproduced.

The input from the first user may be an input for generating a personalized object regarding a partial section (for example, a section of interest of the first user) of the content currently being reproduced. The input from the first user may be various, for example, the input may be a key input, a touch input, a motion input, a bending input, a speech input, a multi-input, and the like, and for convenience of description, it may be assumed that the input is a key input or a touch input.

The first display device 100 may receive an input from the first user for selecting a pre-set button. For example, the pre-set button may be a physical button provided in the first display device 100, a virtual button in a form of graphical user interface (GUI), or a button provided in a remote controller, but is not limited thereto.

For example, the first user may select a button, for example, a personalized clip button, hereinafter, referred to as a ("plip") button provided in the remote controller to request the first display device 100 to generate a personalized object.

According to another exemplary embodiment, the first display device 100 may display, on a screen, a UI object such as a plip icon corresponding to a request to generate a personalized object. The first display device 100 may receive a selection input from the first user regarding the UI object (for example, the plip icon). The first user may select the plip icon by touching the UI object displayed on the first display device 100, or select the plip icon by adjusting a direction key of the remote controller.

For convenience of description, an input for selecting a plip button or a plip icon so as to generate a personalized object will be referred to as a plip input.

In operation S230, the first display device 100 may obtain information about a first section of the content, which corresponds to, for example, a point of time when the input from the first user is received, information about an image corresponding to the point of time when the input from the first user is received, and link information of the content.

According to an exemplary embodiment, the first section corresponding to the point of time when the input from the first user is received may be a section which starts at a certain point of time and ends at another certain point of time such as from −n seconds to +n seconds based on the point of time such as 0 seconds from which the input from the first user is received, but is not limited thereto. For example, the first section may be a section which starts at the point of time when the input is received and ends at a certain point of time (for example, from 0 seconds to +n seconds) or a section which starts at a certain point of time and ends at the point of time when the input is received (for example, from −n seconds to 0 seconds).

According to an exemplary embodiment, a length of the first section may be pre-set by the first display device 100, the first user, or the server 300. As a mere non-limiting example, the length of the first section may be pre-set to 1 minute and 30 seconds, pre-set to 3,000 frames, and the like.

According to an exemplary embodiment, when the input from the first user such as a plip input is received, the first display device 100 may determine the first section by selecting a first frame displayed at the point of time when the input from the first user is received, a certain number of second frames displayed before the first frame, and a certain number of third frames displayed after the first frame.

According to an exemplary embodiment, the information about the first section may include information about at least one frame included in the first section, time information defining the first section (for example, a timestamp), additional information related to the first section, and the like, but is not limited thereto.

Here, the additional information related to the first section may include at least one of information about an artist, information about an album, information about an article, information about a place, information about a person in the first section, information about an application, and the like, but is not limited thereto.

According to an exemplary embodiment, the first display device 100 may extract the information about the first section from attribute information of the content. The attribute information of the content may include information about attributes of the content, and may be in a form of metadata. The first display device 100 may receive the attribute information of the content from a content provider, together with the content. For example, the first display device 100 may receive, as attribute information of music video content, a music video title, a group, a genre, an artist, capacity, a stored date and time, a content provider, a category, an application for executing a music video, an article, a person in a partial section of a music video, and the like, together with the music video content.

The image corresponding to the point of time when the input from the first user is received may include at least one of an image displayed on the first display device 100 at a point of time in which the input from the first user is received, a thumbnail image generated by the first display device 100, and a representative image of the content, but is not limited thereto.

For example, when a plip input is received from the first user while the content is being reproduced, the first display device 100 may obtain the information about the image displayed on the first display device 100 (for example, link information of the image) from the attribute information (in the form of metadata) of the content. Alternatively, the first display device 100 may extract the information about the representative image of the content from the attribute information of the content.

Meanwhile, when the plip input is received from the first user while the content is being reproduced, the first display device 100 may generate a thumbnail image by capturing the image displayed on the first display device 100.

The link information of the content may include information for accessing the content, and may be, for example, a URL, a uniform resource name (URN), a uniform resource identifier (URI), and the like. According to an exemplary embodiment, the first display device 100 may extract the link information of the content from the attribute information of the content.

In operation S240, the first display device 100 may generate a first personalized object of the first user for reproducing the first section of the content. The first display device 100 may generate the first personalized object using the information about the first section corresponding to the point of time at which the input from the first user is received, the information about the image corresponding to the point of time at which the input from the first user is received, and the link information of the content.

For example, the first display device 100 may generate the first personalized object that includes the information about the first section, the information about the image, and the link information of the content in forms of metadata.

According to an exemplary embodiment, the first display device 100 may generate the first personalized object that further includes generator information (for example, an identifier of the first user), generated date information, reproduction time information of the first section, and the like.

According to an exemplary embodiment, the first display device 100 may obtain identification (ID) information of the first user. For example, the first display device 100 may receive the ID information of the first user directly from the first user. For example, the ID information of the first user may be an account of the first user, an intrinsic ID of the first user, a name of the first user, a nickname of the first user, a mobile number of the first user, bio-data of the first user (for example, a fingerprint or an iris), but is not limited thereto. According to an exemplary embodiment, the first display device 100 may identify the first user by recognizing a subject via an image sensor.

According to an exemplary embodiment, the first display device 100 may map and store the ID information of the first user and the first personalized object. Accordingly, even if multiple users such as family members use the first display device 100 together, the first display device 100 may generate and manage personalized objects according to the family members.

According to an exemplary embodiment, the first display device 100 may store and manage the first personalized object in an internal memory. According to another exemplary embodiment, the first display device 100 may transmit the first personalized object to the server 300 connected to the first display device 100. In this example, the first display device 100 may transmit the ID information of the first user who generated the first personalized object to the server 300, together with the first personalized object. In response, the server 300 may map and manage the first personalized object and the ID information of the first user.

According to an exemplary embodiment, the first display device 100 may continuously receive at least two plip inputs from the first user while the content is being reproduced. For example, the first display device 100 may receive a first plip input and a second plip input from the first user at a short interval such as at a one second interval. Here, a first section (for example, from 1 min. 10 sec. to 3 min. 10 sec.) corresponding to the first plip input and a second section (for example, from 1 min. 11 sec. to 3 min. 11 sec.) corresponding to the second plip input may mostly overlap each other. Accordingly, the first display device 100 may generate the first personalized object corresponding to a section obtained by adding the first and second sections (for example, from 1 min. 10 sec. to 3 min. 11 sec.).

According to an exemplary embodiment, the first display device 100 may generate a personalized object regarding a partial section of content in which the first user is interested in such that the first user may easily record or clip a section of interest while the content is being reproduced.

FIG. 3 is a diagram illustrating a user input for generating a personalized object, according to an exemplary embodiment.

As shown in FIG. 3, the first display device 100 may reproduce a performance video of a certain singer. Here, when the first user wants to record a scene while viewing the performance video, the first user may request the first display device 100 to generate a personalized object using a remote controller 100-1. For example, the first user may select a 'plip button' provided in the remote controller 100-1 or may select a 'plip icon' displayed on the first display device 100 by adjusting a direction key of the remote controller 100-1.

Figure 4:
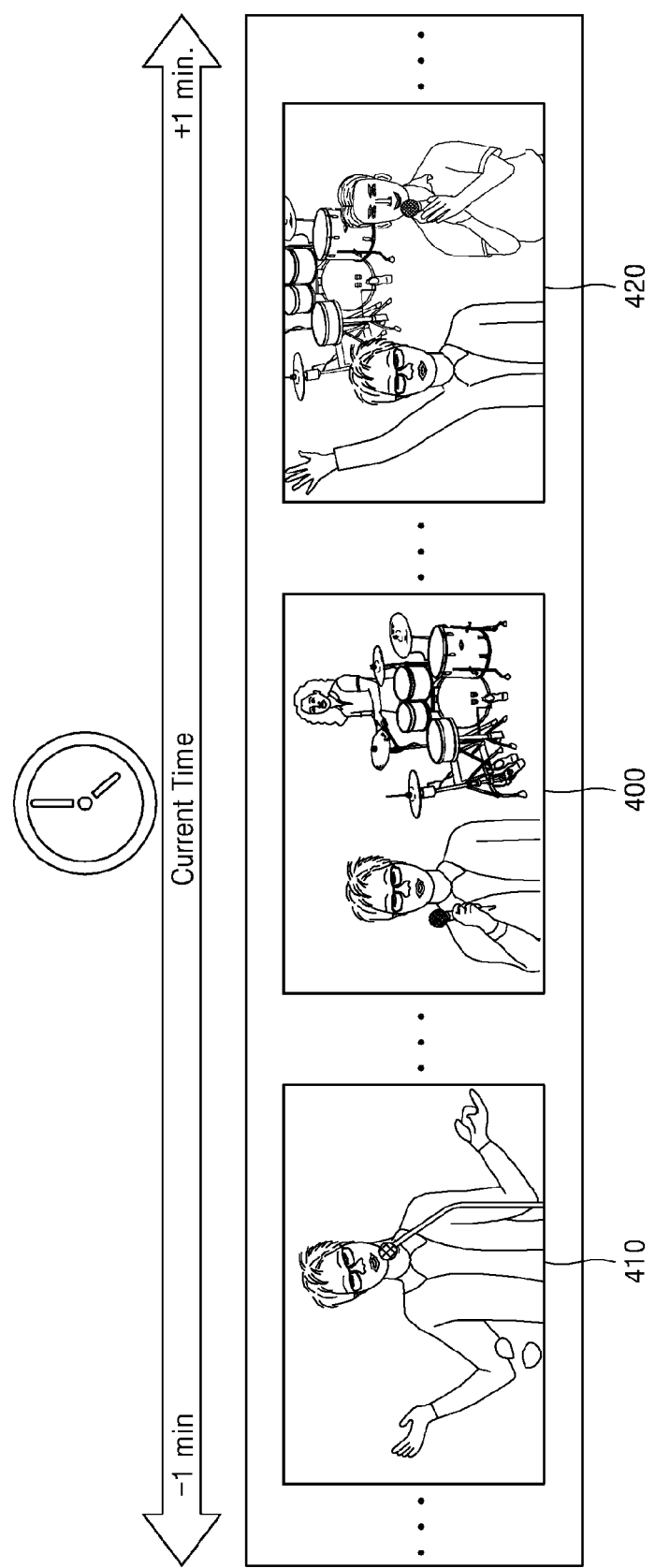
FIG. 4 is a diagram illustrating an operation of selecting a partial section of content being reproduced, according to an exemplary embodiment.

FIG. 4 is a diagram illustrating an operation of selecting a partial section of content being reproduced, according to an exemplary embodiment.

As shown in FIG. 4, when a plip input is received from the first user while the content is being reproduced, the first display device 100 may select frames including a first frame 400 displayed on a screen at a point of time when the plip input is received.

For example, the first display device 100 may select a section (from −1 min. to +1 min.) including frames that exist between a second frame 410 displayed 1 minute before the first frame 300 and a third frame 420 that is to be displayed 1 minute after the first frame 400, as a section corresponding to the plip input.

According to an exemplary embodiment, the first display device 100 not only selects a frame displayed on the screen at a point of time when a plip input from the first user is received, but also selects a partial section such that a time taken for the first user to find an interested scene and select a plip button may be compensated for.

Figure 5:
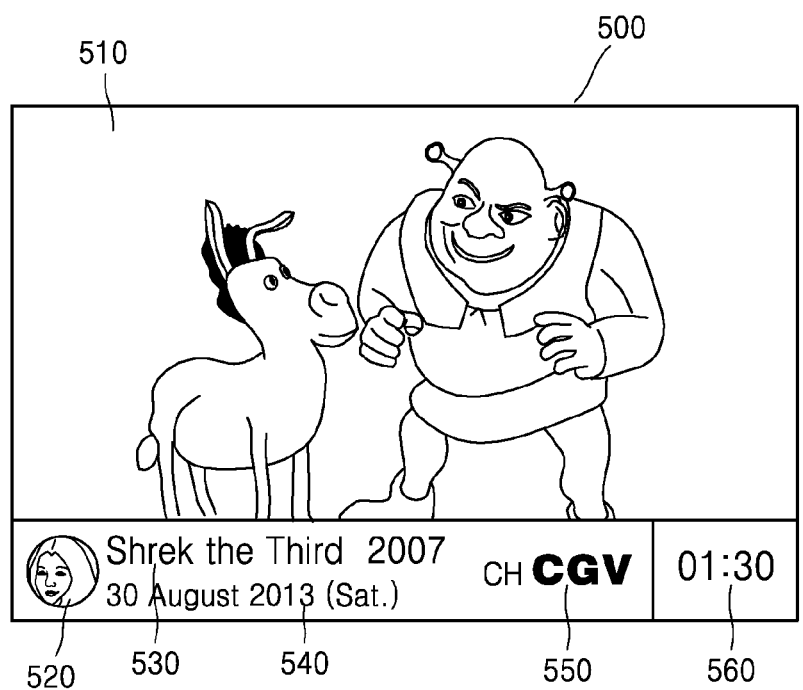
FIG. 5 is a diagram of a personalized object according to an exemplary embodiment.

FIG. 5 is a diagram of a personalized object 500 according to an exemplary embodiment.

As shown in FIG. 5, the first display device 100 may display the personalized object 500 corresponding to a partial section of movie content. According to an exemplary embodiment, the personalized object 500 may include a thumbnail image 510, generator information 520 (for example, a generator image or a generator account), additional information 530 (for example, a movie title or a movie release year), generation information 540 (for example, a generated date), content provider information 550, and reproduction time information 560 (for example, 1 min. 30 sec.) of the personalized object 500, but is not limited thereto. According to an exemplary embodiment, the first display device 100 may reproduce the partial section of the movie content, which corresponds to the personalized object 500, on a region where the thumbnail image 510 is displayed.

Figure 6:
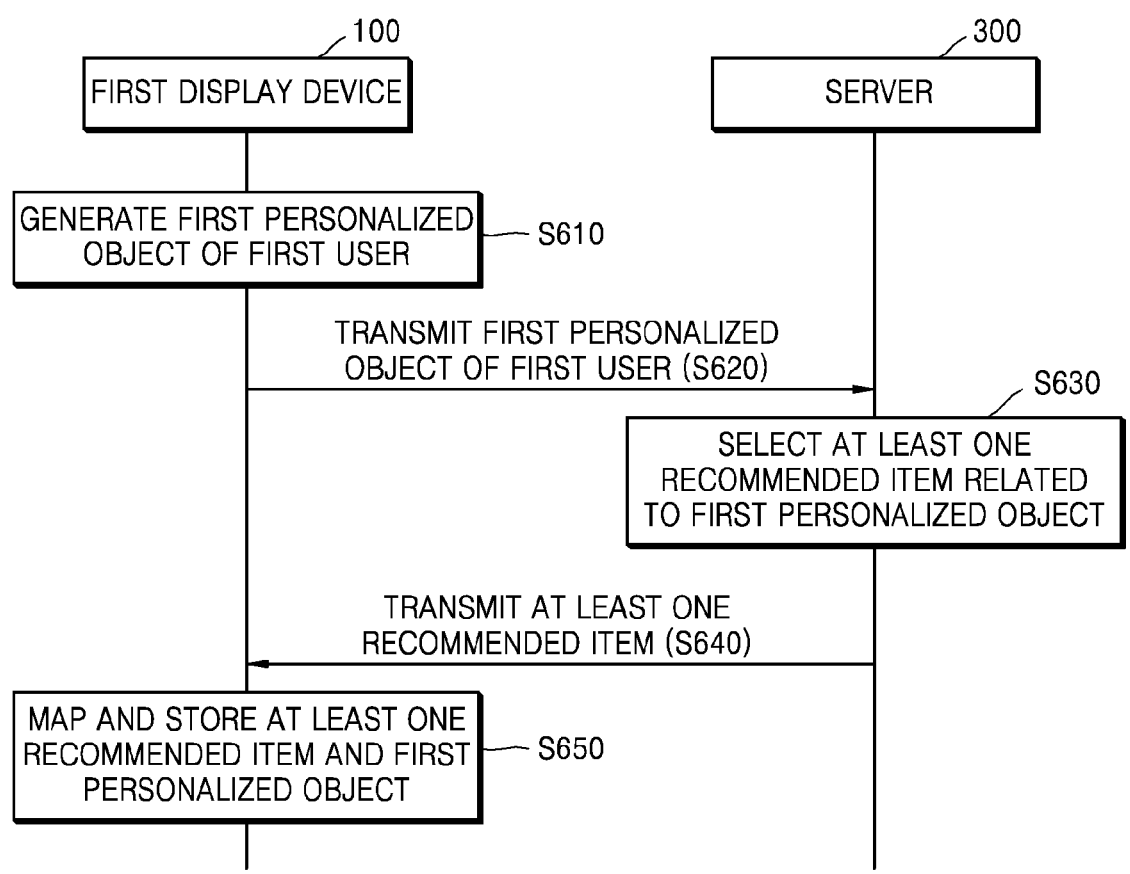
FIG. 6 is a flowchart illustrating a method of mapping and storing a personalized object and a recommended item, according to an exemplary embodiment.

FIG. 6 is a flowchart illustrating a method of mapping and storing a personalized object and a recommended item, according to an exemplary embodiment.

Referring to FIG. 6, in operation S610, the first display device 100 may generate a first personalized object of a first user. The first personalized object may include information about a partial section of content being reproduced by the first display device 100 and link information of the content, in the form of metadata. Because operation S610 corresponds to operations S210 through S240 of FIG. 2, details thereof are not provided.

In operation S620, the first display device 100 may transmit the first personalized object of the first user to the server 300 connected to the first display device 100.

According to an exemplary embodiment, the first display device 100 may transmit ID information of the first user (for example, account information) to the server 300, together with the first personalized object.

According to another exemplary embodiment, the first display device 100 may transmit context information to the server 300. The context information may include at least one of surrounding information of the first display device 100 (for example, information about weather, a temperature, or humidity), state information of the first display device 100 (for example, channel information, viewing program information, a date, a time, a location, a network connection state, hardware information, or software information), and state information of the first user (for example, a mood or movement), but is not limited thereto.

In operation S630, the server 300 may select at least one recommended item related to the first personalized object. A recommended item may include at least one of recommended content, a recommended service, and a recommended application, but is not limited thereto.

For example, the server 300 may select a recommended item using information about content in which the first user is interested (for example, a content title or a content type) and information about a partial section in which the first user is interested (for example, a person in the partial section or a place in the partial section).

Also, the server 300 may select the recommended item related to the first personalized object by further considering the context information of the first display device 100.

In operation S640, the server 300 may transmit the at least one recommended item related to the first personalized object to the first display device 100.

In operation S650, the first display device 100 may map and store the at least one recommended item and the first personalized object. For example, the first display device 100 may combine the at least one recommended item and the first personalized object together. At this time, the first display device 100 may combine or otherwise package the at least one recommended item and the first personalized object in a form of metadata.

For example, the first display device 100 may store the packaged at least one recommended item and first personalized object in an internal memory or in a cloud server. The cloud server may be located inside the server 300 or may exist separately from the server 300.

Figure 7:
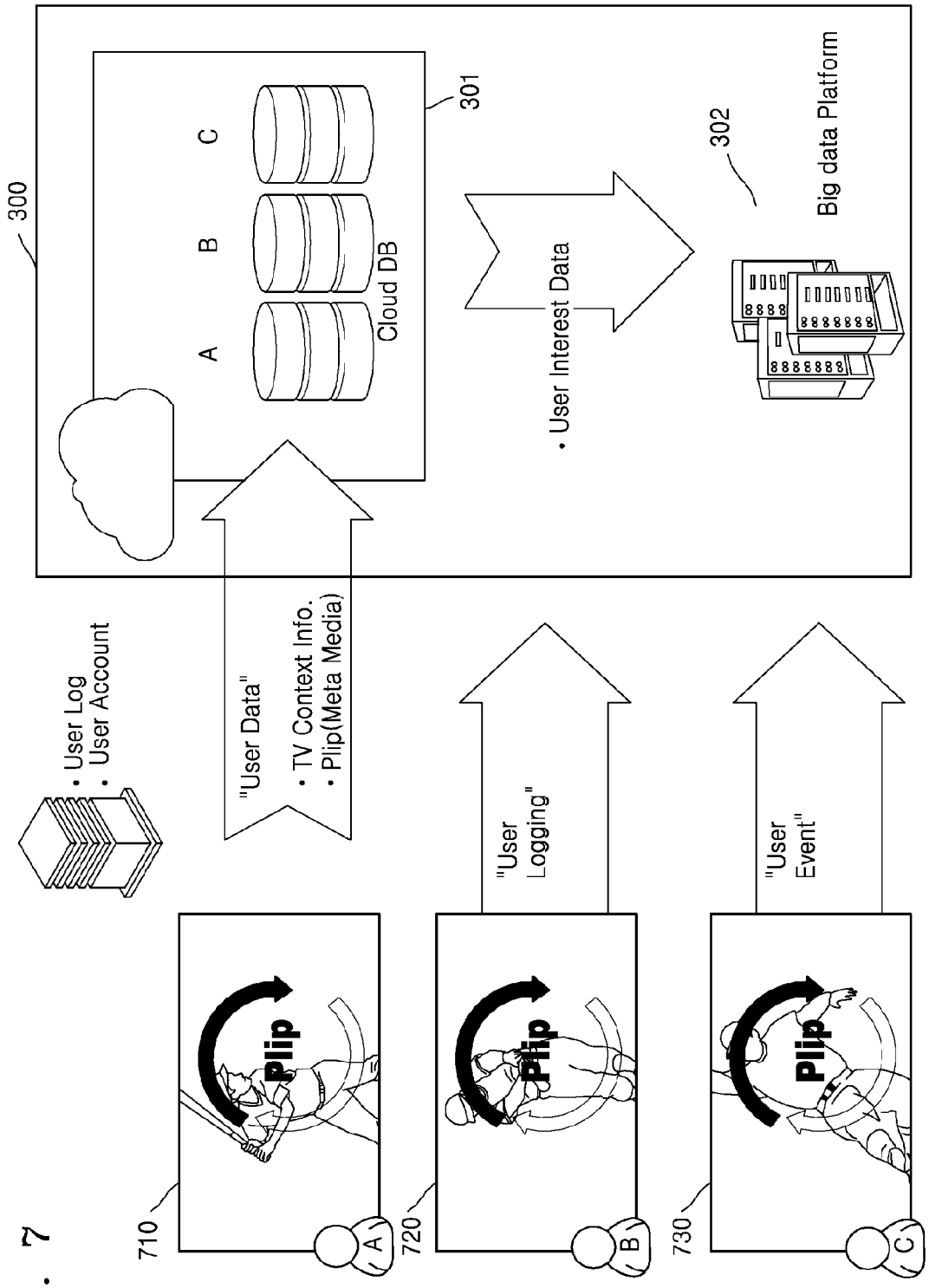
FIG. 7 is a diagram illustrating personalized objects stored in a server according to a user, according to an exemplary embodiment.

FIG. 7 is a diagram illustrating personalized objects stored in a server according to user, according to an exemplary embodiment.

As shown in FIG. 7, a first display device 710 may transmit a first personalized object generated based on a plip input from a user A, and account information of the user A to the server 300. A second display device 720 may transmit a second personalized object generated based on a plip input from a user B, and account information of the user B to the server 300. A third display device 730 may transmit a third personalized object generated based on a plip input from a user C, and account information of the user C to the server 300.

The server 300 may establish and manage a personalized object database (DB) 301 according to a user. For example, the server 300 may establish a first personalized DB for the user A, a second personalized DB for the user B, and a third personalized DB for the user C.

Also, the server 300 may include an analyzing module 302 that analyzes interests of users using personalized objects of each user and generates a recommended item.

Figure 8:
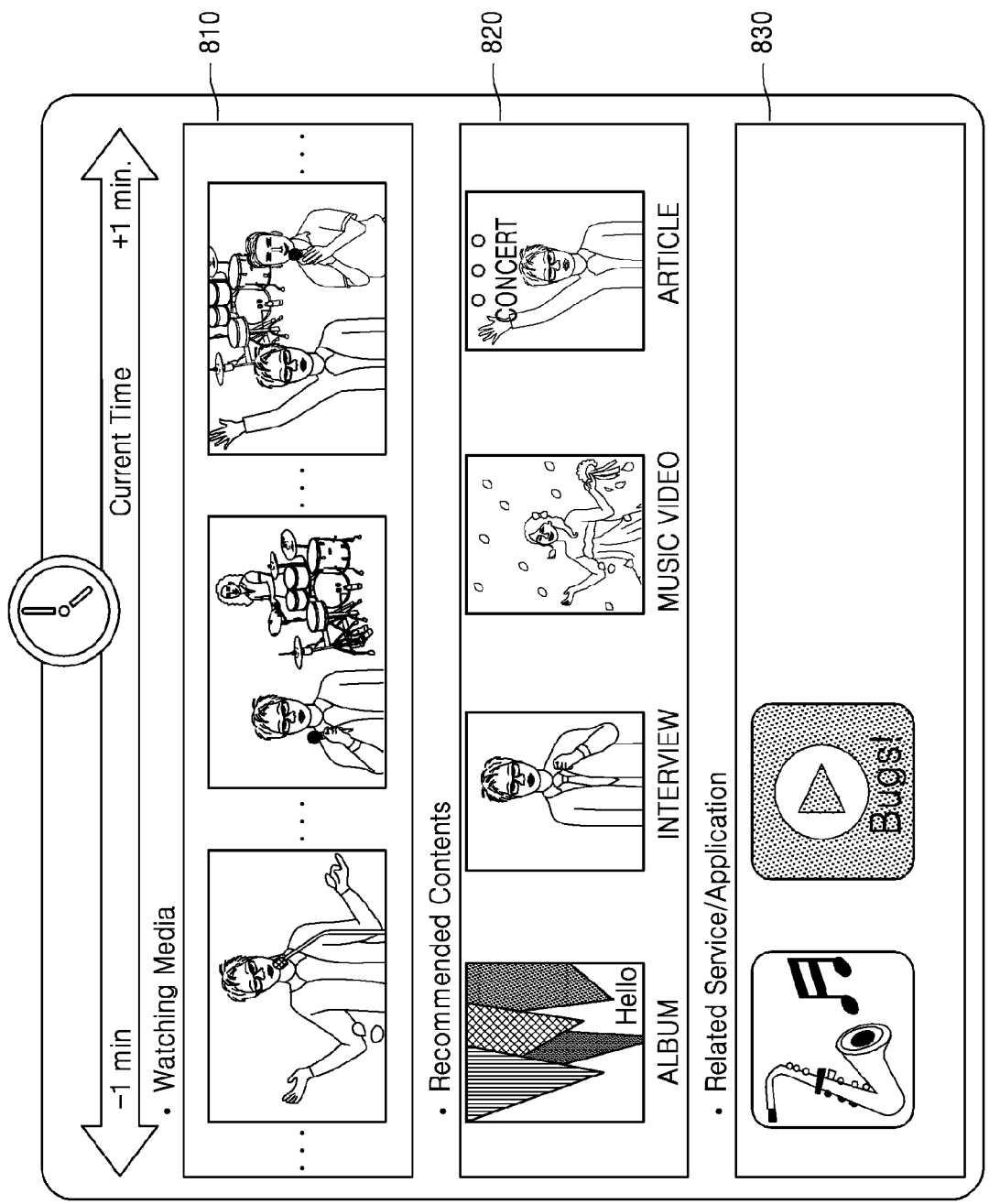
FIG. 8 is a diagram illustrating a recommended item corresponding to a personalized object, according to an exemplary embodiment.

FIG. 8 is a diagram illustrating a recommended item corresponding to a personalized object, according to an exemplary embodiment.

As shown in FIG. 8, when the first user selects a plip button at a scene when a certain singer appears while watching a music concert video, the first display device 100 may generate a first personalized object 810 regarding a partial section including the scene when the certain singer appears. For example, the first display device 100 may generate the first personalized object 810 including information that includes an amount of time from about a section from 1 minute before to 1 minute after a point of time when a plip input is received, information about an image (for example, the scene when the certain singer appears) displayed on a screen at the point of time when the plip input is received, and link information for accessing the music concert video.

The first display device 100 may transmit the first personalized object 810 to the server 300. Here, the server 300 may select a recommended item related to the first personalized object 810. For example, the server 300 may determine an album of the certain singer, an interview video of the certain singer, a music video of the certain singer, and an article about the certain singer as recommended contents 820 corresponding to the first personalized object 810, using the information included in the first personalized object 810.

Also, the first display device 100 may recommend a service and/or an application related to the first personalized object 810, using the information included in the first personalized object 810. For example, the server 300 may select a music broadcasting service and a music reproducing application as a recommended service and application 830 corresponding to the first personalized object 810.

The first display device 100 may receive information about the recommended contents 820 and the recommended service and application 830 related to the first personalized object 810, from the server 300.

In this example, the first display device 100 may map and store the first personalized object 810 and the information about the recommended contents 820 and the recommended service and application 830, as is described with reference to FIG. 9.

Figure 9:
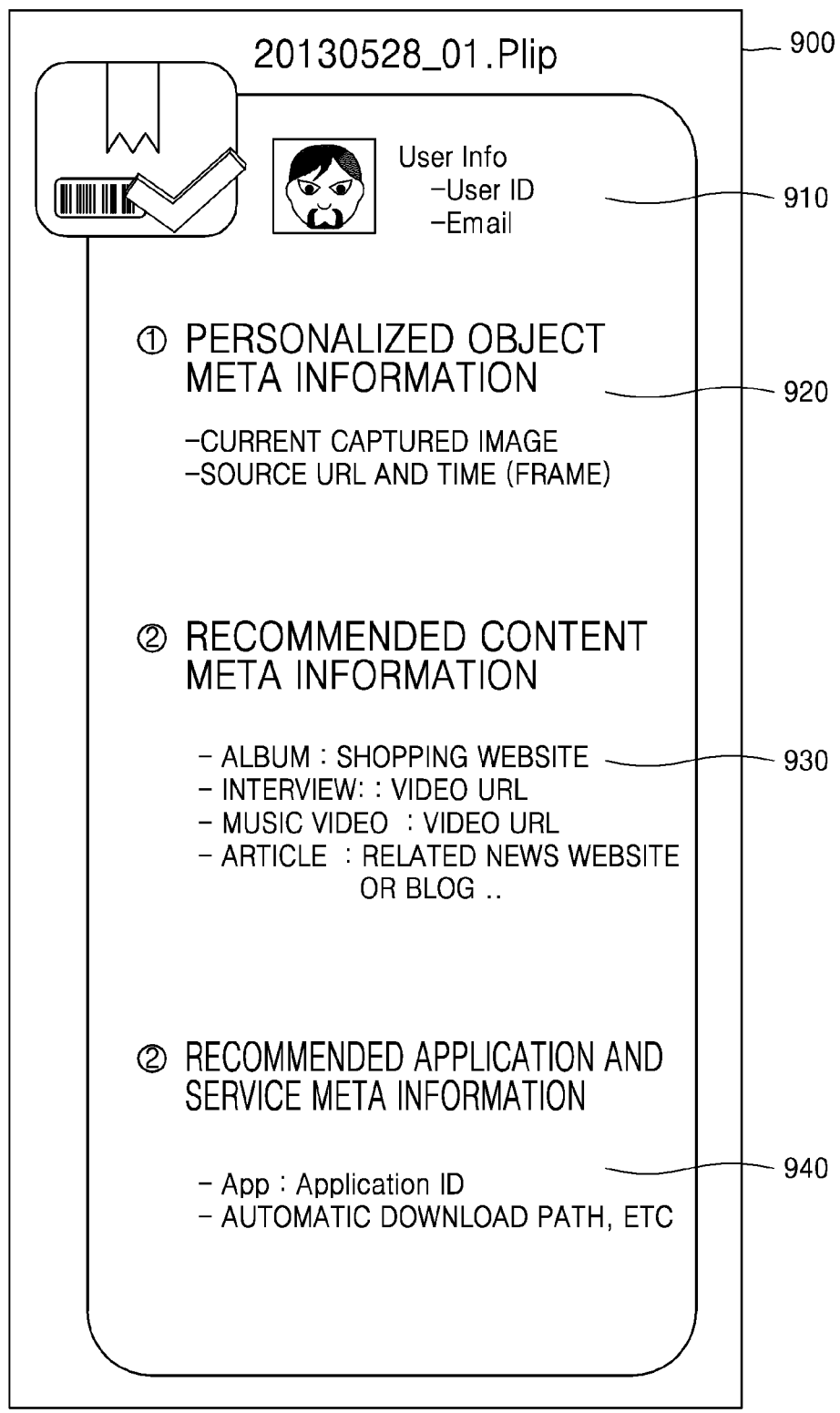
FIG. 9 is a diagram illustrating an operation of packaging a personalized object and a recommended item in a form of meta information, according to an exemplary embodiment.

FIG. 9 is a diagram illustrating an operation of packaging a personalized object and a recommended item in a form of meta information, according to an exemplary embodiment.

As shown in FIG. 9, the first display device 100 may generate a package 900 of a personalized object by packaging user information 910 about a user who generated the personalized object (for example, a user ID or an email), personalized object meta information 920 (for example, a thumbnail image, link information of content, or partial section information of content), recommended content meta data information 930 (for example, an album, an interview video, a music video, or an article), and recommended service and application meta information 940 (for example, an application ID or an application download path). Here, meta information may be information in a form of metadata.

According to an exemplary embodiment, the first display device 100 may provide, as a package, a personalized object regarding a partial section of content in which a user is interested, and recommended items related to the personalized object.

Figure 10:
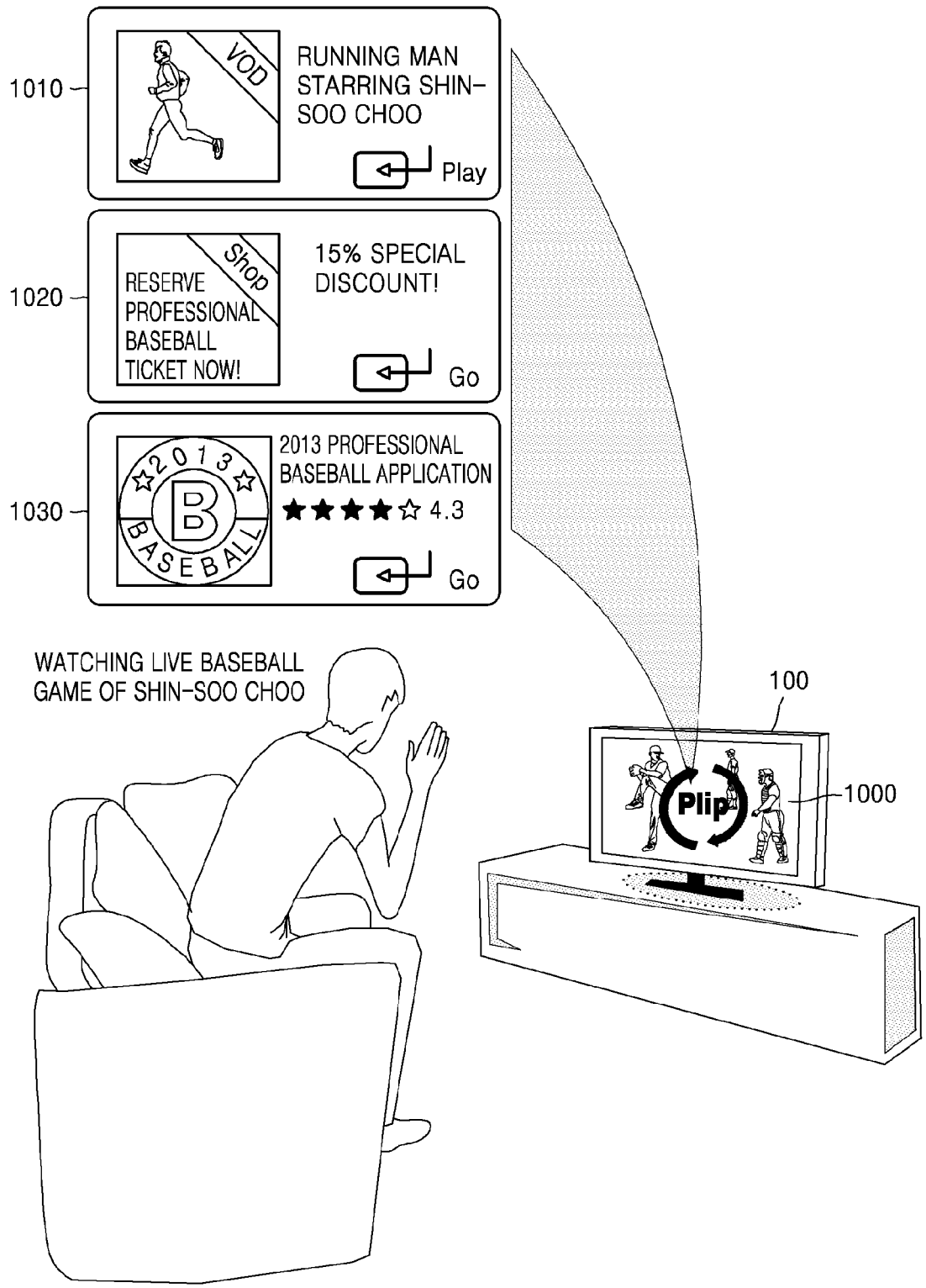
FIG. 10 is a diagram illustrating a recommended item corresponding to a personalized object, according to an exemplary embodiment.

FIG. 10 is a diagram illustrating a recommended item corresponding to a personalized object, according to an exemplary embodiment.

As shown in FIG. 10, a user may gesture to request the first display device 100 to generate a personalized object so as to record a scene in which the player Shin-Soo Choo comes into home base while watching a baseball game via the first display device 100.

Then, the first display device 100 may select a certain section including the scene that Shin-Soo Choo comes into home base, and generate a personalized object 1000 including information about the selected certain section, link information (for example, an URL) of the baseball game, and information about the scene Shin-Soo Choo comes into home base.

When the first display device 100 transmits the personalized object 1000 to the server 300, the server 300 may select a first recommended item 1010 related to Shin-Soo Choo, and second and third recommended items 1020 and 1030 related to baseball using the information included in the personalized object 1000. Also, the server 300 may transmit the first through third recommended items 1010 through 1030 to the first display device 100.

The first display device 100 may map the first through third recommended items 1010 through 1030 with the personalized object 1000, and store mapping information. Here, the first display device 100 may store the mapping information in an internal memory or an external server, such as a cloud server.

Figure 11:
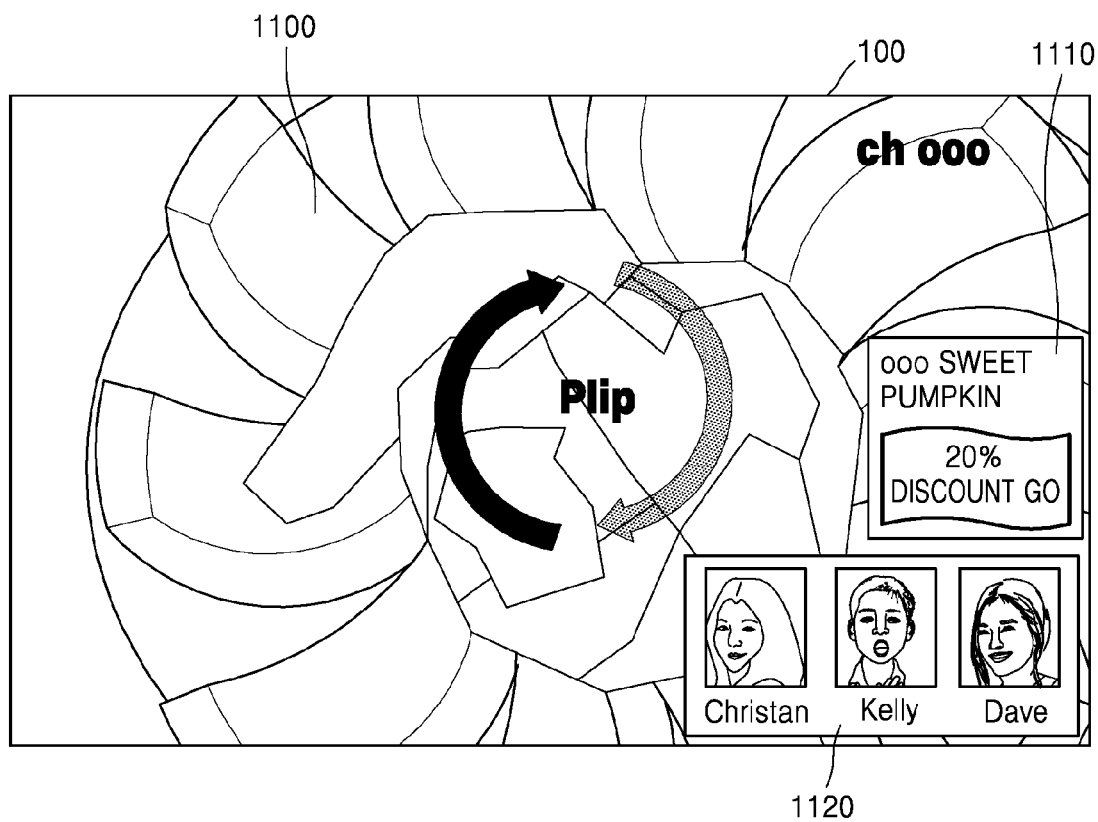
FIG. 11 is a diagram illustrating an example of providing a coupon corresponding to a personalized object, according to an exemplary embodiment.

FIG. 11 is a diagram illustrating an example of providing a coupon corresponding to a personalized object, according to an exemplary embodiment.

As shown in FIG. 11, the first display device 100 may provide a broadcast program introducing a restaurant. In this example, the first user may be interested in a restaurant selling a sweet pumpkin dish while watching the broadcast program and select a plip button. In this case, the first display device 100 may generate a personalized object 1100 regarding a partial section including a scene introducing the restaurant selling the sweet pumpkin dish. Here, the personalized object 1100 may include information about the partial section, information about a sweet pumpkin dish image, link information of the broadcast program, and address information of the restaurant selling the sweet pumpkin dish.

The first display device 100 may transmit the personalized object 1100 generated based on a plip input from the first user to the server 300. For example, the server 300 may determine whether there is a coupon 1110 registered by the restaurant selling the sweet pumpkin dish, and transmit the coupon 1110 to the first display device 100.

The first display device 100 may display the received coupon 1110 on a screen. In this example, because the first user is interested in the restaurant selling the sweet pumpkin dish, the first user may make a gesture pre-set to obtain the coupon 1110. For example, when the first user selects the coupon 1110 by using a remote controller, the coupon 1110 may be packaged with the personalized object 1100 and stored in a memory of the first display device 100.

According to an exemplary embodiment, the first display device 100 may display a list 1120 of social friends that are watching the broadcast program in real-time in a social mode.

Figure 12:
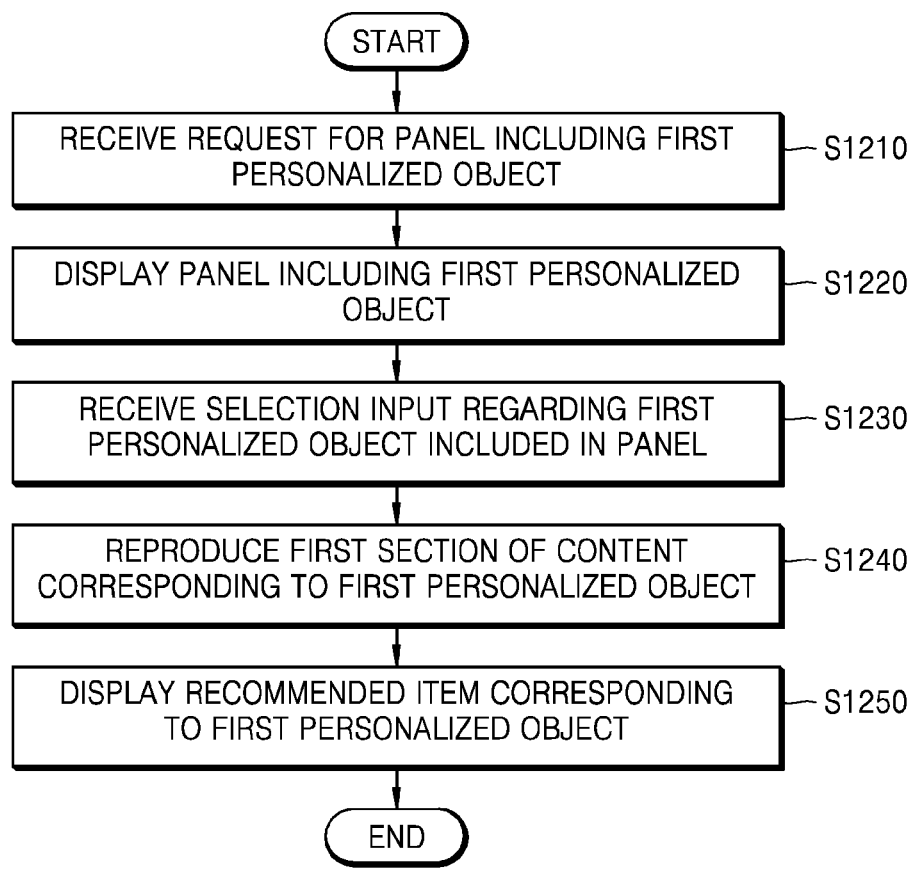
FIG. 12 is a flowchart illustrating a method of displaying a recommended item corresponding to a personalized object, according to an exemplary embodiment.

FIG. 12 is a flowchart of a method of displaying a recommended item corresponding to a personalized object, according to an exemplary embodiment.

Referring to FIG. 12, in operation S1210, the first display device 100 may receive a request for a panel including a first personalized object. The first user may request for the panel in any one of various manners. For example, an input from the first user for requesting for the panel may be an input of dragging a touch tool from one direction to another direction on a screen (for example, an input of dragging the screen from top to bottom), an input of selecting a certain button, an input of pressing a certain button for at least a certain period of time, and a pre-set voice input corresponding to the panel, but is not limited thereto.

In operation S1220, the first display device 100 may display the panel. The panel may be displayed over an entire area or a partial area of the screen.

According to an exemplary embodiment, the first display device 100 may extract the first personalized object from an internal memory, when the first personalized object is stored in the internal memory.

Alternatively, when the first personalized object is stored in the server 300, the first display device 100 may request the server 300 for the first personalized object. Here, the first display device 100 may transmit user information (for example, account information) to the server 300. Then, the first display device 100 may receive first personalized object generated by the first user.

According to an exemplary embodiment, the panel may display not only the first personalized object generated based on a plip input from the first user, but also at least one second personalized object generated by social friends (i.e. second users) of the first user. According to an exemplary embodiment, the first user may search the first and second personalized objects displayed on the panel.

In operation S1230, the first display device 100 may receive a selection input regarding the first personalized object included in the panel. According to an exemplary embodiment, the selection input may vary. For example, the selection input may be a key input, a touch input, a motion input, a bending input, a voice input, and the like, but is not limited thereto.

In operation S1240, the first display device 100 may reproduce a first section of content corresponding to the first personalized object based on the selection input.

Because the first personalized object includes information about the first section of the content and link information of the content, the first display device 100 may reproduce the first section of the content using the information about the first section and the link information of the content.

In operation S1250, the first display device 100 may display a recommended item corresponding to the first personalized object. For example, when the first personalized object and the recommended item are mapped and stored, the first display device 100 may extract the recommended item mapped to the first personalized object. Then, the first display device 100 may display the first personalized object and the recommended item.

According to an exemplary embodiment, the first personalized object and the recommended item may be displayed together on the first display device 100. According to another exemplary embodiment, the first personalized object may be displayed on the first display device 100 and the recommended item may be displayed on an external device that is connected to the first display device 100.

For example, when the first display device 100 receives the recommended item corresponding to the first personalized object from the server 300, the first display device 100 may search for an external device to display the recommended item. When an external device is found, the first display device 100 may transmit a control command for displaying the recommended item to the found external device.

Figure 13A:
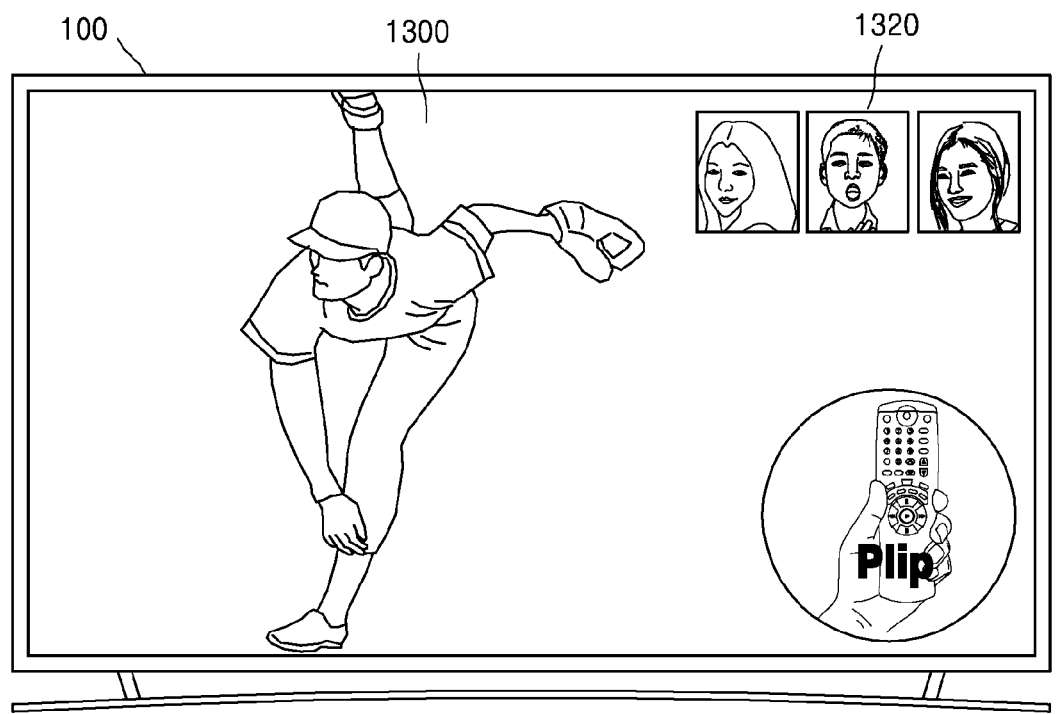
FIGS. 13A and 13B are diagrams illustrating examples of providing a panel including a personalized object, according to exemplary embodiments.
Figure 13B:
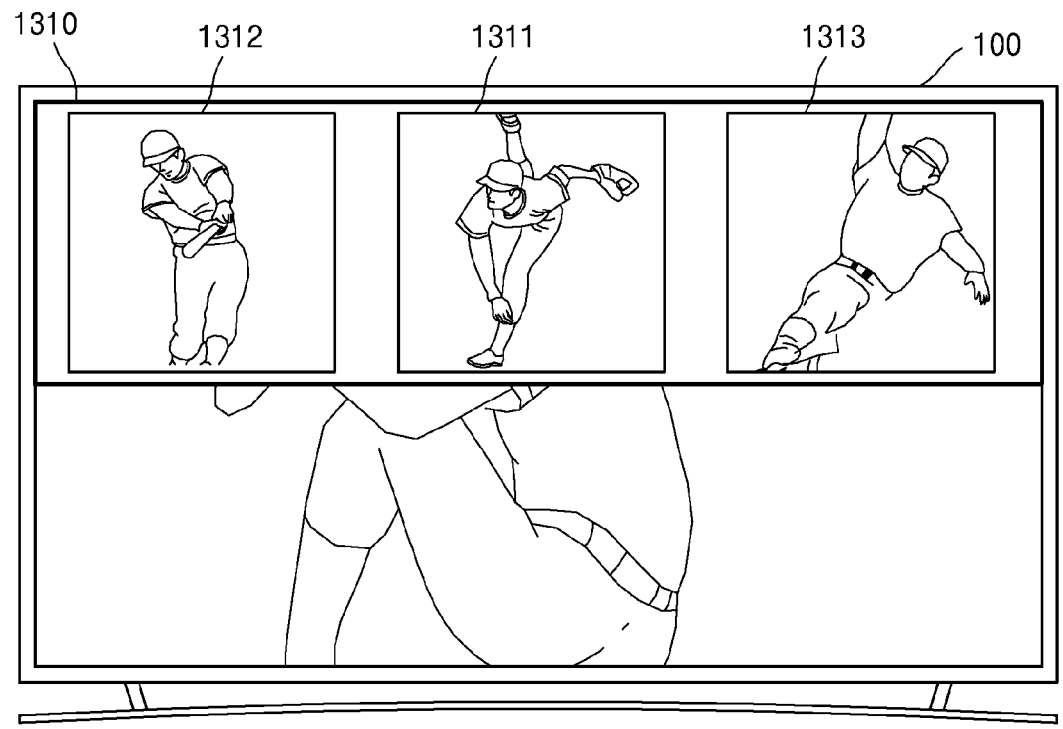

FIGS. 13A and 13B are diagrams illustrating an example of providing a panel including a personalized object, according to an exemplary embodiment.

As shown in FIG. 13A, the first display device 100 may generate a first personalized object regarding a first section including a scene 1300 in which a pitcher in a baseball game is throwing a ball, based on a plip input from the first user. According to an exemplary embodiment, the first display device 100 may display information 1320 about social friends watching the same baseball game, when the first display device 100 is in a social mode.

As shown in FIG. 13B, in order to check a first personalized object 1311 regarding the first section including the scene 1300, the first user may input a request for a panel 1310 including the first personalized object 1311.

Based on the request of the first user, the first display device 100 may display the panel 1310 including the first personalized object 1311 generated based on the plip input from the first user. Here, the panel 1310 may also display a second personalized object 1312 generated by a second user who may be a social friend of the first user, and a third personalized object 1313 generated by a third user who may also be a social friend of the first user.

The first user may select the first personalized object 1311 from among the first through third personalized objects 1311 through 1313 displayed on the panel 1310. Here, the first display device 100 may reproduce the first section corresponding to the first personalized object 1311. For example, the first display device 100 may reproduce the first section from a point of time when the pitcher is throwing the ball to a point of time when a batter hits the ball. An operation of reproducing a partial section corresponding to a personalized object, which is performed by the first display device 100, is described with reference to FIG. 14.

Figure 14:
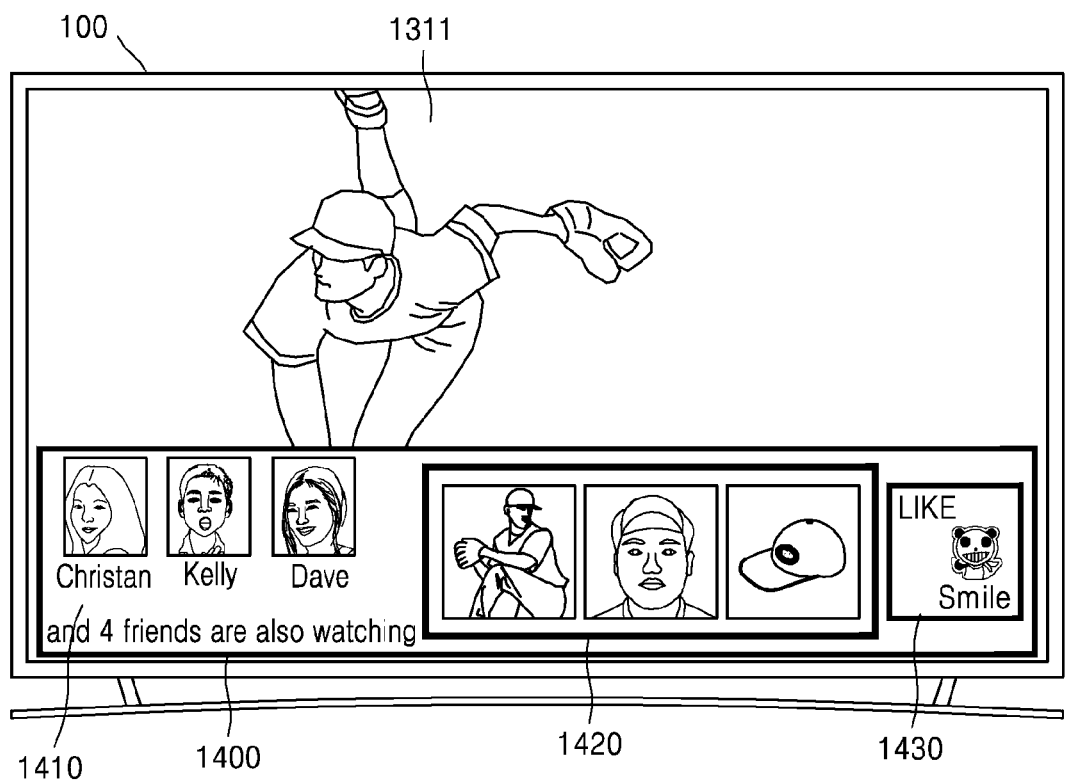
FIG. 14 is a diagram illustrating a graphical user interface (GUI) that displays a recommended item corresponding to a personalized object, according to an exemplary embodiment.

FIG. 14 is a diagram of a GUI that displays a recommended item corresponding to a personalized object, according to an exemplary embodiment.

As shown in FIG. 14, when the first user selects the first personalized object 1311 from among a plurality of personalized objects displayed on the panel 1310, the first display device 100 may reproduce the first section corresponding to the first personalized object 1311 (for example, a section from a point of time when a pitcher throws a ball to a point of time when a batter hits the ball) displayed on a main screen.

Also, the first display device 100 may display, in a certain region, a recommendation panel 1400 including recommended items 1420 corresponding to the first personalized object 1311. For example, the first display device 100 may display an article related to the pitcher, broadcasting content, and a collection of the pitcher as the recommended items 1420 corresponding to the first personalized object 1311. The recommended items 1420 may be mapped to and stored with the first personalized object 1311.

Meanwhile, the recommendation panel 1400 may further include information 1410 about social friends who are watching the same program, and an icon 1430 for evaluating the first personalized object 1311 or the recommended items 1420.

FIG. 15 is a diagram illustrating an example of displaying, by an external device 1500 connected to the first display device 100, a recommended item, according to an exemplary embodiment.

As shown in FIG. 15, the first display device 100 may reproduce the first section corresponding to the first personalized object 1311 (for example, the section from the point of time when the pitcher throws the ball to the point of time when the batter hits the ball), and may display recommended items corresponding to the first personalized object 1311 through the external device 1500.

For example, the first display device 100 may search for the external device 1500 via a local area network (LAN), for example, Wi-Fi direct, Bluetooth, Bluetooth low energy (BLE), and the like. When the external device 1500 is found, the first display device 100 may transmit a control command for displaying the recommended items to the external device 1500 via the LAN.

Figure 16:
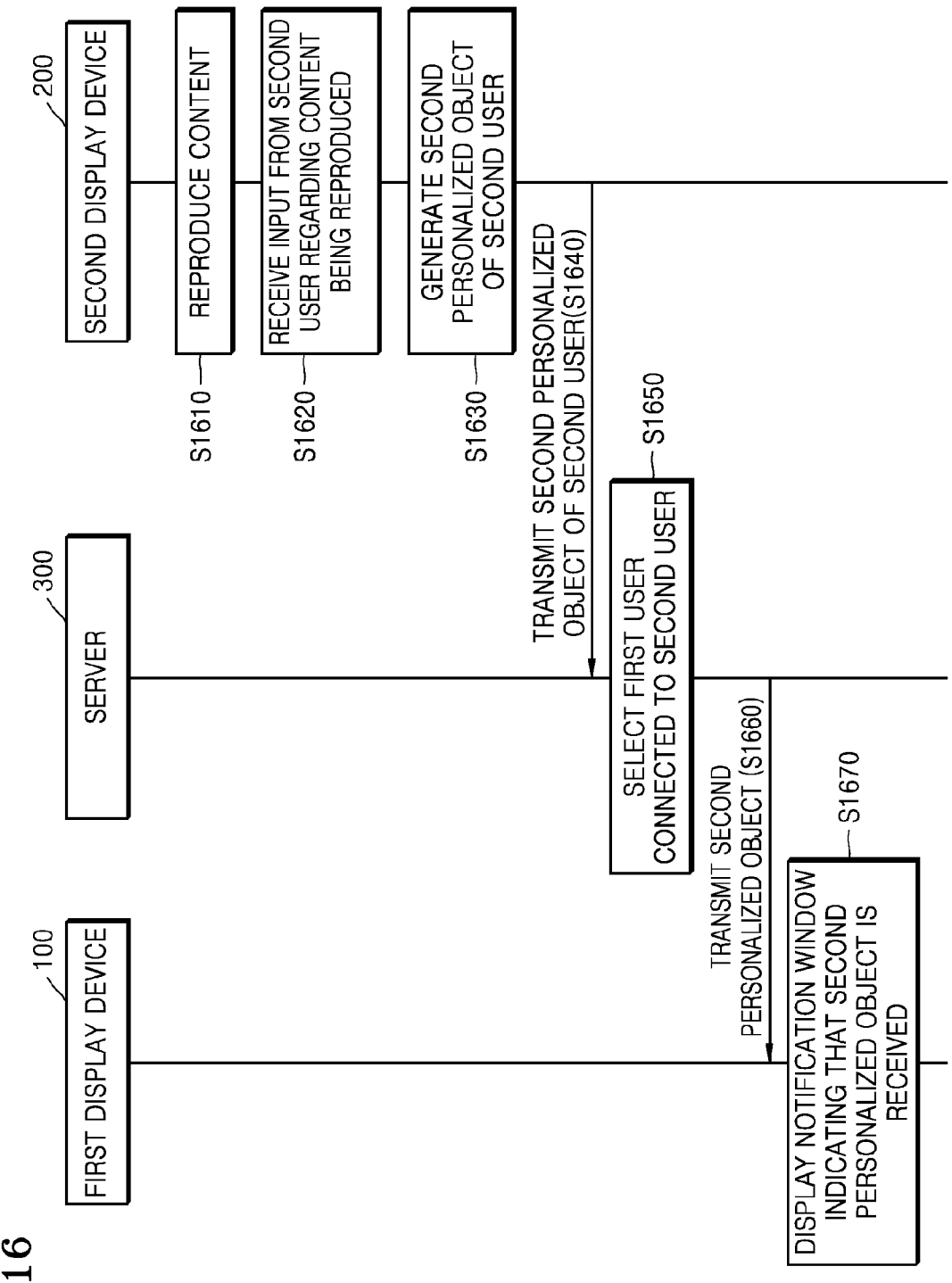
FIG. 16 is a flowchart illustrating a method of displaying a notification window indicating that a friend generated a personalized object, according to an exemplary embodiment.

FIG. 16 is a flowchart of a method of displaying a notification window indicating that a friend generated a personalized object, according to an exemplary embodiment.

Referring to FIG. 16, in operation S1610, the second display device 200 may reproduce content. The second display device 200 may reproduce real-time broadcasting content or recorded content, such as VOD content.

In operation S1620, the second display device 200 may receive an input from the second user regarding the content being reproduced.

The input from the second user may be an input (for example, a plip input) for generating a second personalized object regarding a partial section (for example, a section of interest of the second user) of the content being reproduced. The input from the second user may be various, for example, it may be a key input, a touch input, a motion input, a bending input, a voice input, a multi-input, and the like.

In operation S1630, the second display device 200 may generate the second personalized object of the second user for reproducing the partial section of the content. The second display device 200 may generate the second personalized object using information about the partial section of the content, which corresponds to a point of time when the input from the second user is received, information about an image corresponding to the point of time when the input from the second user is received, and link information (for example, a URL) of the content.

In operation S1640, the second display device 200 may transmit the second personalized object to the server 300. For example, the second display device 200 may transmit ID information of the second user, for example, account information or a device ID of the second display device 200, to the server 300, together with the second personalized object.

In operation S1650, the server 300 may select the first user connected to the second user by checking social friends of the second user. In other words, the first and second users may be social friends. For example, the connection may be a social connection that is based on a web site that the two users participated in, or the connection may be based on an agreement between the two users, and the like.

In operation S1660, the server 300 may transmit the second personalized object to the first display device 100 of the first user who is a social friend of the second user.

In operation S1670, the first display device 100 may display a notification window indicating that the second personalized object is received. The first display device 100 may display the notification window at a point of time at which the second personalized object is received when the first display device 100 is in an on-state. When the first display device 100 is in an off-state, the first display device 100 may display the notification window when the first display device 100 changes to an on-state.

As a non-limiting example, the notification window may be displayed in the form of a pop-up window. The notification window indicating that the second personalized object is received will be described in more detail with reference to FIG. 17.

Figure 17:
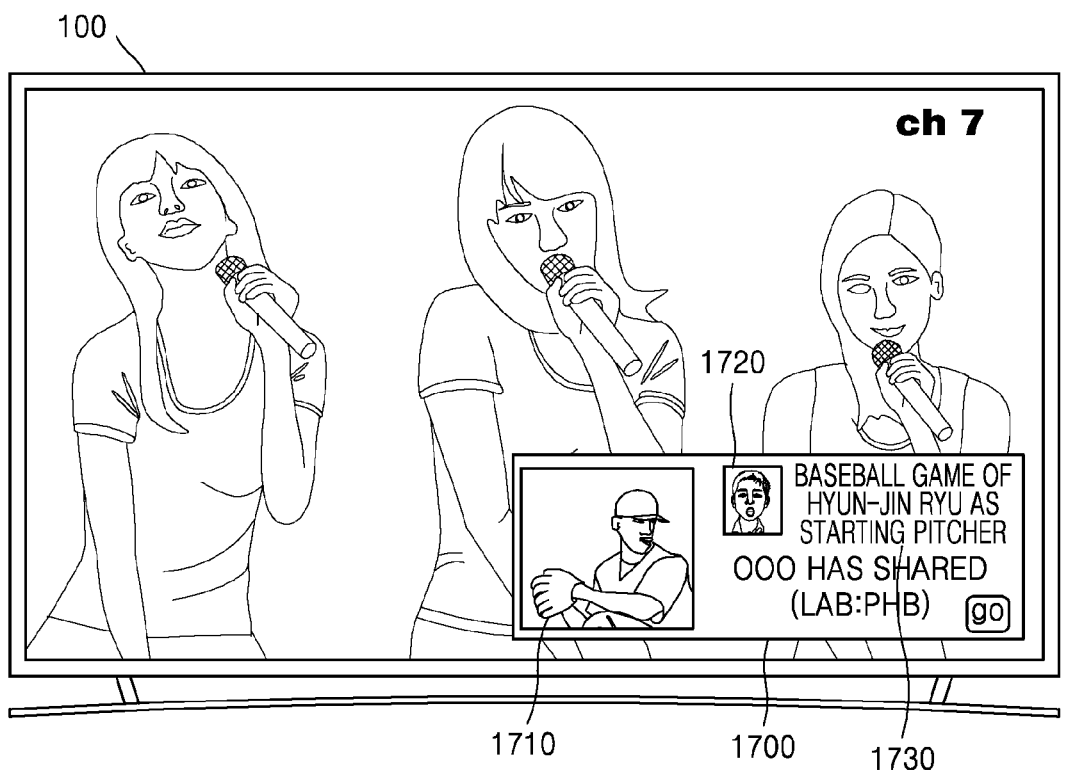
FIG. 17 is a diagram of a notification window indicating that a friend generated a personalized object, according to an exemplary embodiment.

FIG. 17 is a diagram of a notification window 1700 indicating that a friend generated a personalized object, according to an exemplary embodiment.

As shown in FIG. 17, the first display device 100 may receive the second personalized object generated by the second user who is a social friend of the first user, from the server 300. Then, the first display device 100 may display the notification window 1700 indicating that the second personalized object is received. Here, the notification window 1700 may include an image 1710 of the second personalized object, information 1720 about the second user (for example, a photograph of the second user), and a brief description 1730 about the second personalized object (for example, user "OOO has shared a baseball game of Hyun-Jin Ryu as the starting pitcher").

According to an exemplary embodiment, when the first user selects a check button (for example, "go"), the first display device 100 may provide a panel for checking the second personalized object.

Alternatively, according to an exemplary embodiment, when the first user selects the check button (for example, "go"), the first display device 100 may change a channel to the channel of a baseball game that is currently being broadcasted.

Figure 18:
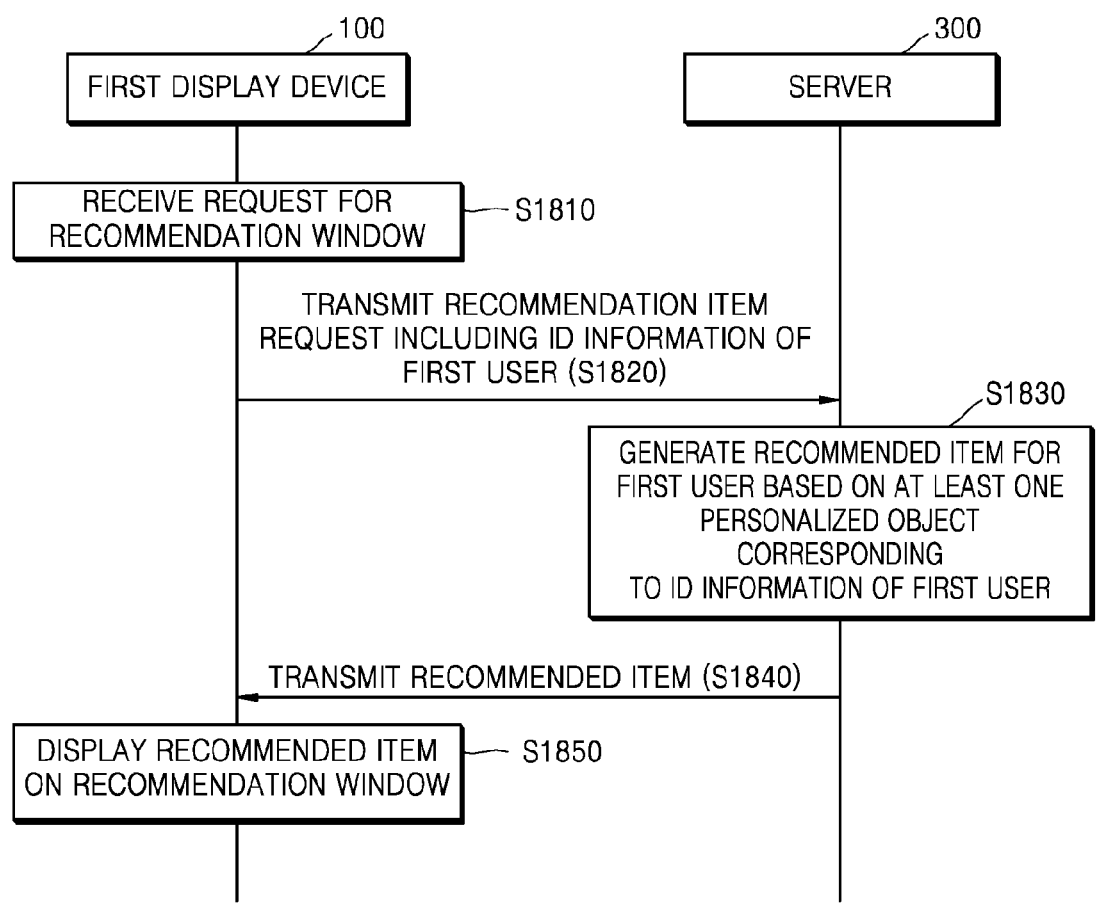
FIG. 18 is a flowchart illustrating a method of providing a recommended item for a user, based on at least one personalized object, according to an exemplary embodiment.

FIG. 18 is a flowchart illustrating a method of providing a recommended item for a user, based on at least one personalized object, according to an exemplary embodiment.

Referring to FIG. 18, in operation S1810, the first display device 100 may receive a request for a recommendation window. The first user may request the recommendation window in any one of various manners. For example, the first user may request the recommendation window by changing the first display device 100 to an on-state, by selecting a certain button, or by inputting a pre-set voice input, but is not limited thereto.

In operation S1820, the first display device 100 may transmit a recommendation item request including ID information of the first user to the server 300. For example, the first display device 100 may transmit at least one of account information of the first user, ID information of the first display device 100, and address information of the first display device 100 to the server 300.

In operation S1830, the server 300 may generate a recommended item for the first user based on at least one personalized object corresponding to the ID information of the first user.

For example, the server 300 may analyze the at least one personalized object pre-generated by the first user according to the recommended item request. Based on a result of analyzing the at least one personalized object, the server 300 may extract interests of the first user. The first server 300 may select a number of recommended items based on the interests of the first user. In some examples, when the first user frequently generates personalized objects regarding partial sections of performance videos of a certain singer, the server 300 may select an item related to the certain singer as a recommended item.

In operation S1840, the server 300 may transmit the generated recommended item to the first display device 100. According to an exemplary embodiment, the recommended item may be in a form in which an image of the recommended item is connected to link information or index information.

In operation S1850, the first display device 100 may display the recommended item on the recommendation window.

According to an exemplary embodiment, the first display device 100 may display the recommendation window on a screen. The screen may include a first screen that is initially displayed on the first display device 100 when an operation mode of the first display device 100 is changed from a standby mode to an active mode (for example, when the first display device 100 is turned on), but is not limited thereto.

When there is a plurality of the recommended items, the first display device 100 according to an exemplary embodiment may display the plurality of recommended items on the recommendation window in a form of a list.

According to an exemplary embodiment, because a personalized object may be intentionally generated by a user, the first display device 100 may provide recommendation information accurately reflecting interests of the user based on the personalized object.

Figure 19:
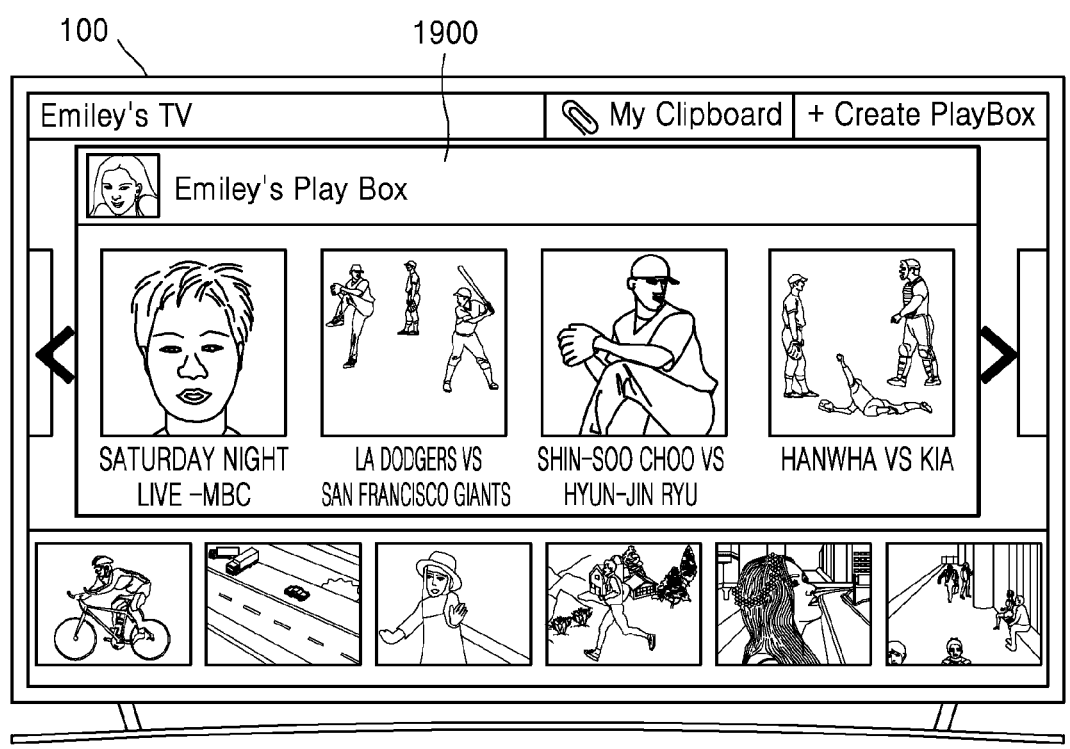
FIG. 19 is a diagram illustrating a GUI that provides a recommended item selected based on at least one personalized object, according to an exemplary embodiment.

FIG. 19 is a diagram of a GUI that provides a recommended item selected based on at least one personalized object, according to an exemplary embodiment.

As shown in FIG. 19, when the first user (for example, Emiley) turns on the first display device 100 (for example, Emiley' TV), the first display device 100 may determine that an event requesting a recommendation window 1900 is generated.

The first display device 100 may request the server 300 for a recommended item based on personalized objects of the first user. The server 300 may analyze the personalized objects of the first user, and select a recommended item based on a result of the analyzing. For example, when the first user typically generates personalized objects regarding a baseball game of a certain player, the server 300 may select items related to the certain player as recommended items. Then, the server 300 may transmit the recommended items to the first display device 100.

The first display device 100 may display the recommendation window 1900 including the recommended items received from the server 300. For example, the recommended items displayed on the recommendation window 1900 may be variety shows starring the certain player or baseball games of the certain player.

According to an exemplary embodiment, when a user using the first display device 100 is changed from the first user to the second user, the first display device 100 may receive account information of the second user from the second user, or recognize the second user via a camera. Here, the first display device 100 may request for a recommended item for the second user again while transmitting ID information (for example, the account information) of the second user. The first display device 100 may receive the recommended item that is recommended based on a personalized object of the second user from the server 300, and display the recommended item for the second user on the recommendation window 1900.

Figure 20:
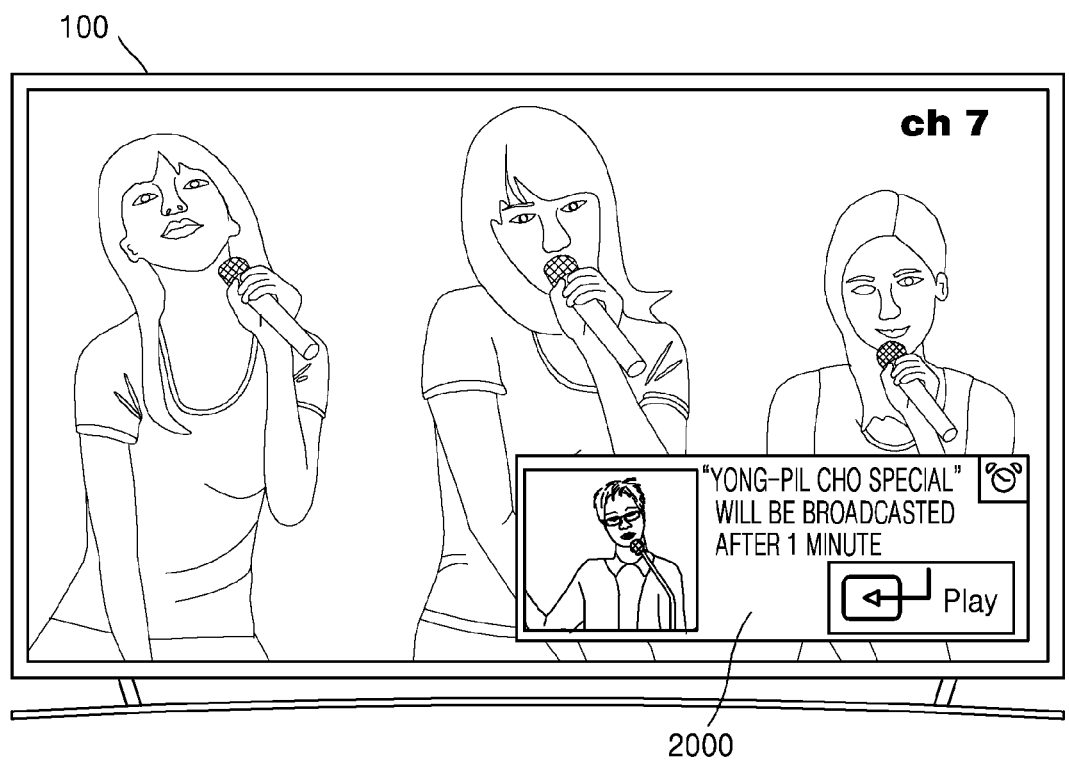
FIG. 20 is a diagram illustrating a GUI that provides a notification of an interested broadcast of a user based on at least one personalized object, according to an exemplary embodiment.

FIG. 20 is a diagram illustrating a GUI that provides a notification of an interested broadcast of a user based on at least one personalized object, according to an exemplary embodiment.

According to an exemplary embodiment, the server 300 may determine interests of the first user using the first display device 100 by analyzing a personalized object received from the first display device 100. When personalized objects regarding performance videos of a certain singer are mostly received from the first display device 100, the server 300 may determine that the first user is interested in the certain singer.

The server 300 may select a broadcast program related to the certain singer as a recommended item, and transmit a recommendation message to the first display device 100 before the broadcast program related to the certain singer starts. At this time, the first display device 100 may display a recommendation window 200 including the recommendation message. For example, the first display device 100 may display the recommendation window 2000 including a message ""Yong-Pil Cho Special" will be broadcasted after 1 minute". When the first user selects a check button (for example, "play") provided on the recommendation window 2000, the first display device 100 may change a channel to provide the "Yong-Pil Cho Special".

Figure 21:
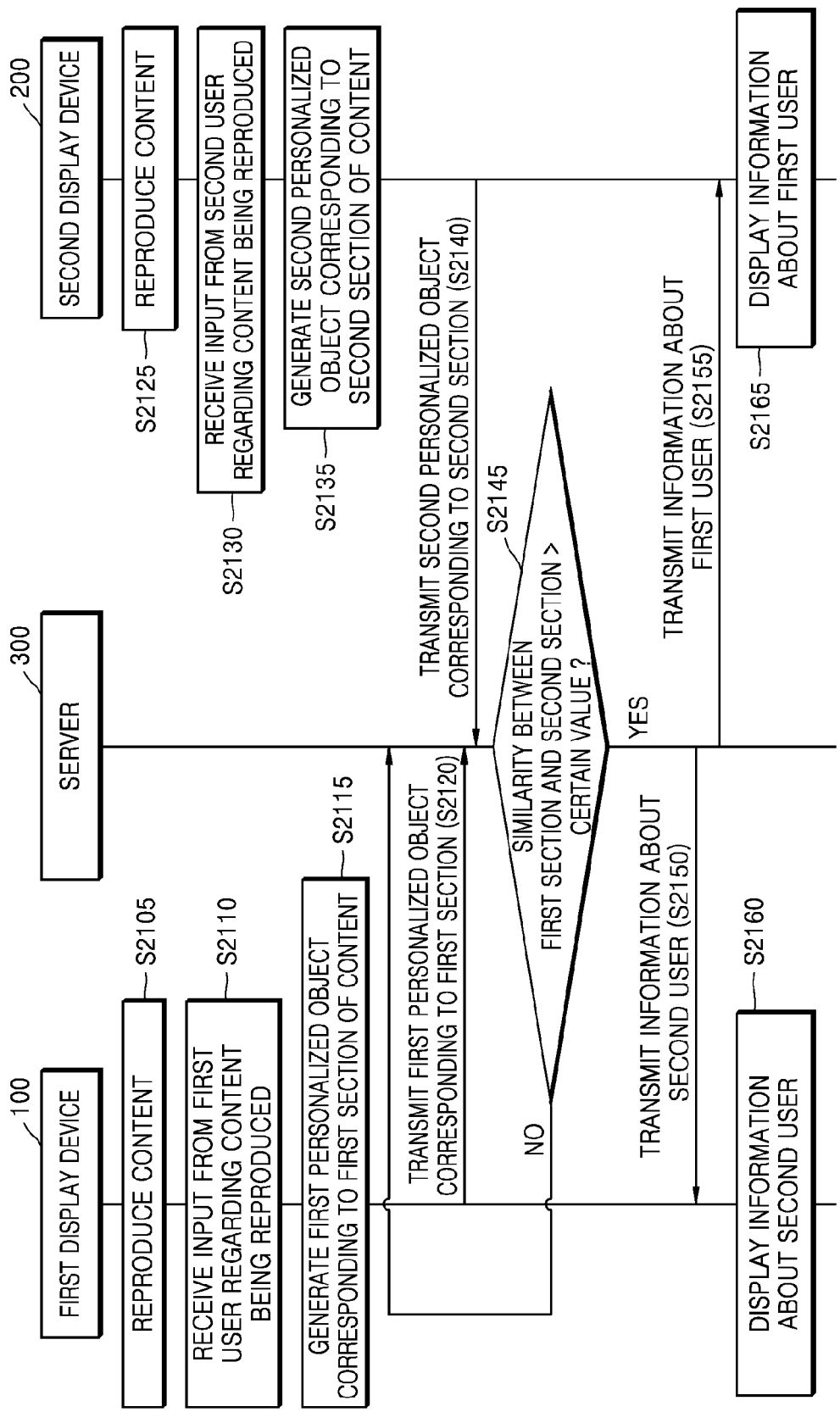
FIG. 21 is a flowchart illustrating a method of providing information about another user that generates a personalized object about a similar section, according to an exemplary embodiment.

FIG. 21 is a flowchart of a method of providing information about another user who generates a personalized object about a similar section, according to an exemplary embodiment.

In operation S2105, the first display device 100 may reproduce content.

In operation S2110, the first display device 100 may receive an input from the first user regarding the content being reproduced. The input from the first user may be a plip which is input for generating a personalized object.

In operation S2115, the first display device 100 may generate a first personalized object corresponding to a first section of the content, based on the input from the first user.

According to an exemplary embodiment, the first section may be a section (for example, a section from −n sec. to +n sec.) from a certain point of time before a point of time (for example, 0 seconds) when the input from the first user is received to a certain point of time after the point of time when the input from the first user is received, but is not limited thereto. Also, the first personalized object may include information about the first section corresponding to the point of time at which the input from the first user is received, information about an image corresponding to the point of time when the input from the first user is received, and link information of the content.

In operation S2120, the first display device 100 may transmit the first personalized object corresponding to the first section to the server 300.

Meanwhile, in operation S2125, the second display device 200 may reproduce the same content as the first display device 100.

In operation S2130, the second display device 200 may receive an input from the second user regarding the content being reproduced. For example, the input from the second user may be a plip input for generating a personalized object. According to an exemplary embodiment, the first and second users may be social friends connected via social media.

In operation S2135, the second display device 200 may generate a second personalized object corresponding to a second section of the content, based on an input from the second user.

According to an exemplary embodiment, the second section may be a section from a certain point of time before a point of time in which the input from the second user is received to a certain point of time after the point of time at which the input from the second user is received, but is not limited thereto. Also, the second personalized object may include information about the second section corresponding to the point of time when the input from the second user is received, information about an image corresponding to the point of time when the input from the second user is received, and the link information of the content.

In operation S2140, the second display device 200 may transmit the second personalized object corresponding to the second section to the server 300.

In operation S2145, the server 300 may determine a similarity between the first and second sections using the first personalized object received from the first display device 100 and the second personalized object received from the second display device 200. For example, the server 300 may determine whether the first and second sections overlap each other by comparing the information about the first section included in the first personalized object and the information about the second section included in the second personalized object. When the first and second users select a plip button at a similar point of time at which they are watching the same content respectively using the first and second display devices 100 and 200, the first and second sections may overlap each other.

In operations S2150 and S2155, the server 300 may transmit the information about the second user to the first display device 100 and the information about the first user to the second display device 200, based on a result of determining the similarity.

For example, when the first and second sections entirely or partially overlap each other, the server 300 may transmit the information about the second user who selected the plip button regarding the similar section as the first user to the first display device 100. Likewise, the server 300 may transmit the information about the first user who selected the plip button regarding the similar section as the second user to the second display device 200.

In operation S2160, the first display device 100 may display the information about the second user who requested to generate the second personalized object regarding the similar section to the first user. According to an exemplary embodiment, the information about the second user may include at least one of ID information (for example, account information, ID, or a photograph) of the second user, information about a point of time when the second personalized object is generated, and information about the number of personalized objects generated by the second display device 200 regarding the content, but is not limited thereto.

As another example, when a list of social friends watching the same content as the first user is displayed, the first display device 100 may display a separate ID mark on an image of the second user who selected the plip button regarding the similar section as the first user, from among the list.

In operation S2165, the second display device 200 may display the information about the first user who requested to generate the first personalized object regarding the similar section as the second user. According to an exemplary embodiment, the information about the first user may include at least one of ID information (for example, account information, ID, or a photograph) of the first user, information about a point of time when the first personalized object is generated, and information about the number of personalized objects generated by the first display device 100 regarding the content, but is not limited thereto.

As another example, when a list of social friends watching the same content as the second user is displayed, the second display device 200 may display a separate ID mark on an image of the first user who selected the plip button regarding the similar section as the second user, from among the list.

According to an exemplary embodiment, each of the first and second users may check information about social friends who are interested in the same section while watching the content.

Figure 22:
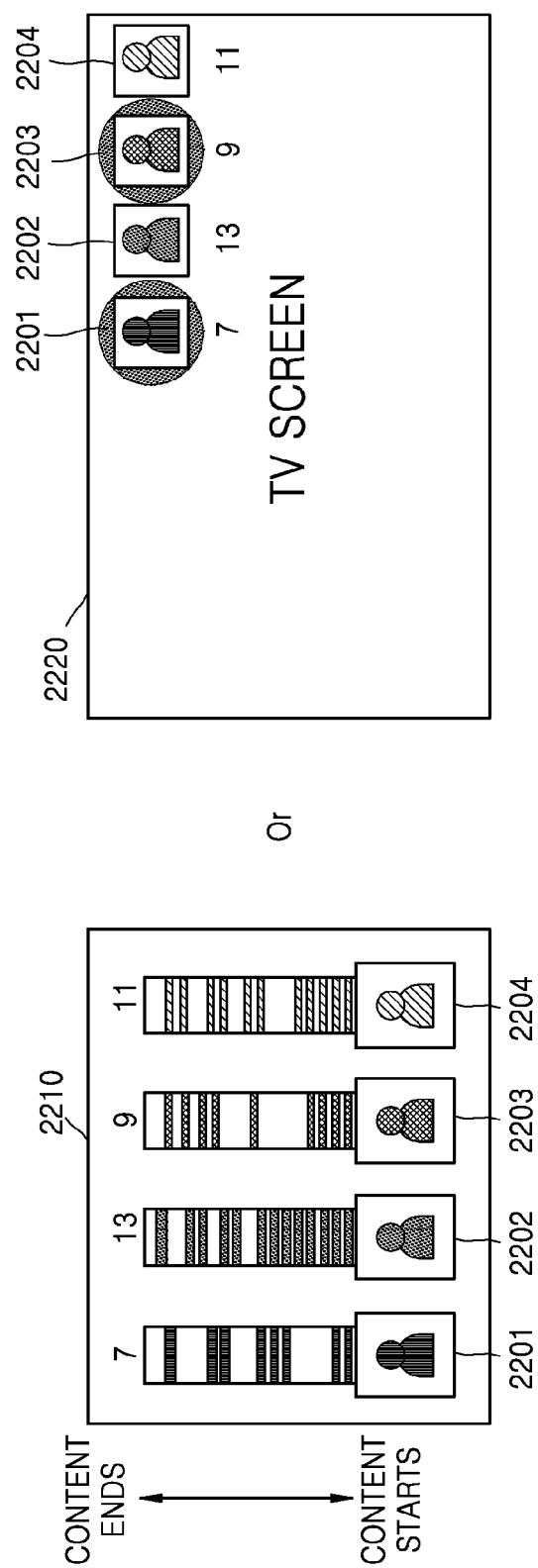
FIG. 22 is a diagram of first and second GUIs that provide information about other users who generate personalized objects regarding a similar section, according to an exemplary embodiment.

FIG. 22 is a diagram of first and second GUIs 2210 and 2220 that provide information about other users who generate personalized objects regarding a similar section, according to an exemplary embodiment.

Referring to the first GUI 2210, the first display device 100 may display information about first through fourth social friends 2201 through 2204 who are watching the same content as the first user via display devices. For example, the first display device 100 may display the first GUI 2210 including ID information of the first through fourth social friends 2201 through 2204, information about a section where a plip input is received from each of the first through fourth social friends 2201 through 2204 from a point of time at which the content starts to a point of time at which the content ends, and information about a numbers of times personalized objects of the first through fourth social friends 2201 through 2204 are generated (for example, 7, 13, 9, and 11).

As merely a non-limiting example, referring to the second GUI 2220, the first display device 100 may display separate ID marks on images of social friends who selected a plip button at the similar point of time as the first user from among the first through fourth social friends 2201 through 2204 who are watching the same content as the first user. For example, when the first and third social friends 2201 and 2203 select the plip button at the same or a similar point of time as the first user, sections of personalized objects generated by the first and third social friends 2201 and 2203 may overlap a section of a first personalized object generated by the first user.

The first display device 100 may notify the first user about social friends who have selected the plip button at the similar point of time as the first user by adding indicators to ID information of the first and third social friends 2201 and 2203 from a list of the first through fourth social friends 2201 through 2203.

Figure 23:
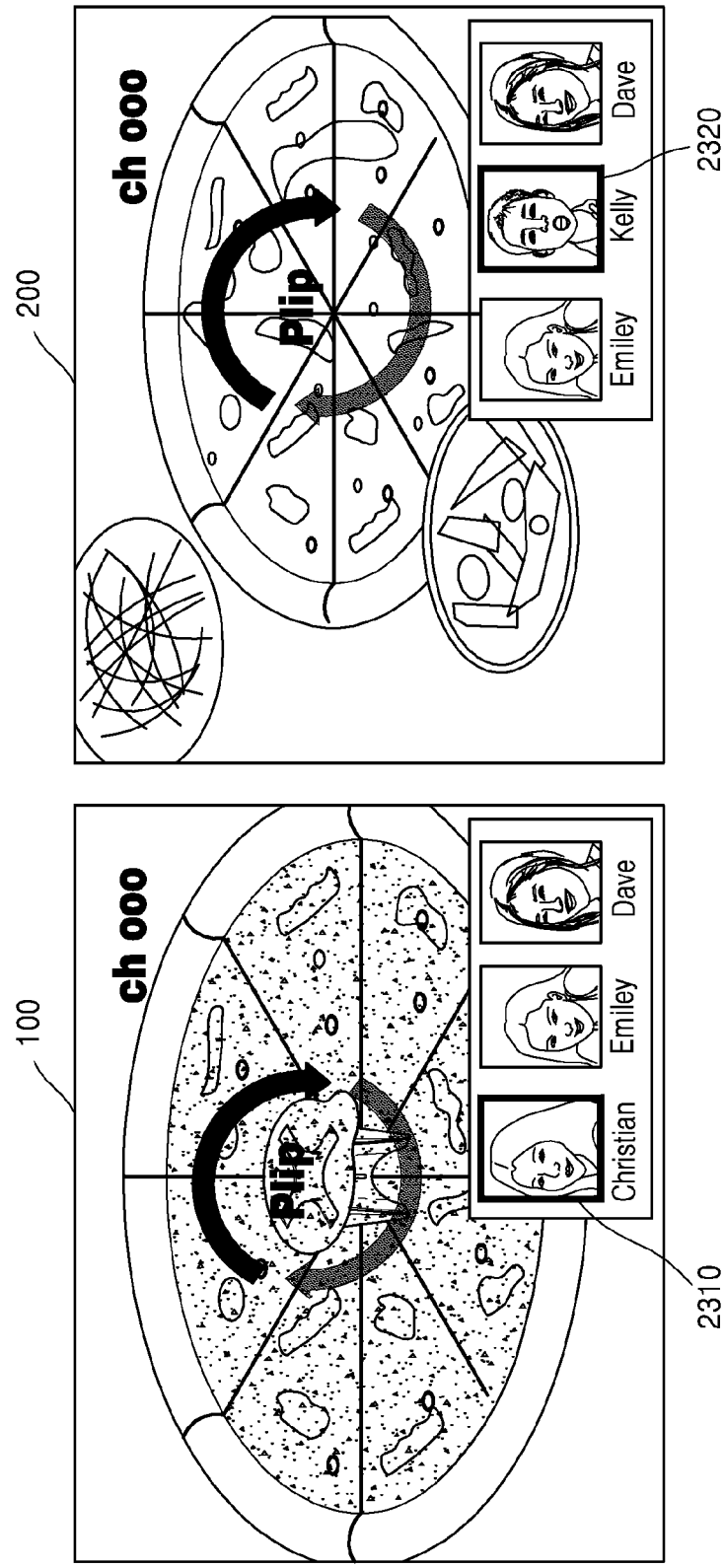
FIG. 23 is a diagram illustrating an example of a first display device and a second display device generating personalized objects about a similar section, according to an exemplary embodiment.

FIG. 23 is a diagram illustrating an example of the first display device 100 and the second display device 200 generating personalized objects about a similar section, according to an exemplary embodiment.

In FIG. 23, the first user, for example, a person named Kelly, is watching a certain program broadcasted in real time using the first display device 100, and the second user, for example, a woman named Christian, is watching the certain program broadcasted in real time using the second display device 200.

When the first user is watching the certain program via the first display device 100, the first display device 100 may provide a list of social friends such as (Christian, Emiley, and Dave) who are receiving the same broadcast program of the same channel as the first user, from among social friends of the first user. Also, when the second user is watching the certain program via the second display device 200, the second display device 200 may provide a list of social friends such as (Emiley, Kelly, and Dave) who are receiving the same broadcast program of the same channel as the second user, from among social friends of the second user.

For example, when the first user selects a plip button at a reproduction time of 55 min., and the second user selects a plip button at a reproduction time of 55 min. 30 sec., the first display device 100 may generate a first personalized object corresponding to a first section from 54 min. to 56 min. In response, and the second display device 200 may generate a second personalized object corresponding to a second section from 54 min. 30 sec., to 56 min. 30 sec.

Then, the first and second display devices 100 and 200 may transmit the first and second personalized objects to the server 300. Here, the server 300 may compare the first and second sections using the first and second personalized objects, and determine that the first and second sections overlap from 54 min. 30 sec. to 56 min. Because the first and second sections overlap each other, the server 300 may transmit information about the second user to the first display device 100 and information about the first user to the second display device 200.

At this time, as an example, the first display device 100 may display a border 2310 around an image of the second user to notify the first user that the second user that is selected from the plip button regarding the similar section.

The second display device 200 may also display a border 2320 around an image of the first user to notify the second user that the first user selected the plip button regarding the similar section.

According to an exemplary embodiment, the first and second users may check the borders 2310 and 2320 and determine that they share the similar interests.

In FIG. 23, the first and second display devices 100 and 200 display the borders 2310 and 2320 around the second and first users who are social friends which may have been generated at the second and first personalized objects at the same or similar point of time, but an exemplary embodiment is not limited thereto. The first and second display devices 100 and 200 may display social friends having the same interest sections in any one of various manners.

Figure 24:
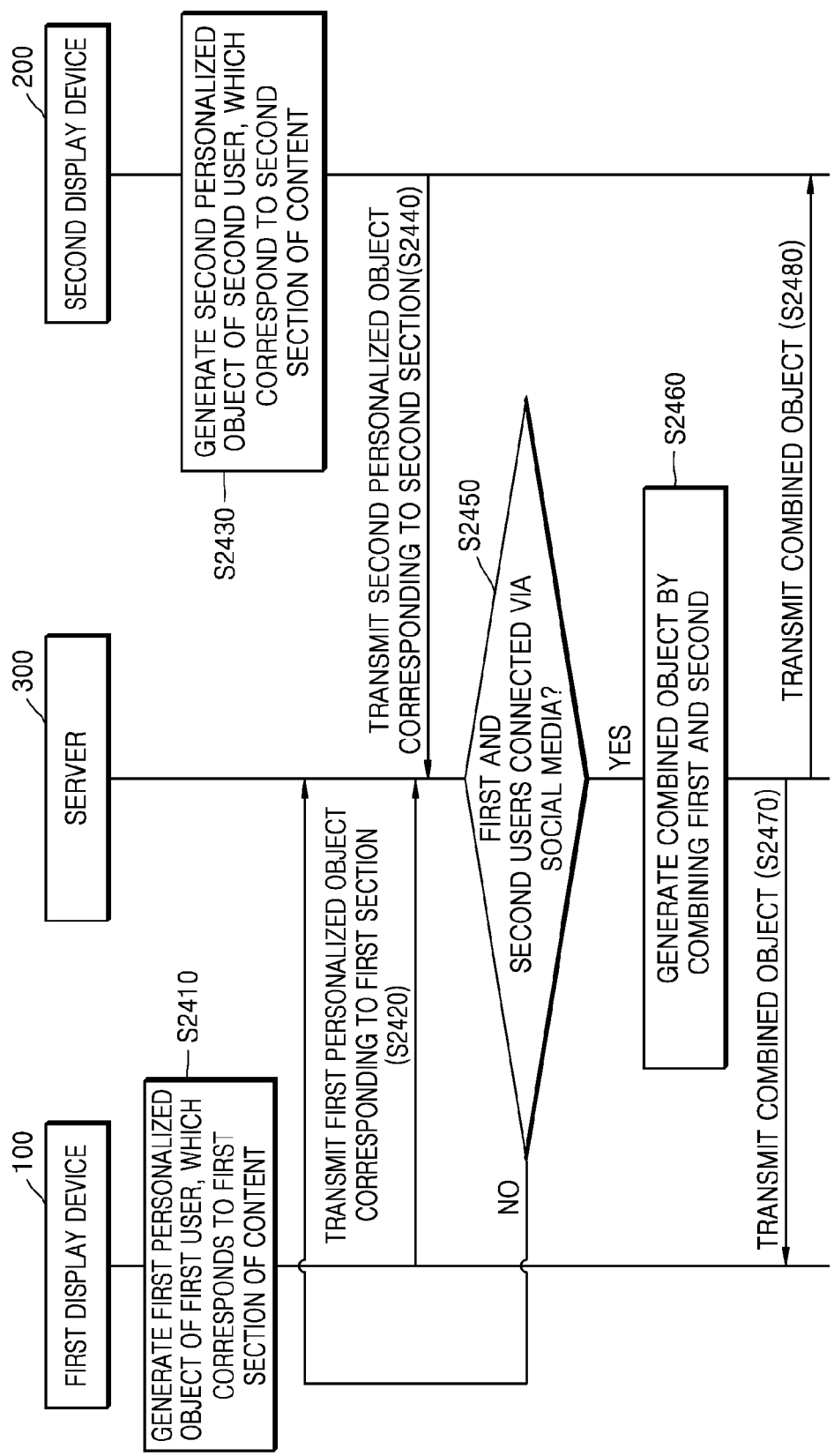
FIG. 24 is a flowchart illustrating a method of providing a combined object, according to an exemplary embodiment.

FIG. 24 is a flowchart illustrating a method of providing a combined object, according to an exemplary embodiment.

Referring to FIG. 24, in operation S2410, the first display device 100 may generate the first personalized object of the first user, which corresponds to the first section of the content.

In operation S2420, the first display device 100 may transmit the first personalized object corresponding to the first section of the content to the server 300. The first display device 100 may transmit the ID information of the first user to the server 300, together with the first personalized object. Because operations S2410 and S2420 respectively correspond to operations S2115 and S2120 of FIG. 21, details thereof are not provided.

In operation S2430, the second display device 200 may generate the second personalized object of the second user, which corresponds to the second section of the same content reproduced by the first display device 100.

In operation S2440, the second display device 200 may transmit the second personalized object corresponding to the second section of the content to the server 300. The second display device 200 may transmit the ID information (for example, the account information) of the second user to the server 300, together with the second personalized object. Because operations S2430 and S2440 respectively correspond to operations S2135 and S2140 of FIG. 21, details thereof are not provided.

In operation S2450, the server 300 may analyze a relationship between the first and second users by using the ID information of the first and second users. The server 300 may determine whether the ID information of the first user and the DI information of the second users are connected to each other. For example, the server 300 may compare the account information of the first user and the account information of the second user stored in a social media information DB, thereby determining whether the first and second users are social friends connected via social media.

In operation S2460, when the first and second users are social friends, the server 300 may generate a combined object by combining the first and second personalized objects. For example, when the first personalized object is for reproducing the first section of the content and the second personalized object is for reproducing the second section of the content, the server 300 may generate the combined object for reproducing the first and second sections of the content.

According to an exemplary embodiment, the combined object may include information about an image including the first or second section, the link information of the content, and information about the first and second sections of the content, but is not limited thereto.

In operations S2470 and S2480, the server 300 may transmit the combined object respectively to the first and second display devices 100 and 200.

According to an exemplary embodiment, the first or second display device 100 or 200 may display a notification window including a notification message indicating that the combined object is received.

Also, according to an exemplary embodiment, the first or second display device 100 or 200 may use the combined object to continuously reproduce the first and second sections of the content. For example, when a user selects the combined object included in a recommendation panel of the first display device 100, the first display device 100 may reproduce the first and second sections of the content using the information about the first and second sections and the link information of the content, which are included in the combined object.

Figure 25:
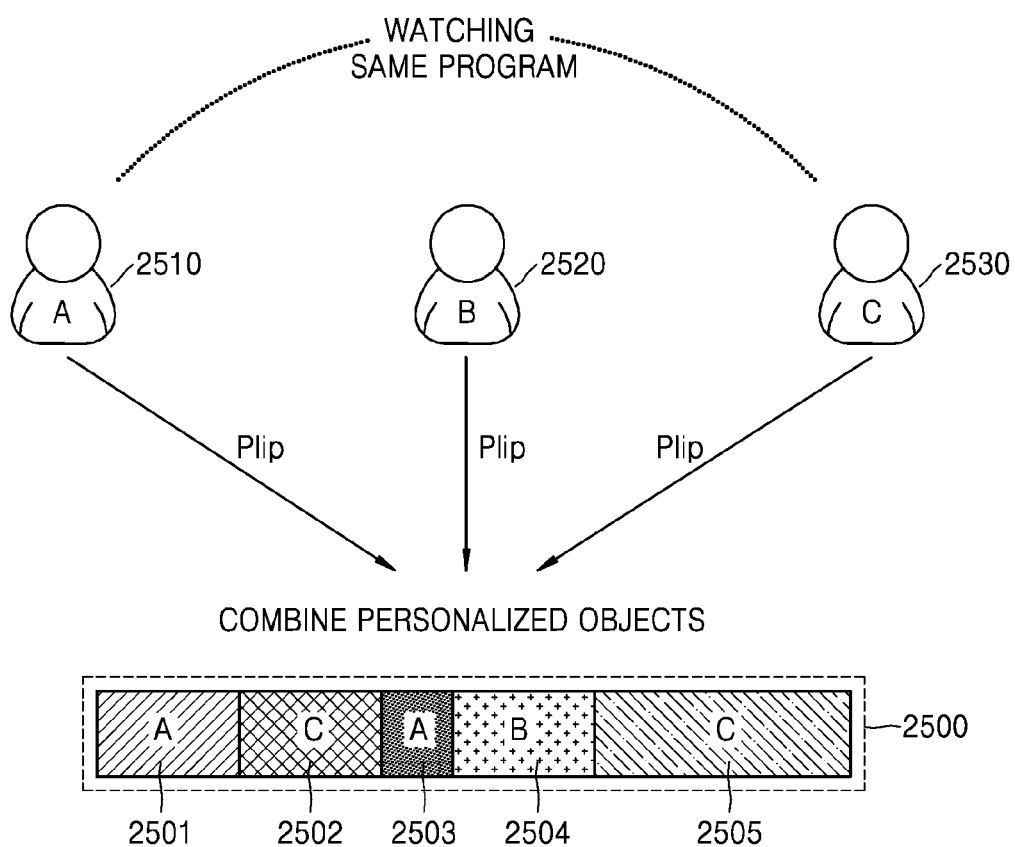
FIG. 25 is a diagram illustrating a combined object according to an exemplary embodiment.

FIG. 25 is a diagram illustrating a combined object 2500 according to an exemplary embodiment. In FIG. 25, a first user 2510, a second user 2520, and a third user 2530 are social friends.

As shown in FIG. 25, each of the first users 2510 through the third users 2530 may request his/her own display device to generate personalized objects (for example, select a plip button) regarding different sections while watching the same program. For example, the server 300 may receive a first personalized object 2501 corresponding to a first section and a third personalized object 2503 corresponding to a third section from the display device of the first user 2510, receive a fourth personalized object 2504 corresponding to a fourth section from the display device of the second user 2520, and receive a second personalized object 2502 corresponding to a second section and a fifth personalized object 2505 corresponding to a fifth section from the display device of the third user 2530.

The server 300 may determine that the first users 2510 through third users 2530 are social friends. Here, the server 300 may generate the combined object 2500 by combining the first through fifth personalized objects 2501 through 2505, which are generated by the first through third users 2510 through 2530 regarding the same program.

According to an exemplary embodiment, the server 300 may transmit the combined object 2500 for each of the display devices of the first through third users 2510 through 2530.

Figure 26:
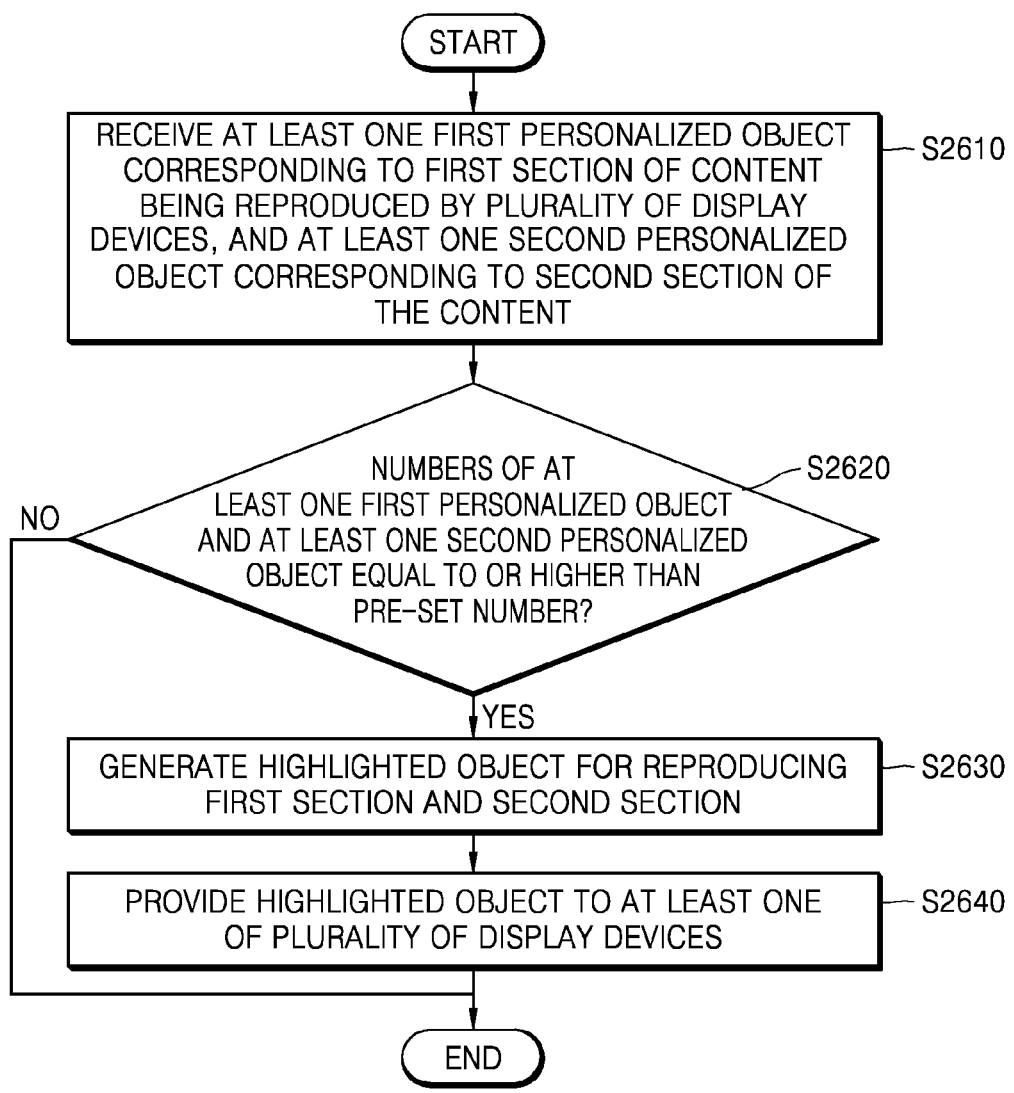
FIG. 26 is a flowchart illustrating a method of providing a highlighted object, according to an exemplary embodiment.

FIG. 26 is a flowchart illustrating a method of providing a highlighted object, according to an exemplary embodiment.

In operation S2610, the server 300 may receive a plurality of first personalized objects corresponding to a first section of a content being reproduced by a plurality of display devices, and a plurality of second personalized objects corresponding to a second section of the content, from the plurality of display devices.

In operation S2620, the server 300 may determine whether a number of the plurality of first personalized objects and the plurality of second personalized objects are each equal to or higher than a pre-set number. For example, the server 300 may determine whether the first personalized object corresponding to the first section is received from at least the pre-set number (for example, 500) of display devices. Also, the server 300 may determine whether the second personalized object corresponding to the second section is received from at least the pre-set number (for example, 500) of display devices.

In operation S2630, the server 300 may generate a highlighted object corresponding to the content for reproducing the first section and the second section based on a result of the determining. The server 300 may generate the highlighted object by combining information regarding the first personalized object corresponding to the first section and information regarding the second personalized object corresponding to the second section.

According to an exemplary embodiment, the highlighted object corresponding to the content may include information about an image (for example, a scene in which a plip input is received, an image of the at least one first personalized object, or an image of the at least one second personalized object) representing the content, link information of the content, and information about the first and second sections of the content, but is not limited thereto.

In operation S2640, the server 300 may provide the highlighted object to at least one of the plurality of display devices.

According to an exemplary embodiment, the server 300 may transmit the highlighted object to at least one of the plurality of display devices, which made a request for the highlighted object. According to another exemplary embodiment, the server 300 may transmit the highlighted object to all of the plurality of display devices that transmitted personalized objects.

Figure 27:
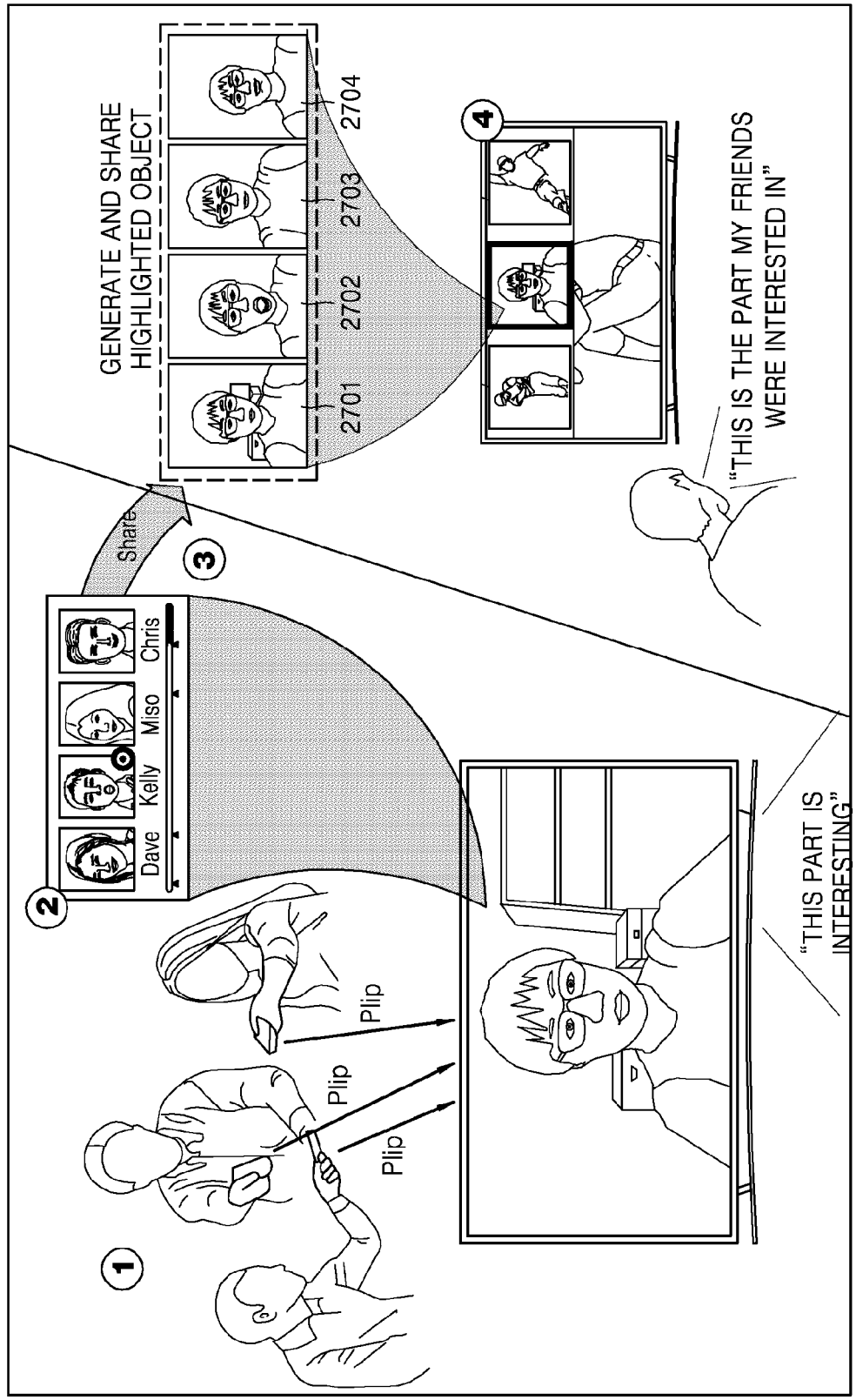
FIG. 27 is a diagram illustrating a highlighted object according to an exemplary embodiment.

FIG. 27 is a diagram illustrating a highlighted object according to an exemplary embodiment.

As shown in FIG. 27, a plurality of users may input requests (for example, plip inputs) for generating personalized objects regarding first through fifth sections while watching a program which in this example is illustrated as (operation ①). In this case, the personalized objects respectively corresponding to the first through fifth sections may be generated.

According to an exemplary embodiment, display devices of the plurality of users may each display information about social friends who have generated personal objects regarding the similar sections, according to sections (operation ②).

The server 300 may receive a plurality of first personalized objects 2701 corresponding to the first section, a plurality of second personalized objects 2702 corresponding to the second section, a plurality of third personalized objects 2703 corresponding to the third section, a plurality of fourth personalized objects 2704 corresponding to the fourth section, and a plurality of fifth personalized objects corresponding to the fifth section from the display devices of the plurality of users.

The server 300 may check at least one of the numbers of the first through fourth personalized objects 2701 through 2704 and of the plurality of fifth personalized objects received from the display devices of the plurality of users. Also, the server 300 may determine whether the numbers of the first through fourth personalized objects 2701 through 2704 and of the plurality of fifth personalized objects are each equal to or higher than a pre-set number, for example, 100.

For example, the number of the plurality of first personalized objects 2701 may be 300, the number of the plurality of second personalized objects 2702 may be 200, the number of the plurality of third personalized objects 2703 may be 230, the number of the plurality of fourth personalized objects 2704 may be 170, and the number of the plurality of fifth personalized objects may be 50.

As shown in FIG. 27, the server 300 may generate a highlighted object corresponding to the program (operation ③) using information about the first personalized object 2701, information regarding the second personalized object 2702, information regarding the third personalized object 2703, and information regarding the fourth personalized object 2704. Because the number (for example, 50) of the plurality of fifth personalized objects is lower than the pre-set number (for example, 100), information regarding the fifth personalized object may be excluded while generating the highlighted object.

The server 300 may transmit the highlighted object corresponding to the certain program to the first display device 100. In some examples, the first display device 100 may be at least one of the display devices of the plurality of users.

The first user of the first display device 100 may check the highlighted object corresponding to the certain program through the first display device 100. For example, when the first user selects the highlighted object corresponding to the certain program, the first display device 100 may continuously reproduce the first through fourth sections of the certain program (operation ④) as shown in FIG. 27.

Because the first through fourth sections are sections wherein the plurality of users frequently requested to generate personalized objects, the first user may watch the highlighted object to check sections (e.g., the first through fourth sections) in which the plurality of users are interested from an entire section of the certain program.

Hereinafter, a method of enabling, by the first display device 100, a user to easily access content via a personalized object will now be described.

Figure 28:
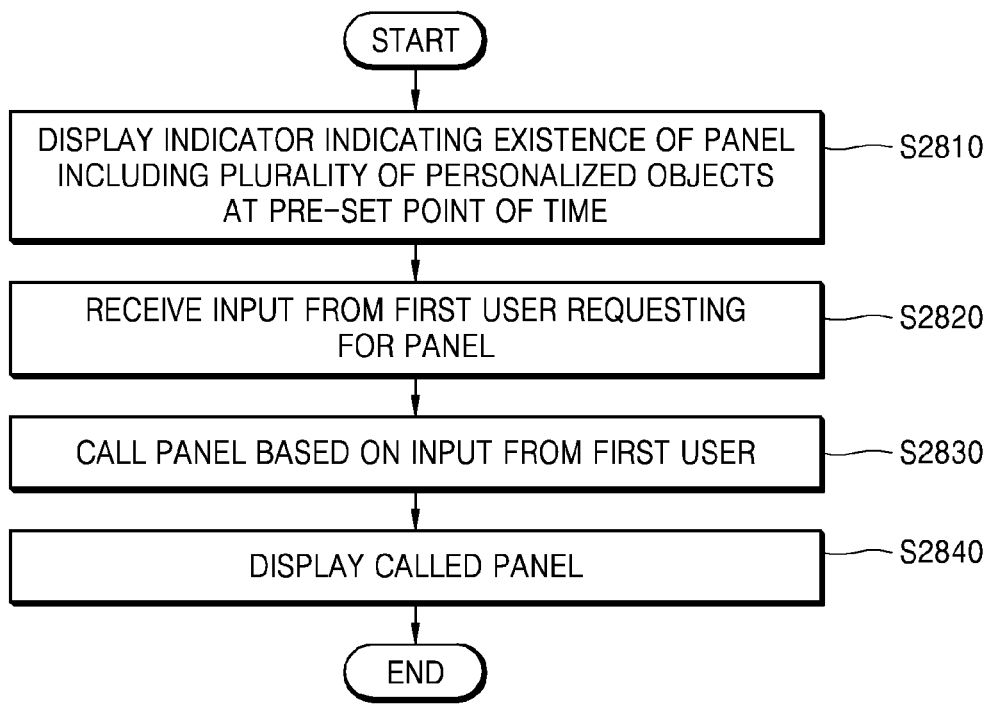
FIG. 28 is a flowchart illustrating a method of providing, by a display device, a personalized object, according to an exemplary embodiment.

FIG. 28 is a flowchart illustrating a method of providing, by a display device, a personalized object, according to an exemplary embodiment.

Referring to FIG. 28, in operation S2810, the first display device 100 may display an indicator indicating an existence of a panel including a plurality of personalized objects on a screen, at a pre-set point of time. For example, the panel may be a space in which personalized objects for reproducing a partial section of multimedia content are gathered.

According to an exemplary embodiment, the indicator may be a cue image or a handle image indicating the existence of the panel, but is not limited thereto. Also, according to an exemplary embodiment, the indicator may be displayed on one side of the screen of the first display device 100. For example, the first display device 100 may display the indicator at a certain region of a top, bottom, left, or right surface of the screen.

Meanwhile, according to an exemplary embodiment, the pre-set point of time may be a point of time when the indicator is displayed by the first display device 100, and may be a point of time when the first user does not concentrate on content provided by the first display device 100. For example, the pre-set point of time may be a point of time in which power is supplied to the first display device 100, a point of time when a zapping input is received from the first user of the first display device 100, a point of time when commercial content is reproduced by the first display device 100, and the like.

According to an exemplary embodiment, the first display device 100 may display the indicator at the point of time when power is supplied to the first display device 100. For example, the first display device 100 may display the indicator on a first screen upon receiving an input for turning on the first display device 100 from a remote controller.

According to an exemplary embodiment, the first display device 100 may display the indicator on the screen upon receiving a zapping input from the remote controller. As used herein, zapping is used to refer to a cycle through channels using, for example, a remote control. For example, the first user may change a channel while watching a broadcast program being broadcasted on a first channel. Here, the indicator may be displayed on a broadcast program broadcasted by the changed channel.

According to an exemplary embodiment, the first display device 100 may display the indicator on commercial content when a broadcast program is ended and the commercial content starts.

Alternatively, the first display device 100 may display the indicator based on gazing pattern information of the first user regarding content displayed on the screen. For example, the gazing pattern information may include at least one of gazing time information of the first user, inattentive time information of the first user, and ratio information of a gazing time and an inattentive time, but is not limited thereto.

For example, the first display device 100 may display the indicator on the screen for the first user to easily access the panel when the inattentive time of the first user regarding content reproduced by the first display device 100 exceeds a threshold time. As an example, inattentive may mean that a visual field of the first user is outside of a pre-set angle range. The first display device 100 may also determine that the first user is inattentive when the first user closes his/her eyes for at least a threshold period of time.

The first display device 100 may measure the amount of inattentive time of the first user regarding the content using a camera. For example, the first display device 100 may obtain data about eye movement of the first user via the camera, and measure the inattentive time of the first user based on the data about the eye movement. In this example, the data about the eye movement may include at least one of blinking information (for example, a blinking speed or a blinking number of times), gazing location information of eyes, moving speed information of eyes, and the like, but is not limited thereto. Then, the first display device 100 may display the indicator on the screen when the inattentive time of the first user regarding the content being reproduced on the screen exceeds the threshold time.

Meanwhile, the first display device 100 may display the indicator on the screen by determining that the first user is bored or otherwise inattentive when a blinking speed is less than or equal to a threshold speed, even when the inattentive time of the first user is less than the threshold time.

According to an exemplary embodiment, when a new personalized object is added to the panel, the first display device 100 may display the indicator displaying a number of newly added personalized objects on the panel at a pre-set point of time. An operation of displaying, by the first display device 100, update information of the panel on the indicator is described with reference to FIG. 29.

In operation S2820, the first display device 100 may receive an input from the first user requesting the panel.

According to an exemplary embodiment, the input from the first user requesting the panel may vary. For example, the input may be an input of touching (for example, a tap, double tap, or touch and hold) the indicator, an input of touching and dragging the indicator, an input of selecting a certain button, an input of pressing the certain button for at least a certain period of time, or a pre-set voice input for requesting the panel, but is not limited thereto. The certain button may be a button included in a remote controller or in the first display device 100.

In operation S2830, the first display device 100 may call the panel based on the input from the first user. Then, in operation S2840, in response to the first display device 100 may display the called panel on the screen.

According to an exemplary embodiment, the first display device 100 may display the panel of on an entire or partial region of the screen. Alternatively, the first display device 100 may display the panel on a broadcast program being reproduced. Here, the first display device 100 may dimly display the broadcast program being reproduced.

According to an exemplary embodiment, when personalized objects are stored in an internal memory, the first display device 100 may extract the personalized objects from the internal memory and may provide a list of the extracted personalized objects through the panel.

Alternatively, when a plurality of personalized objects are stored in the server 300, the first display device 100 may request the server 300 for a list of the plurality of personalized objects. For example, the first display device may transmit information (for example, account information) about the first user of the first display device 100 to the server 300. Then, the first display device 100 may receive the list of the plurality of personalized objects from the server 300, and display the list on the panel.

For example, the first display device 100 may display a thumbnail image corresponding to each of the plurality of personalized objects on the panel. Thumbnail images are images having a smaller size for distinguishing the personalized objects, and may be generated using an image displayed on the screen at a point of time when a plip input is received or a representative image of the content.

According to an exemplary embodiment, the thumbnail images respectively corresponding to the plurality of personalized objects may be arranged in an order that the personalized objects are generated, but an order of arranging the thumbnail images is not limited thereto. For example, the thumbnail images may be arranged based on, lengths, sizes, reproduction times, and the like, of partial sections of contents corresponding to the personalized objects, intimacies between a social friend and a user, popularities of contents, and ratings of content, and the like.

According to an exemplary embodiment, the panel may include at least one of a first tab for providing a list of personalized objects related to a broadcast program being reproduced by the first display device 100, a second tab for providing a list of personalized objects generated by the first user, and a third tab for providing a list of personalized objects generated by the second user connected to the first user. An example of the panel that includes the first through third tabs is described in with reference to FIG. 33.

According to an exemplary embodiment, the first display device 100 may select a personalized object from a list of a plurality of personalized objects based on a user input. For example, the first display device 100 may receive an input for controlling a location of a pointer from a remote controller and change the location of the pointer based on the control input. If the pointer is positioned on a thumbnail image of a first personalized object from among a plurality of thumbnail images, the first display device 100 may select the first personalized object from the list of the plurality of personalized objects. The pointer is a cursor for indicating a selected or focused object (or region), and an object (or region) in which the pointer is positioned may be displayed with a thicker border or in a different color.

According to an exemplary embodiment, the first display device 100 may reproduce a partial section (hereinafter, for convenience of description, also referred to as a 'personalized object video' or a 'plip video') of content corresponding to a selected personalized object.

For example, when a point is positioned on a thumbnail image of a first personalized object from among a plurality of thumbnail images for at least a certain period of time, the first display device 100 may reproduce a first section of content corresponding to the first personalized object, for example, a first personalized object video or a first plip video. Here, the first display device 100 may reproduce the first section in an area in which the thumbnail image of the first personalized object is displayed or on an entire region of a screen.

Meanwhile, a user may check the first personalized object video and then request the first display device 100 to display the entire content related to the first personalized object. In this example, when the entire content related to the first personalized object is a real-time broadcast program, the first display device 100 may provide the real-time broadcast program by moving to a channel for reproducing the real-time broadcast program. Alternatively, when the entire content related to the first personalized object is VOD content, the first display device 100 may call and display a VOD purchasing page. An example of an operation of reproducing, by the first display device 100, an entire section of content related to a personalized object is described with reference to FIG. 40.

According to an exemplary embodiment, the first display device 100 may display, on a screen, an indicator for using a panel when a user is bored, inattentive, or searching for a new program while watching a broadcast program, thereby providing, to the user, an opportunity to search for new content through personalized objects included in the panel.

The first display device 100 may display an indicator indicating an existence of a panel at a pre-set point of time so that the indicator does not interfere with in a broadcast program that a user is watching.

Figure 29:
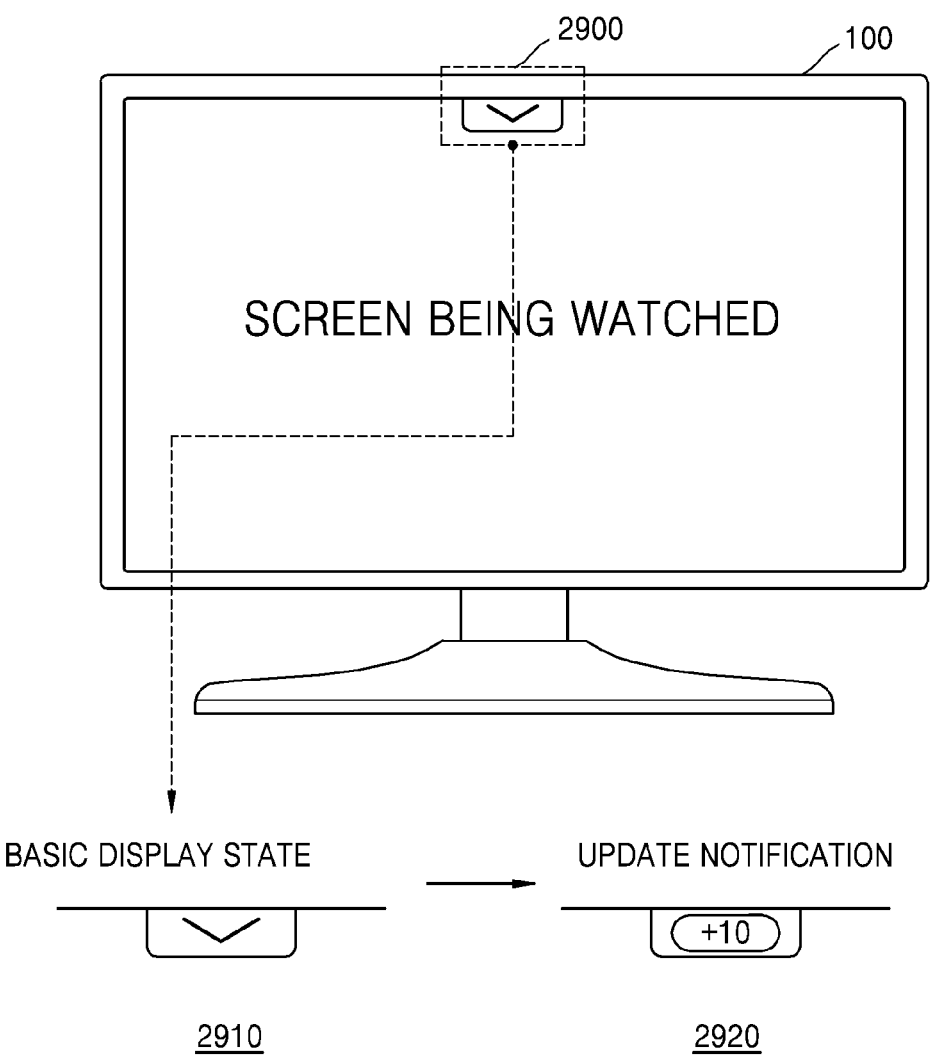
FIG. 29 is a diagram illustrating an example of displaying, by a display device, an indicator that indicates the existence of a panel, according to an exemplary embodiment.

FIG. 29 is a diagram Illustrating an example of displaying, by the first display device 100, an indicator 2900 that indicates an existence of a panel, according to an exemplary embodiment.

Referring to FIG. 29, the first display device 100 may display, on a screen, the indicator 2900 indicating the existence of the panel at a pre-set point of time. For example, the first display device 100 may display the indicator 2900 at a top of the screen while a zapping input is received from a user or when commercial content begins.

According to an exemplary embodiment, the first display device 100 may display the indicator 2900 in a form of a first image 2910. When a new personalized object is added to the panel, the first display device 100 may display the indicator 2900 in a form of a second image 2920 including update information. For example, when ten personalized objects are added to the panel, the first display device 100 may display the indicator 2900 in the form of a second image 2920 including the number (for example, '+10') of the added personalized objects.

According to an exemplary embodiment, when an input requesting the panel is not received during at least a pre-set period of time (for example, 3 minutes) from a point of time when the indicator 2900 is displayed, the first display device 100 may no longer display the indicator 2900.

On the other hand, when the input for requesting the panel is received within the pre-set period of time from the point of time when the indicator 2900 is received, the first display device 100 may call and display the panel. An example of calling, by the first display device 100, the panel is described with reference to FIG. 30.

Figure 30:
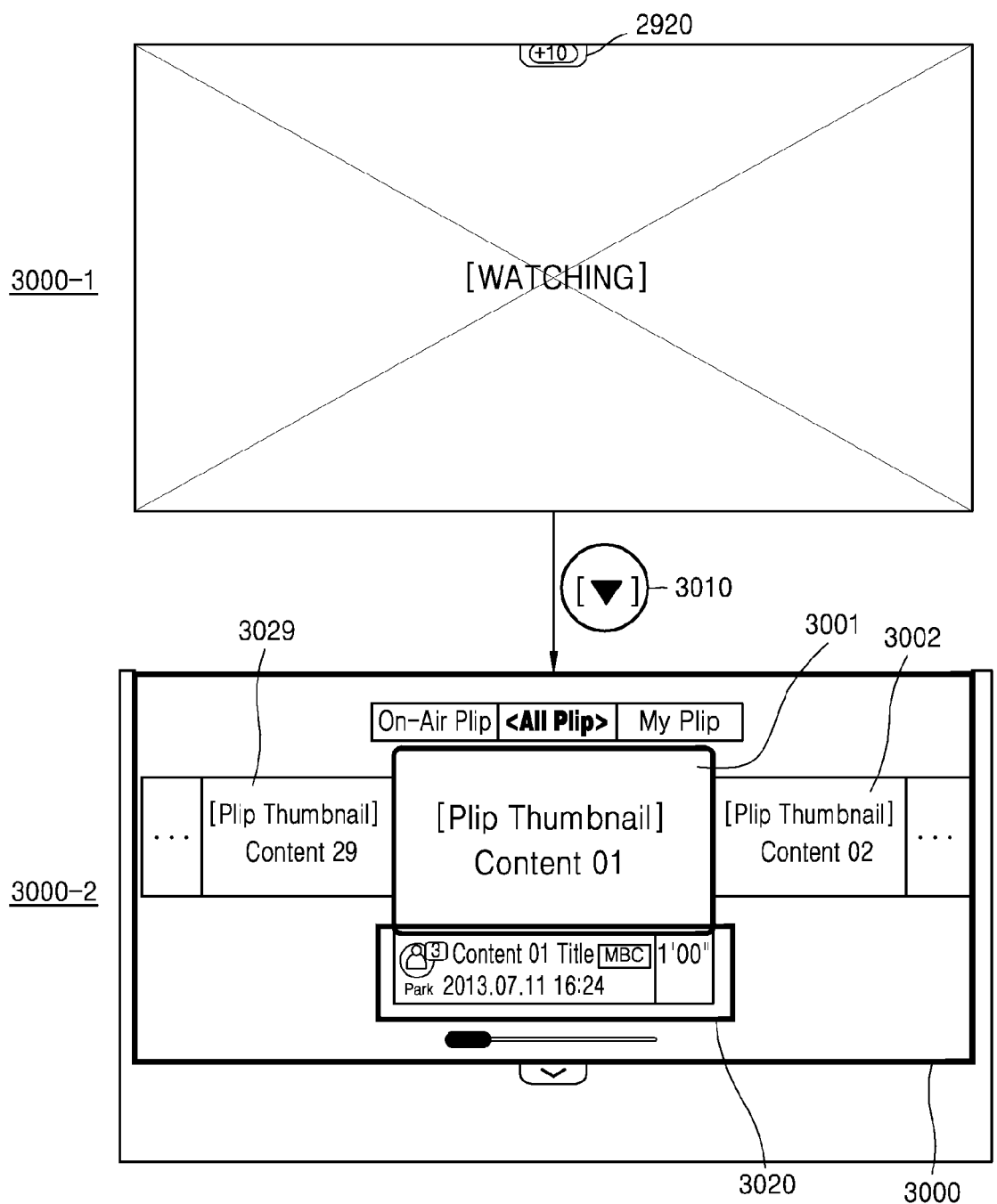
FIG. 30 is a diagram illustrating an example of displaying, by a display device, a panel including a plurality of personalized objects, according to an exemplary embodiment.

FIG. 30 is a diagram illustrating an example of displaying, by the first display device 100, a panel 3000 including a plurality of personalized objects, according to an exemplary embodiment.

Referring to a first screen 3000-1 of FIG. 30, the first display device 100 may display multimedia content. When a pre-set point of time occurs while displaying the multimedia content, the first display device 100 may display the indicator 2900 indicating an existence of the panel 3000 on a screen in which the multimedia content is displayed. For example, the multimedia content may be real-time broadcasting content, VOD content, content recorded by a user, or content stored in an external storage device.

When ten new personalized objects that are not checked by the user are added to the panel 3000, the first display device 100 may display an indicator 2900 in the form of the second image 2920 including the number (for example, '+10') of the new personalized objects added to the panel 3000.

The user may check the indicator 2900 and input a control command which may be used for calling the panel 3000. For example, the user may select a down key (▼) 3010 included in a remote controller. In this case, the first display device 100 may receive an input of selecting the down key 3010 as a panel requesting input.

Referring to a second screen 3000-2 of FIG. 30, the first display device 100 may call and display the panel 3000 in response to the panel requesting input. According to an exemplary embodiment, the first display device 100 may display the panel 3000 such that the panel is in an opaque state or in a semi-transparent state, or in other words, such that the panel does not completely block the display of content disposed underneath.

Meanwhile, the first display device 100 may display the panel 3000 on an entire region or partial region of the screen. When the panel 3000 is displayed on the partial region of the screen, the first display device 100 may dimly display the multimedia content that is being displayed on the entire region of the screen as a background of the panel 3000.

According to an exemplary embodiment, the panel 3000 may include a list of a plurality of personalized objects. For example, the first display device 100 may display a plurality of thumbnail images respectively corresponding to the plurality of personalized objects, on the panel 3000. For example, the panel 3000 may display a first thumbnail image 3001 corresponding to a first personalized object for reproducing a partial section of first content through a 29$^{th}$ thumbnail image 3029 corresponding to a 29$^{th}$ personalized object for reproducing a partial section of 29$^{th}$ content.

Meanwhile, according to an exemplary embodiment, the first display device 100 may display information about a personalized object corresponding to a thumbnail image that is below the thumbnail image. For example, the information about a personalized object may include channel information, a program title (content title), information about a time at which the personalized object is generated, information about a section length of the personalized object (for example, information about a reproduction time of a plip video), a name of a friend who generated a personalized object regarding the same or overlapping section, a profile image of the friend, a broadcasting company logo, and the like.

For example, the first display device 100 may display information 3020 about the first personalized object below the first thumbnail image 3001 corresponding to the first personalized object. For example, the information 3020 may include a program title (for example, 'content 01 Title'), information about a time when the first personalized object is generated (for example, '2013.07.11 16:24'), information about length of a first personalized object video (for example, '1'00"'), a number of friends who generated personalized objects regarding a second section that is the same or overlaps the first section corresponding to the first personalized object (for example, '+3'), an identifier of a representative friend from among the friends (for example, 'Park'), a profile image of the representative friend, and a broadcasting company logo (for example, 'MBC'). In some exemplary embodiments, the representative friend may be determined based on an intimacy between the user and each of the friends who generated the personalized objects regarding the second section.

According to an exemplary embodiment, the first display device 100 may display the list of the plurality of personalized objects on the panel 3000 in an order in which the plurality of personalized objects are generated. For example, if the first personalized object is most recently generated, the second personalized object is generated immediately before the first personalized object is generated, and the 29$^{th}$ personalized object is the earliest generated object, the first display device 100 may display the first thumbnail image 3001 of the first personalized object at the center of the panel 3000 and the second thumbnail image 3002 of the second personalized object at the right of the first thumbnail image 3001. Also, the first display device 100 may display the 29th thumbnail image 3029 of the 29th personalized object at the left of the first thumbnail image 3001.

In FIGS. 29 and 30, the indicator 2900 is displayed at the top of the screen, but a location of the indicator 2900 is not limited thereto.

Figure 31:
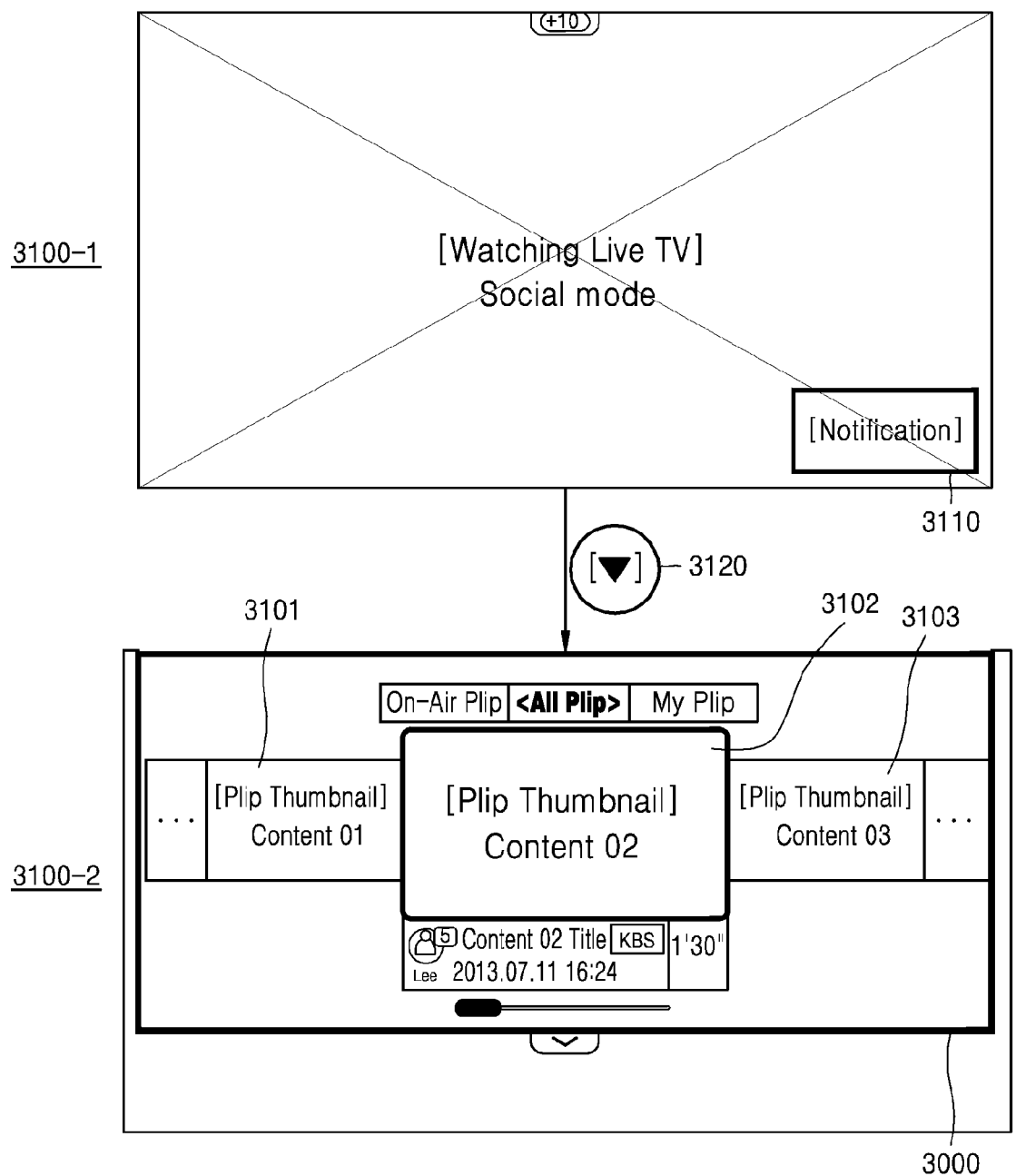
FIG. 31 is a diagram illustrating an example of calling, by a display device, a panel through a notification window, according to an exemplary embodiment.

FIG. 31 is a diagram illustrating an example of calling, by the first display device 100, the panel 3000 through a notification window 3110, according to an exemplary embodiment.

Referring to FIG. 31, in a first screen 3100-1 of FIG. 31, the first display device 100 may receive a notification message while displaying real-time broadcasting content. For example, the first display device 100 may receive a message indicating that the second personalized object generated by the second display device 200 of the second user connected to the first user is shared. In this example, the first display device 100 may display the notification window 3110 indicating that the second personalized object is shared on the real-time broadcasting content.

According to an exemplary embodiment, the notification window 3110 may be displayed in the form of a pop-up window, but is not limited thereto. Because examples of an operation of displaying, by the first display device 100, the notification window 3110 has been described above with reference to FIGS. 16 and 17, details thereof are not provided again.

The first user may check the notification window 3110 and input a control command for calling the panel 3000 to the first display device 100. For example, the first user may select a down key (▼) 3120 included in a remote controller.

Referring to a second screen 3100-2 of FIG. 31, the first display device 100 may call and display the panel 3000 in response to an input of selecting the down key 3120. Because the second screen 3100-2 of FIG. 31 corresponds to the second screen 3000-2 of FIG. 30, details thereof are not provided.

In FIGS. 30 and 31, an input of selecting the down key 3010 or 3020 included in the remote controller is used as an input for calling the panel 3000, but the input of calling the panel 3000 is not limited thereto.

Figure 32:
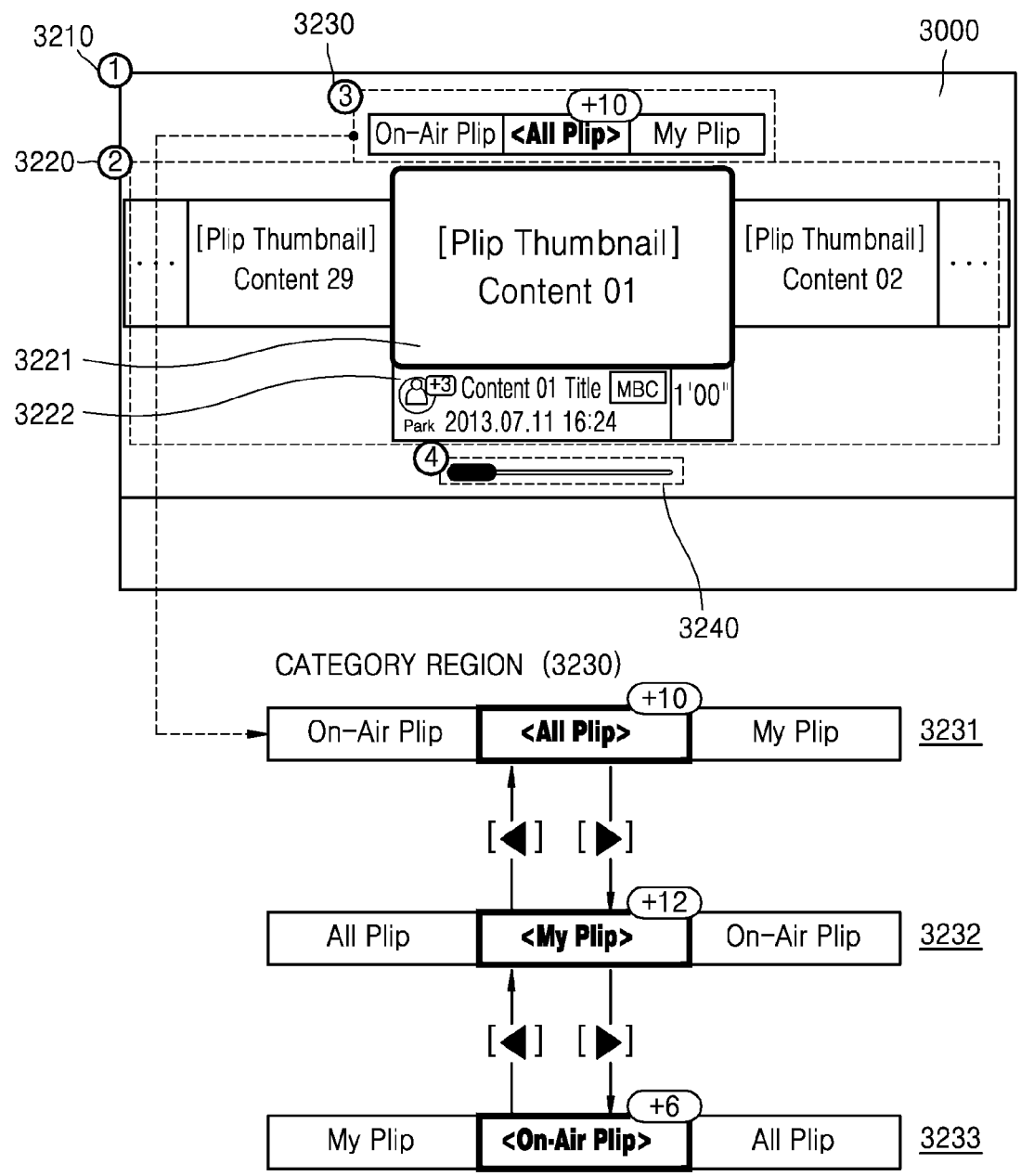
FIG. 32 is a diagram illustrating a panel including a plurality of personalized objects, according to an exemplary embodiment.

FIG. 32 is a diagram illustrating the panel 3000 including a plurality of personalized objects, according to an exemplary embodiment.

Referring to FIG. 32, a screen displaying the panel 3000 may include a background region 3210, a personalized object displaying region 3220, a category region 3230, and a navigation region 3240.

According to an exemplary embodiment, multimedia content that is being watched by the first user may be dimly displayed in the background region 3210, and the panel 3000 may be more clearly displayed in the background region 3210.

According to an exemplary embodiment, a thumbnail image 3221 corresponding to a personalized object and information 3222 about the personalized object may be displayed in the personalized object displaying region 3220. For example, the information about the personalized object may include channel information, a program title (content title), information about a time at which the personalized object is generated, information about a section length of the personalized object (for example, information about a reproduction time of a plip video), information about a friend who generated the same or similar personalized object, a profile image of the friend, and a broadcasting company logo, but is not limited thereto.

Meanwhile, according to an exemplary embodiment, when the panel 3000 is called and displayed, a pointer may be positioned on the thumbnail image 3221 at the center of the panel 3000. While the pointer is positioned on the thumbnail image 3221 for at least a pre-set period of time (for example, at least 3 seconds), a first personalized object video may be reproduced in a thumbnail region in which the thumbnail image 3221 is displayed. For example, the first display device 100 may reproduce a first section of content, which corresponds to the first personalized object, in the thumbnail region.

Also, according to an exemplary embodiment, when the first user selects a certain button (for example, an OK button) of a remote controller while the pointer is positioned on the thumbnail image 3221 such as at the center of the panel 3000, the first display device 100 may enlarge the thumbnail image 3221 to encompass an entire screen and reproduce the first personalized object video on the entire screen.

For example, a thumbnail image of at least one of personalized objects generated by the first user, personalized objects generated by social friends of the first user, a combined object, and a highlighted object may be displayed in the personalized object displaying region 3220.

For example, at least one of a first tab (for example, an 'On-Air Plip' tab) 3233 for providing a list of personalized objects related to a broadcast program being reproduced by the first display device 100, a second tab (for example, a 'My Plip' tab) 3232 for providing a list of personalized objects generated by the first user, and a third tab (for example, an 'All Plip' tab) 3231 for providing a list of all personalized objects including personalized objects generated by the second user connected to the first user may be displayed in the category region 3230. The category region 3230 will be described in detail later with reference to FIG. 33.

The navigation region 3240 may provide information about a location of a personalized object on which the pointer is currently positioned from among the plurality of personalized objects via a navigation bar. For example, when the pointer positioned on a thumbnail image of the first personalized object moves to a thumbnail image of the second personalized object, the first display device 100 may display a button on the navigation bar after moving the button one box to the right.

Figure 33:
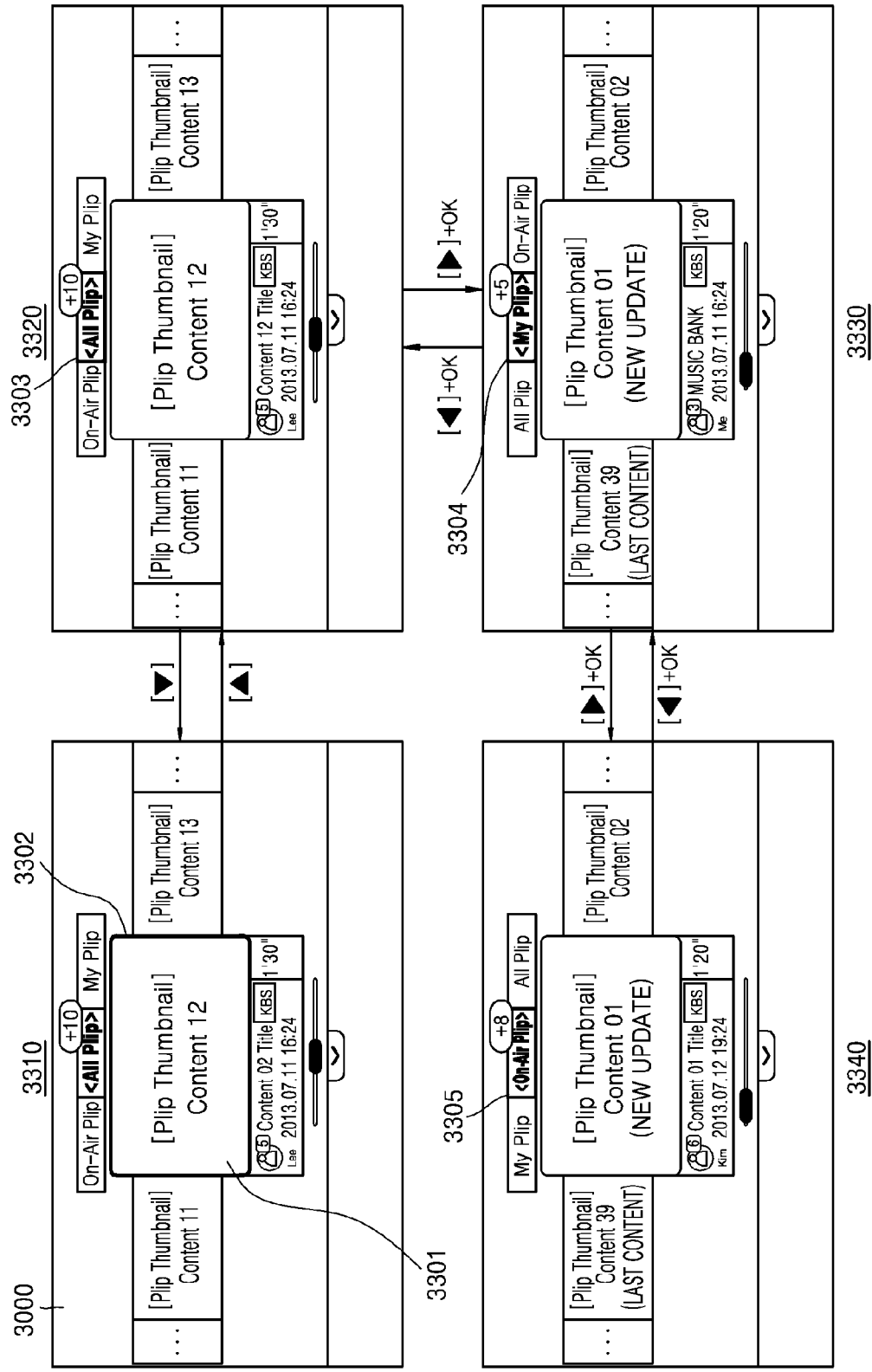
FIG. 33 is a diagram illustrating an example of changing, by a panel, categories for classifying a plurality of personalized objects, according to an exemplary embodiment.

FIG. 33 is a diagram illustrating an example of changing, by the panel 3000, categories for classifying a plurality of personalized objects, according to an exemplary embodiment.

Referring to a first screen 3310 of FIG. 33, when the panel 3000 is called and displayed, a pointer may be positioned on a thumbnail image 3301 at the center of the panel 3000. Here, when the pointer is positioned on the thumbnail image 3301 for at least a certain period of time (for example, 3 seconds), the first display device 100 may reproduce a personalized object video corresponding to $12^{th}$ content in a thumbnail region 3302.

According to an exemplary embodiment, the first display device 100 may move the pointer from the thumbnail region 3302 to a category region based on a user input. For example, the first display device 100 may receive an input of moving a direction key (for example, ▲) from a remote controller.

Referring to a second screen 3320 of FIG. 33, the first display device 100 may locate the pointer on an 'All Plip' tab 3303 for providing a list of all personalized objects.

As an example, when the 'All Plip' tab 3303 is selected (for example, when the first user selects an 'OK' key in the remote controller), the first display device 100 may display the list of all personalized objects. For example, the first display device 100 may provide thumbnail images of all personalized objects including those personalized objects generated by the first user and personalized objects generated by the second user connected to the first user, through the panel 3000.

According to an exemplary embodiment, the first display device 100 may align the personalized objects based on an order in which the personalized objects are generated, an order of lengths (or sizes or reproduction times) of personalized object videos, an order of intimacies with social friends, an order of popularity of the all personalized objects, an order of ratings of contents, and the like.

According to an exemplary embodiment, when the 'All Plip' tab 3303 is selected (for example, when the 'OK' key is selected from the remote controller), the first display device 100 may display a number of personalized objects (for example, '+10') updated to the panel 3000, on a region of the 'All Plip' tab 3303.

Meanwhile, the first display device 100 may receive an input of selecting a left or right direction key while the pointer is positioned on the 'All Plip' tab 3303 in the category region. In this example, the pointer may be positioned on a 'My Plip' tab 3304 or an 'On-Air Plip' tab 3305.

Referring to a third screen 3330 of FIG. 33, when an input for selecting a right direction key (▶) is received while the pointer is positioned on the 'All Plip' tab 3303, the first display device 100 may locate the pointer on the 'My Plip' tab 3304. Alternatively, when an input for selecting a left direction key (◀) is received while the pointer is positioned on the 'My Plip' tab 3304, the first display device 100 may locate the pointer on the 'All Plip' tab 3303.

According to an exemplary embodiment, when an input of selecting the 'OK' key is received while the pointer is positioned on the 'My Plip' tab 3304, the first display device 100 may provide the list of personalized objects generated by the first user through the panel 3000. In this example, the first display device 100 may arrange the list of the personalized objects generated by the first user based on an order of the personalized objects are generated, an order of lengths (or sizes or reproduction times) of personalized object videos, an order of popularities of the personalized objects, an order of ratings of contents, and the like.

According to an exemplary embodiment, when an input of selecting the 'OK' key is received while the pointer is positioned on the 'My Plip' tab 3304, the first display device 100 may display a number (for example, '+5') of personalized objects that are newly generated by the first user in a region of the 'My Plip' tab 3304.

Referring to a fourth screen 3304 of FIG. 33, when an input for selecting the right direction key is selected while the pointer is positioned on the 'My Plip' tab 3304, the first display device 100 may locate the pointer on the 'On-Air Plip' tab 3305. Alternatively, when an input selecting the left direction key is selected while the pointer is positioned on the 'On-Air Plip' tab 3305, the first display device 100 may locate the pointer on the 'My Plip' tab 3304.

According to an exemplary embodiment, when an input selecting the 'OK' key is received while the pointer is positioned on the 'On-Air Plip' tab 3305, the first display device 100 may provide a list of personalized objects related to a broadcast program that is currently being reproduced by the first display device 100, through the panel 3000. In this example, the first display device 100 may align the list of the personalized objects related to the broadcast program currently reproduced based on an order the personalized objects are generated, an order of lengths (or sizes or reproduction times) of personalized object videos, an order of intimacies with social friends, or an order of popularities of the personalized objects.

According to an exemplary embodiment, when an input of selecting the 'OK' key is received while the pointer is positioned on the 'On-Air Plip' tab 3305, the first display device 100 may display a number (for example, '+8') of personalized objects newly added with respect to the broadcast program currently reproduced, on a region of the 'On-Air Plip' tab 3305.

Figure 34:
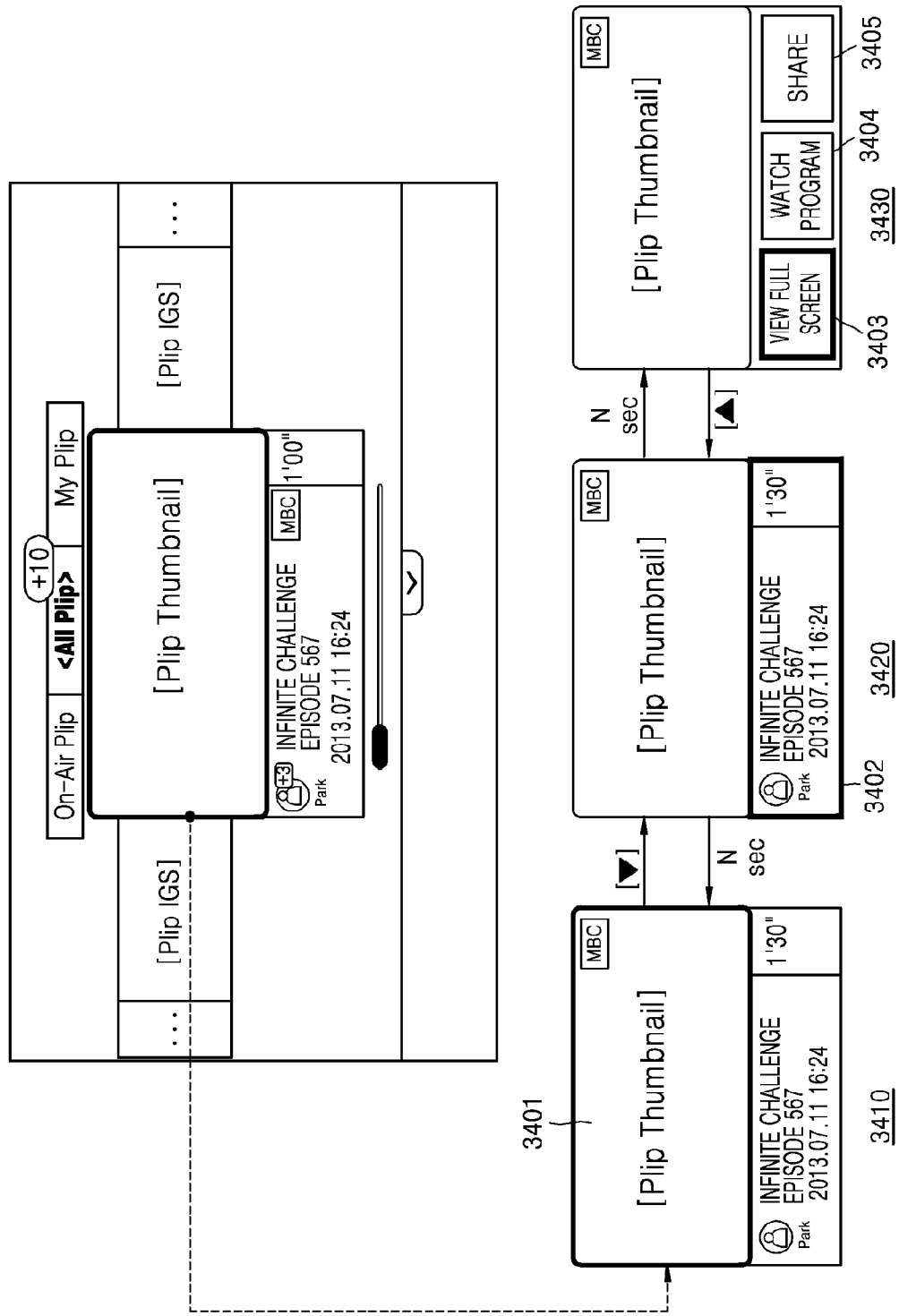
FIG. 34 is a diagram illustrating an example of providing, by a display device, a menu list corresponding to a personalized object, according to an exemplary embodiment.

FIG. 34 is a diagram illustrating an example of providing, by the first display device 100, a menu list corresponding to a personalized object, according to an exemplary embodiment.

Referring to a reference numeral 3410 of FIG. 34, when the panel 3000 is called and displayed, a pointer may be positioned on a first region 3401 in which a thumbnail of a first personalized object located at the center of the panel 3000 is displayed.

Referring to a reference numeral 3420 of FIG. 34, the first display device 100 may move the pointer from the first region 3401 to a second region 3402 in which information about the first personalized object is displayed according to a user input. For example, the first display device 100 may receive an input of selecting a direction key (for example, ▼) from a remote controller. At this time, the first display device 100 may move the pointer positioned on the first region 3401 at which the thumbnail image is displayed to the second region 3402 where the information about the first personalized object is displayed.

Referring to a reference numeral 3430 of FIG. 34, when the pointer is positioned on the second region 3402, the first display device 100 may display a menu list in the second region 3402 instead of the information about the first personalized object.

For example, the first display device 100 may display a menu list including 'View Full Screen' 3403, 'Watch Program' 3404, and 'Share' 3405. In this example, the first display device 100 may locate the pointer on the 'View Full Screen' 3403 from the menu list. Also, the first display device 100 may move the pointer from the 'View Full Screen' 3403 to the 'Watch Program' 3404 or the 'Share' 3405 based on an input of a left or right direction key. Examples of activating, by the first display device 100, a function corresponding to each of the 'View Full Screen' 3403, the 'Watch Program' 3404, and the 'Share' 3405 are described with reference to FIGS. 36, 40, and 41.

Figure 35:
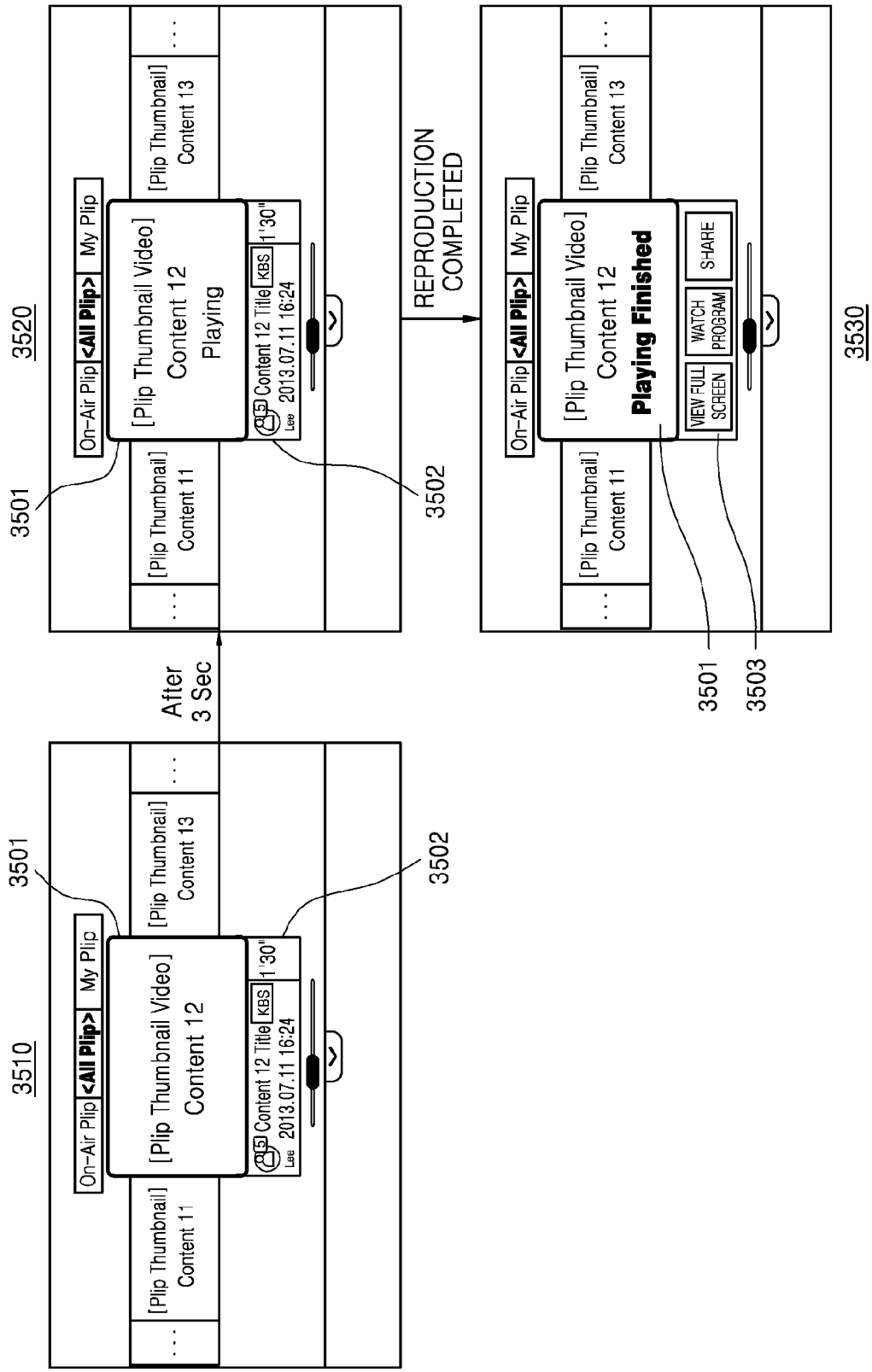
FIG. 35 is a diagram illustrating an example of providing, by a display device, a menu list after the reproducing of a personalized object video (a partial section) is completed, according to an exemplary embodiment.

FIG. 35 is a diagram illustrating an example of providing, by the first display device 100, a menu list after reproducing of a personalized object video (a partial section) is completed, according to an exemplary embodiment.

Referring to a first screen 3510 of FIG. 35, the first display device 100 may call and display the panel 3000. In this example, a pointer may be positioned on a thumbnail image 3501 of a $12^{th}$ personalized object related to $12^{th}$ content. Information 3502 about the $12^{th}$ personalized object may be displayed at the bottom of the thumbnail image 3501. For example, a title of the $12^{th}$ content, channel information (for example, KBS), information about a time at which the $12^{th}$ personalized object is generated (for example, 2013.07.11 16:24), a length of a $12^{th}$ personalized object video (for example, 1 min. 30 sec.), and information about a person who generated the $12^{th}$ personalized object, may be displayed at the bottom of the thumbnail image 3501.

Referring to a second screen 3520 of FIG. 35, in this example, when the pointer is positioned on the thumbnail image 3501 for at least a certain period of time (for example, 3 seconds), the first display device 100 may reproduce the $12^{th}$ personalized object video (for example, a video of a partial section of the $12^{th}$ content) on a thumbnail region.

Referring to a third screen 3530 of FIG. 35, when the reproducing of the $12^{th}$ personalized object video (for example, the video of the partial section of the $12^{th}$ content) on the thumbnail region is completed, the first display device 100 may display a menu list 3503 at the bottom of the thumbnail image 3501, instead of the information 3502. In this example, the menu list 3503 may include 'View Full Screen', 'Watch Program', and 'Share'.

FIG. 36 is a diagram illustrating an example of reproducing, by the first display device 100, a personalized object video on a full screen, according to an exemplary embodiment.

Referring to a first screen 3610 of FIG. 36, the first display device 100 may receive an input for selecting 'View Full Screen' 3601 from a menu list. For example, the first display device 100 may receive an input for selecting a check button (for example, 'OK') while a pointer is positioned on the 'View Full Screen' 3601' from the menu list.

Referring to a second screen 3620 of FIG. 36, the first display device 100 may reproduce a personalized object video such as a plip video, for example, a first section of content (Daddy, Where are We Going?) on a full screen, in response to the input of selecting the 'View Full Screen' 3601. In this example, the first display device 100 may display information about the personalized object video (for example, a program title (Daddy, Where are We Going?), channel information (MBC), and a time at which a personalized object is generated (2013.07.11 12:24)) on a certain region.

Also, the first display device 100 may display a list 3602 of social friends that are related to the personalized object video. Here, the social friends related to the personalized object video may be friends who generated personalized objects for reproducing a second section that at least partially or entirely overlaps the first section of the content.

According to an exemplary embodiment, the social friends that are related to the personalized object video may be aligned based on intimacy. For example, the intimacy may be calculated based on a number of times the same or similar personalized objects are generated. For example, when a first user and a first friend f1 generate ten of the same personalized objects and the first user and a second friend f2 generate seven of the same personalized objects, intimacy with the first friend f1 may be higher than that with the second friend f2.

According to an exemplary embodiment, when a certain period of time (for example, 10 seconds) is passed after the 'View Full Screen' 3601 is selected, the information about the personalized object video and the list 3602 may disappear from the screen.

Figure 37:
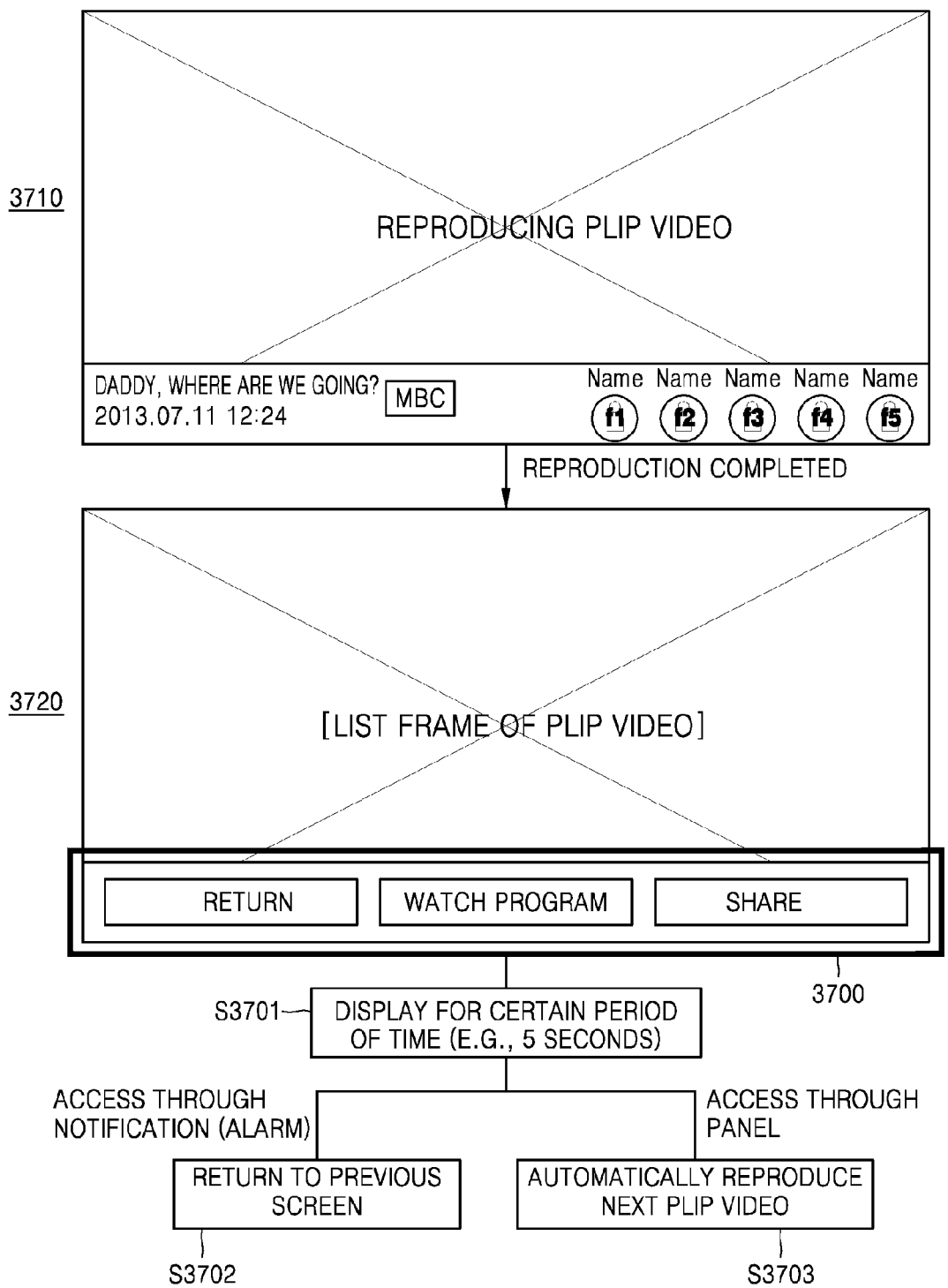
FIG. 37 is a diagram illustrating a function performed by a display device after reproducing of a personalized object video is completed, according to an exemplary embodiment.

FIG. 37 is a diagram illustrating a function performed by the first display device 100 after reproducing of a personalized object video is completed, according to an exemplary embodiment.

Referring to a first screen 3710 of FIG. 37, the personalized object video (plip video, for example, a first section of content (Daddy, Where are We Going?) may be reproduced on a full screen.

Referring to a second screen 3720 of FIG. 37, after reproducing of the personalized object video is completed, the first display device 100 may display a last frame of the personalized object video. Then, the first display device 100 may display a menu list 3700 at the bottom of the last frame of the personalized object video. For example, the menu list 3700 may include 'Return', 'Watch Program', and 'Share'.

According to an exemplary embodiment, the first display device 100 may display the menu list 3700 for a certain period of time (for example, 5 seconds), in operation S3701. When a user input is not received after a certain period of time (for example, 5 seconds), the first display device 100 may return to a previous screen in operation S3702 or reproduce a next personalized object video in operation S3703, based on an access path of the personalized object video.

For example, when a user accessed the personalized object video via a notification window and the certain period of time has passed after the reproducing of the personalized object video is completed, the first display device 100 may re-display a broadcast program that was watched by the user before the personalized object video.

As another example, when the user accessed the personalized object video via a panel and the certain period of time has passed after the reproducing of the personalized object video is completed, the first display device 100 may automatically reproduce the next personalized object video.

Figure 38:
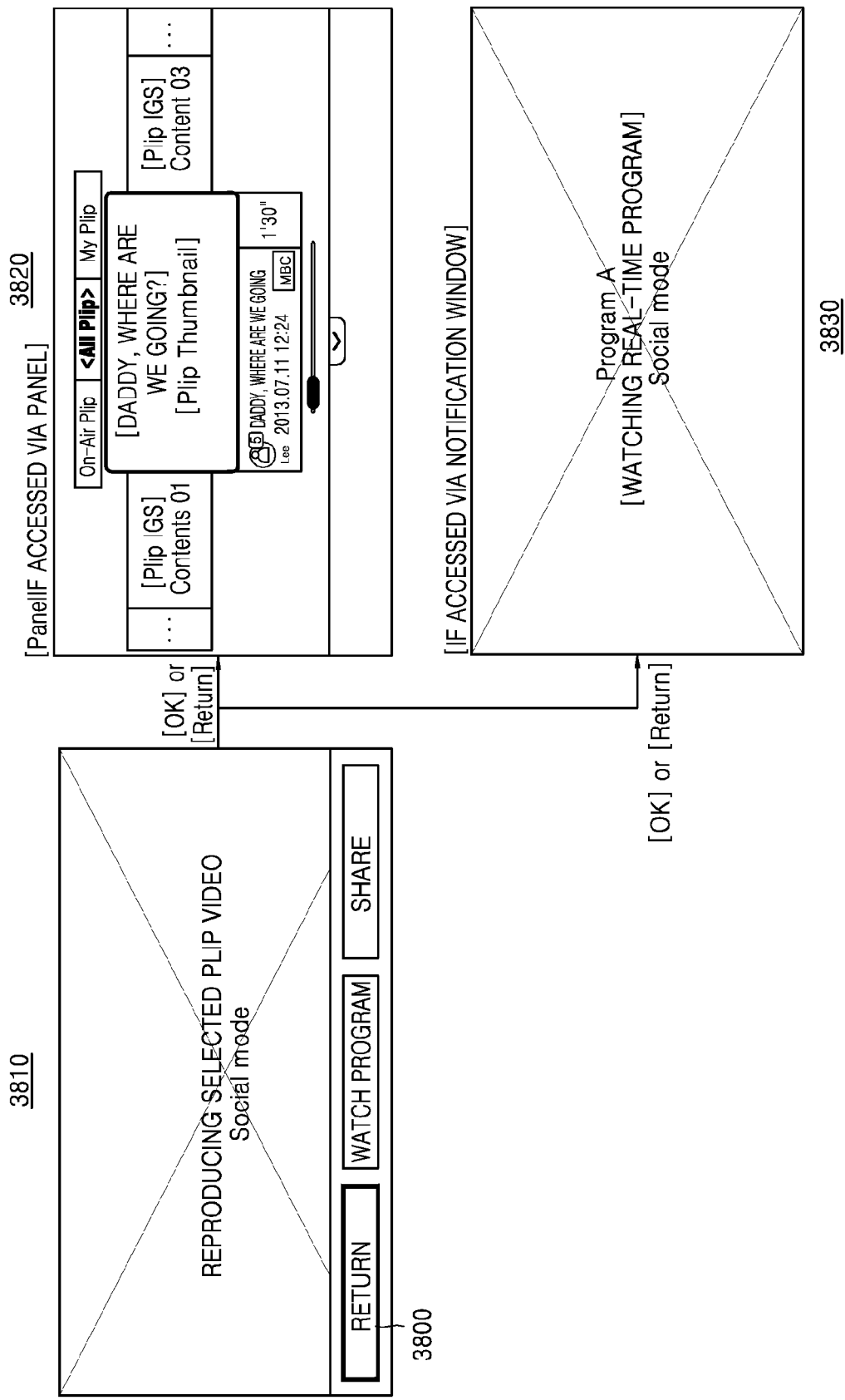
FIG. 38 is a diagram illustrating an operation of switching, by a display device, a screen that is reproducing a personalized object video to a previous screen, according to an exemplary embodiment.

FIG. 38 is a diagram illustrating an operation of switching, by the first display device 100, a screen reproducing a personalized object video to a previous screen, according to an exemplary embodiment.

Referring to a first screen 3810 of FIG. 38, the first display device 100 may receive an input for selecting 'Return' 3800 from a menu list while reproducing a personalized object video on a full screen. For example, the first display device 100 may receive an input selecting an OK button of a remote controller while a pointer is positioned on the 'Return' 3800. Alternatively, the first display device 100 may receive an input selecting a 'Return' button from the remote controller.

Referring to a second screen 3820 of FIG. 38, when a full screen of reproducing the personalized object video is accessed via a panel and input of selecting the 'Return' 3800 is received, the first display device 100 may display the panel including a thumbnail image of a personalized object.

Referring to a third screen 3830 of FIG. 38, when a full screen of reproducing the personalized object video is accessed via a notification window and the input of selecting the 'Return' 3800 is received, the first display device 100 may re-display a real-time broadcast program that was being watched by a user before the personalized object video was reproduced.

Figure 39:
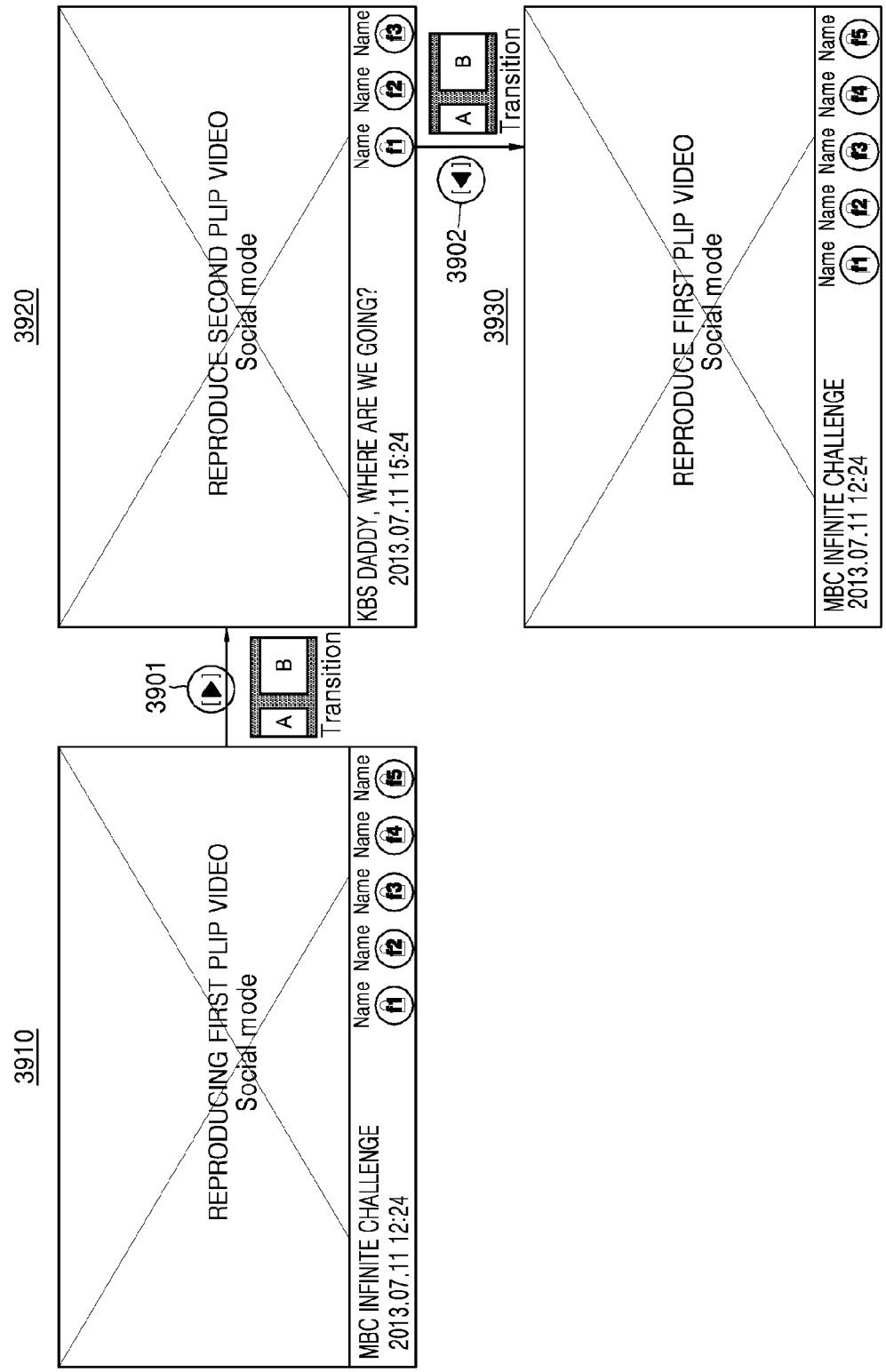
FIG. 39 is a diagram illustrating an example of changing, by a display device, a personalized object video being reproduced on a full screen, according to a user input, according to an exemplary embodiment.

FIG. 39 is a diagram illustrating an example of changing, by the first display device 100, a personalized object video being reproduced on a full screen based on a user input, according to an exemplary embodiment.

Referring to a first screen 3910 of FIG. 39, the first display device 100 may reproduce a first personalized object video on a full screen according to a user input. At this time, the first display device 100 may receive an input for changing a personalized object video. For example, the first display device 100 may receive an input selecting a left or right direction key from a remote controller.

For example, referring to a second screen 3920 of FIG. 39, the first display device 100 may receive an input of selecting a right direction key 3901 while reproducing the first personalized object video. In this example, the first display device 100 may reproduce a second personalized object video after the first personalized object video.

Referring to a third screen 3930 of FIG. 39, the first display device 100 may receive an input of selecting a left direction key 3902 while reproducing the second personalized object video. In this example, the first display device 100 may reproduce the first personalized object video before the second personalized object video.

Figure 40:
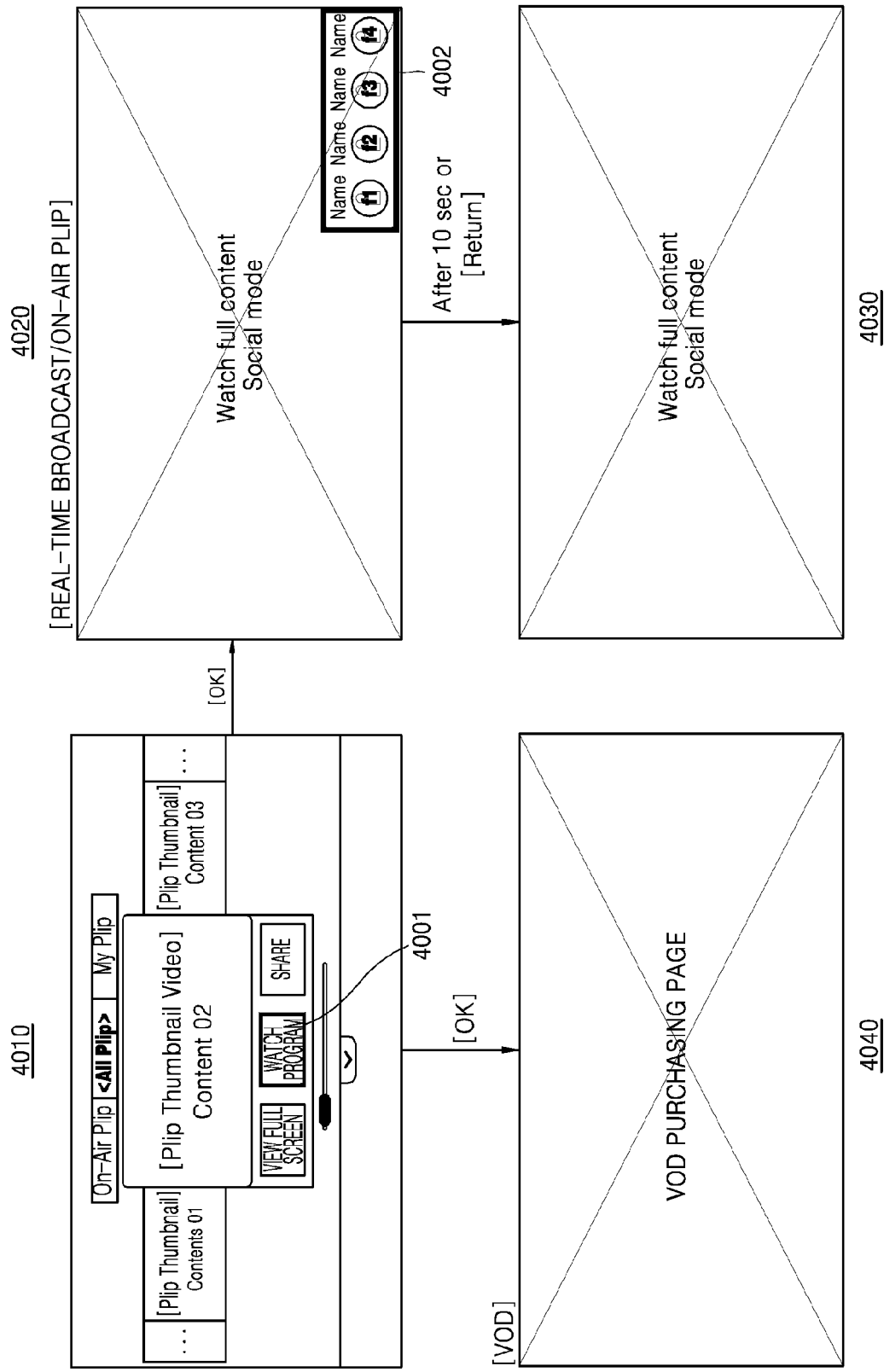
FIG. 40 is a diagram illustrating an example of providing, by a display device, content related to a personalized object, according to an exemplary embodiment.

FIG. 40 is a diagram illustrating an example of providing, by the first display device 100, content related to a personalized object, according to an exemplary embodiment.

Referring to a first screen 4010 of FIG. 40, the first display device 100 may display a menu list at the bottom of a thumbnail image of a second personalized object that is related to second content. In this example, the first display device 100 may receive an input selecting 'Watch Program' 4001 from the menu list. For example, the first display device 100 may receive an input of selecting an 'OK' button from a remote controller while a pointer is positioned on the 'Watch Program' 4001.

Referring to a second screen 4020 of FIG. 40, in an example in which the second content is a real-time broadcast program, the first display device 100 may display a broadcast screen providing the second content (the real-time broadcast program) in response to the input of selecting the 'Watch Program' 4001. In this example, the first display device 100 may also display a list 4002 of social friends who are watching the second content, on a certain region.

Referring to a third screen 4030 of FIG. 40, when a certain period of time (for example, 10 seconds) has passed after the list 4002 is displayed or a user selects a 'Return' button from the remote controller, the first display device 100 may no longer display the list 4002 but display only the second content.

Referring to a fourth screen 4040 of FIG. 40, when the second content is VOD content, the first display device 100 may call and display a purchase page (purchase screen) for purchasing the second content, in response to the input of selecting the 'Watch Program' 4001.

According to an exemplary embodiment, a user may check a plurality of personalized object videos included in a panel to reproduce or purchase content which is related to an interested personalized object video in real-time.

FIG. 41 is a diagram illustrating an example of sharing, by the first display device 100, a personalized object selected by a user with an external display device, according to an exemplary embodiment.

Referring to a first screen 4110 of FIG. 41, the first display device 100 may receive a request for sharing a personalized object. For example, the first display device 100 may display a menu list at the bottom of a thumbnail image of a second personalized object related to second content. Then, the first display device 100 may receive an input selecting an 'OK' button from a remote controller while a pointer is positioned on a 'Share' 4100 option from the menu list.

Referring to a second screen 4120 of FIG. 41, the first display device 100 may provide a personalized object to a display device of a second user (for example, a social friend) connected to a first user based on the request. When there is a plurality of second users, the first display device 100 may provide the personalized object to each of a plurality of display devices corresponding to the plurality of second users. In the present specification, providing a personalized object may refer to a personalized object that is transmitted or authority to access a personalized object being granted.

Figure 42:
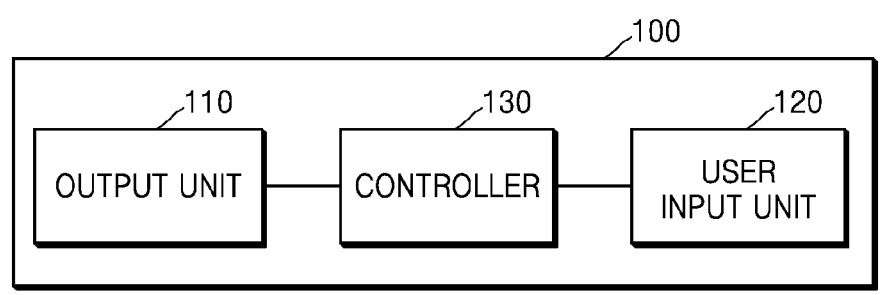
FIGS. 42 and 43 are block diagrams illustrating a display device according to exemplary embodiments.
Figure 43:
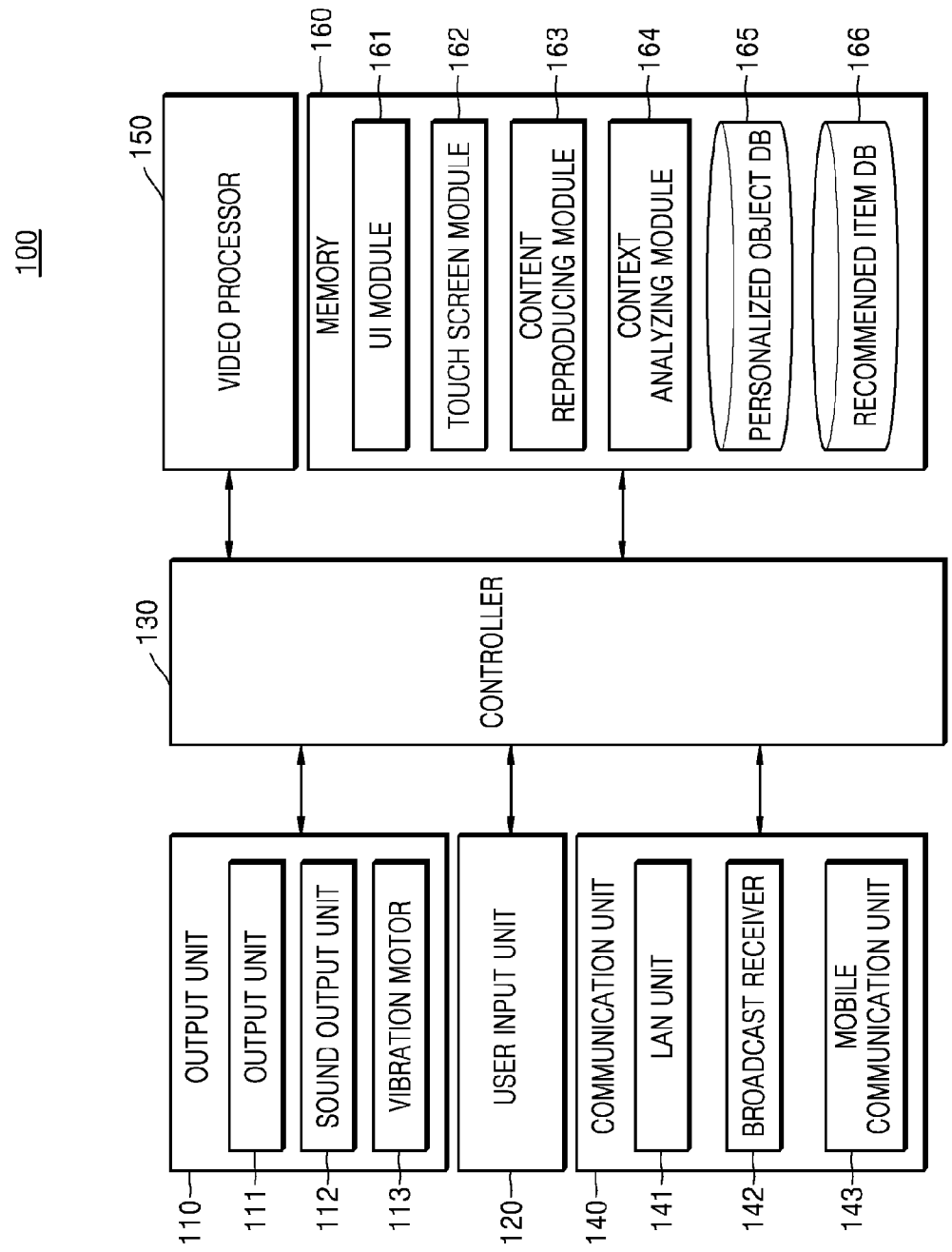

FIGS. 42 and 43 are block diagrams of the first display device 100 according to exemplary embodiments.

As shown in FIG. 42, the first display device 100 may include an output unit 110, a user input unit 120, and a controller 130. However, it should be appreciated that not all of the components shown in FIG. 42 are essential. The first display device 100 may include components more or less than those shown in FIG. 42.

For example, as shown in FIG. 43, the first display device 100 according to an exemplary embodiment may include the output unit 110, the user input unit 120, the controller 130, a communication unit 140, a video processor 150, and a memory 160.

The components of the first display device 100 are further described below.

The output unit 110 is used to output an audio signal, a video signal, a vibration signal, and the like, and may include a display unit 111, a sound output unit 112, and a vibration motor 113.

The display unit 111 may display information processed by the first display device 100. For example, the display unit 111 may display content. The content may be real-time broadcasting content or recorded content.

The display unit 111 may display a panel including a first personalized object. The panel which includes the first personalized object may be displayed on an entire or on a partial region of a screen of the first display device 100.

The display unit 111 may reproduce a first section of content corresponding to the first personalized object. The display unit 111 may display a recommended item corresponding to the first personalized object. For example, the display unit 111 may display the recommended item on a recommendation window.

The display unit 111 may display a notification window indicating that a second personalized object that is generated by the second display device 200 of a second user connected to a first user of the first display device 100 is received. The display unit 111 may display information about the second user who generated the second personalized object corresponding to a second section of the content, which completely or at least partially overlaps the first section of the content. The information about the second user may include at least one of an image of the second user, information about a point of time at which the second personalized object is generated, and information about a number of personalized objects generated by the second user with respect to the content.

The display unit 111 may display an indicator indicating an existence of a panel including a plurality of personalized objects at a pre-set point of time. The pre-set point of time may be a point of time when power is supplied to the first display device 100, a point of time when a zapping input is received from the first user, or a point of time when commercial content starts.

When at least one new personalized object is added to the panel, the display unit 111 may display the at least one new personalized object on the indicator and a corresponding number.

The display unit 111 may display a called video panel. For example, the display unit 111 may display thumbnail images respectively corresponding to the plurality of personalized objects on the panel.

Meanwhile, when the display unit 111 and a touch panel are layered to form a touch screen, the display unit 111 may be used as an input device as well as an output device. For example, the display unit 111 may include at least one of a liquid crystal display (LCD), a thin-film transistor-liquid crystal display (TFT-LCD), an organic light-emitting diode (OLED), a flexible display, a three-dimensional (3D) display, and an electrophoretic display. Also, according to an exemplary embodiment, the first display device 100 may include at least two display units 111.

The sound output unit 112 may output audio data received from the communication unit 140 or stored in the memory 160. Also, the sound output unit 112 may output a sound signal related to a function performed by the first display device 100, for example, reproducing of broadcasting content. The sound output unit 112 may include a speaker or a buzzer.

The vibration motor 113 may output a vibration signal. For example, the vibration motor 113 may output a vibration signal corresponding to an output of audio data or video data, for example, a message reception sound. Also, the vibration motor 113 may output a vibration signal when the touch screen is touched.

The user input unit 120 may be used for the first user to input data to control the first display device 100. For example, the first user may turn on or off the first display device 100, change a channel of the first display device 100, or adjust volume using the user input unit 120.

As a non-limiting example, the user input unit 120 may include a keypad, a dome switch, a touch pad (a contact electrostatic capacity type, a pressure resistance film type, an infrared ray detecting type, a surface ultrasonic wave conducting type, an integral tension measuring type, or a piezo-effect type), a jog wheel, a jog switch, a speech recognition unit, a motion control recognition unit, and the like, but is not limited thereto.

According to an exemplary embodiment, the user input unit 120 may include a remote controller for remotely controlling the first display device 100. The remote controller may be a TV-exclusive remote controller, a combined remote controller, a mobile terminal (for example, a mobile phone, a smart phone, a tablet PC, or an MP3 player) having a remote controlling function, and the like.

The user input unit 120 may include at least one module for receiving data from the first user. For example, the user input unit 120 may include a motion recognizing module, a touch recognizing module, and a voice recognizing module.

The motion recognizing module may recognize a movement of the remote controller or first user, and transmit information about the recognized movement to the controller 130. According to an exemplary embodiment, the motion recognizing module may detect the movement of the remote controller or the first user via a camera. According to an exemplary embodiment, the camera may be a depth camera or a multi-view camera. The depth camera may measure distance information of objects in a scene in real-time using a time-of-flight (TOF) technology, and the measured distance information may be output as a depth video to be used to manufacture a high quality depth map of the scene, together with a binocular camera or a multi-view camera.

The voice recognizing module may recognize vocal commands of the first user using a voice recognizing engine, and transmit the recognized voice to the controller 130.

The user input unit 120 may receive an input from the first user regarding content that is being reproduced. The input from the first user may be an input for generating a personalized object corresponding to a partial section of the content to be reproduced.

The user input unit 120 may receive a request for the panel including the first personalized object. The user input unit 120 may receive an input for selecting the first personalized object included in the panel. Also, the user input unit 120 may receive a request for a recommendation window.

The user input unit 120 may receive a user input for requesting a panel including a plurality of personalized objects. Also, the user input unit 120 may receive a request to share the first personalized object from among the plurality of personalized objects included in the panel.

The controller 130 may be used to control an overall operation of the first display device 100. For example, the controller 130 may execute programs stored in the memory 160, thereby controlling the output unit 110, the user input unit 120, the communication unit 140, and the video processor 150.

According to an exemplary embodiment, the controller 130 may obtain information about the first section of the content, which corresponds to a point of time at which the input from the first user is received, information about an image corresponding to the point of time at which the input from the first user is received, and link information of the content.

For example, the controller 130 may select a first frame displayed at the point of time at which the input from the first user is received, a certain number of second frames displayed before the first frame, and a certain number of third frames displayed after the first frame, as the first section of the content.

Also, according to one or more exemplary embodiments, the controller 130 may extract at least one of the information about the first section, the information about the image, and the link information of the content from attribute information of the content.

The controller 130 may generate the first personalized object of the first user for reproducing the first section of the content using the information about the first section, the information about the image, and the link information of the content.

The controller 130 may obtain ID information of the first user. For example, the controller 130 may receive the ID information of the first user through the user input unit 120 or may visually recognize the first user using the camera. The controller 130 may map and store the ID information of the first user and the first personalized object in the memory 160.

The controller 130 may control the communication unit 140 to transmit a recommended item request including the ID information of the first user to the server 300 and receive a recommended item recommended based on at least one personalized object corresponding to the ID information of the first user from the server 300.

The controller 130 may map and store the first personalized object and the recommended item in the memory 160. The controller 130 may search for an external device and control an external device that is found to display the recommended item corresponding to the first personalized object.

The controller 130 may control the display unit 111 to call the panel including the plurality of personalized objects according to a user input and display the called panel.

The controller 130 may measure an inattentive time of the first user with respect to the content being reproduced using the camera, and display an indicator on the screen in response to the measured inattentive time exceeding a threshold time.

For example, the controller 130 may call and display a broadcast screen providing the content related to the first personalized object, or a purchasing screen of the content related to the first personalized object, according to a user request.

Also, the controller 130 may provide the first personalized object to the second display device 200 of the second user connected to the first user according to a request to share the first personalized object.

The communication unit 140 may include at least one component enabling communication between the first display device 100 and the second display device 200, and/or between the first display device 100 and the server 300. For example, the communication unit 140 may include a LAN unit 141, a broadcast receiver 142, a mobile communication unit 143, and the like.

For example, the .LAN unit 141 may be a Bluetooth communication unit, a BLE communication unit, a near-field communication (NFC)/radio frequency identification (RFID) communication unit, a WLAN (Wi-Fi) communication unit, a ZigBee communication unit, an IrDA communication unit, a Wi-Fi direct (WFD) communication unit, a UWB communication unit, or Ant+ communication unit, but is not limited thereto.

The WLAN (Wi-Fi) may include an infrastructure mode, wherein an access point (AP), such as a wireless router, that transmits a wireless signal transmits and receives data with a plurality of terminals located around the AP, for example, within a uniform radius, and an ad-hoc mode, wherein terminals transmit and receive data in a peer-to-peer (P2P) manner without an AP.

For one in the art, Bluetooth is understood as a standard for wireless communication devices to wirelessly communicate with each other at a short range by using low power. UWB is a wireless technology for transmitting a large amount of digital data through a wide spectrum frequency by using low power in a short distance range.

WFD is a new version of Wi-Fi technology, wherein devices may directly communicate with each other. In other words, devices provided with WFD may communicate with each other and share information without having to use a hotspot, a router, or an AP.

ZigBee is one of IEEE 802.15.4 standards supporting LAN. ZigBee is a technology for 10 to 20 m LAN or ubiquitous computing in wireless networking fields, such as homes or offices.

NFC is a type of RFID, and is a non-contact type NFC that uses a frequency band of 13.56 MHz. Terminals that are within 10 cm may transmit and receive data by using an NFC technology. NFC may include a P2P mode, a reader/write (RAN) mode, and a card emulation mode. Ant+ is a near-field low power consumption wireless communication technology that uses a frequency band of 2.4 GHz.

The broadcast receiver 142 may receive a broadcast signal and/or broadcast-related information through a broadcast channel. The broadcast channel may be a satellite channel or a terrestrial broadcast channel. The broadcast receiver 142 may receive broadcasting content and additional information (for example, electronic program guide (EPG), related application information, related content information, or address information) related to the broadcasting content.

The mobile communication unit 143 may transmit and receive a wireless signal to and from at least one of a base station, an external terminal, and a server, by using a mobile communication network. Here, the wireless signal may include data in any format according to transmission and reception of a voice call signal, an image call signal, or a text/multimedia message.

The communication unit 140 may transmit the first personalized object to the server 300 connected to the first display device 100. The communication unit 140 may receive the recommended item related to the first personalized object from the server 300. For example, the communication unit 140 may transmit the recommended item request including the ID information of the first user to the server 300, and receive the recommended item recommended based on at least one personalized object corresponding to the ID information of the first user from the server 300.

The communication unit 140 may receive the second personalized object generated by the second display device 200 of the second user that is connected to the first user, from the server 300. The communication unit 140 may receive information about the second user who generated the second personalized object corresponding to the second section of the content. Here, the second section of content may entirely or partially overlap the first section of the content, from the server 300. The communication unit 140 may receive a combined object obtained by combining the first personalized object and the second personalized object, from the server 300.

When a number of personalized objects that are generated by a plurality of display devices with respect to each of the first section and the second section is equal to or higher than a pre-set number, the communication unit 140 may receive a highlighted object obtained by combining the first personalized objects corresponding to the first section and the second personalized objects corresponding to the second section, from the server 300.

When a request (for example, a plip input) for generating the first personalized object is received from the first user, the video processor 150 may generate a thumbnail image corresponding to the first personalized object using a scene displayed on the screen at a point of time when the request is received.

The memory 160 may store a program for processes of the controller 130, or may store input and/or output data, such as a personalized object, a recommended item, a combined object, a highlighted object, and information about content.

The memory 160 may include at least one of a flash memory type storage medium, a hard disk type storage medium, a multimedia card micro type storage medium, a card type memory, such as a secure digital (SD) card or extreme digital (XD) card, a random access memory (RAM), a static RAM (SRAM), a read-only memory (ROM), an electrically erasable programmable ROM (EEPROM), a programmable ROM (PROM), a magnetic memory, a magnetic disk, and an optical disk. Also, the first display device 100 may operate a web storage server or a cloud server that performs a storage function of the memory 160, for example, on the Internet.

Programs stored in the memory 160 may be classified into a plurality of modules according to functions, for example, into a UI module 161, a touch screen module 162, a content reproducing module 163, a context analyzing module 164, and the like.

The UI module 161 may provide a UI or a GUI that is specialized according to applications. The touch screen module 162 may detect a touch gesture on the touch screen, and transmit information about the touch gesture to the controller 130. In some examples, the touch screen module 162 may be configured as a separate controller (hardware).

Various sensors may be provided inside or near the touch screen so as to detect a touch or a proximity touch on the touch screen. An example of the sensor for detecting the touch includes a touch sensor. The touch sensor detects a touch on a certain object at a degree felt by a person. The touch sensor may detect various types of information, for example, roughness of a contact surface, hardness of a contact object, and a temperature of a contact point.

Examples of the touch gesture may include a tap, a touch and hold, a double tap, a drag, panning, a flick, a drag and drop, and a swipe.

The content reproducing module 163 may reproduce certain content through the output unit 110. For example, when a pointer is positioned on a thumbnail image of the first personalized object from among a plurality of thumbnails, the content reproducing module 163 may reproduce the first section of the content, which corresponds to the first personalized object. In this example, the content reproducing module 163 may reproduce the first section of the content, which corresponds to the first personalized object, on a region where the thumbnail image of the first personalized object is displayed or an entire region of the screen.

The context analyzing module 164 may analyze a context based on event information collected through a sensor (not shown). For example, the context analyzing module 164 may analyze environment information of the first display device 100, status information of the first user, and status information of the first display device 100.

Figure 44:
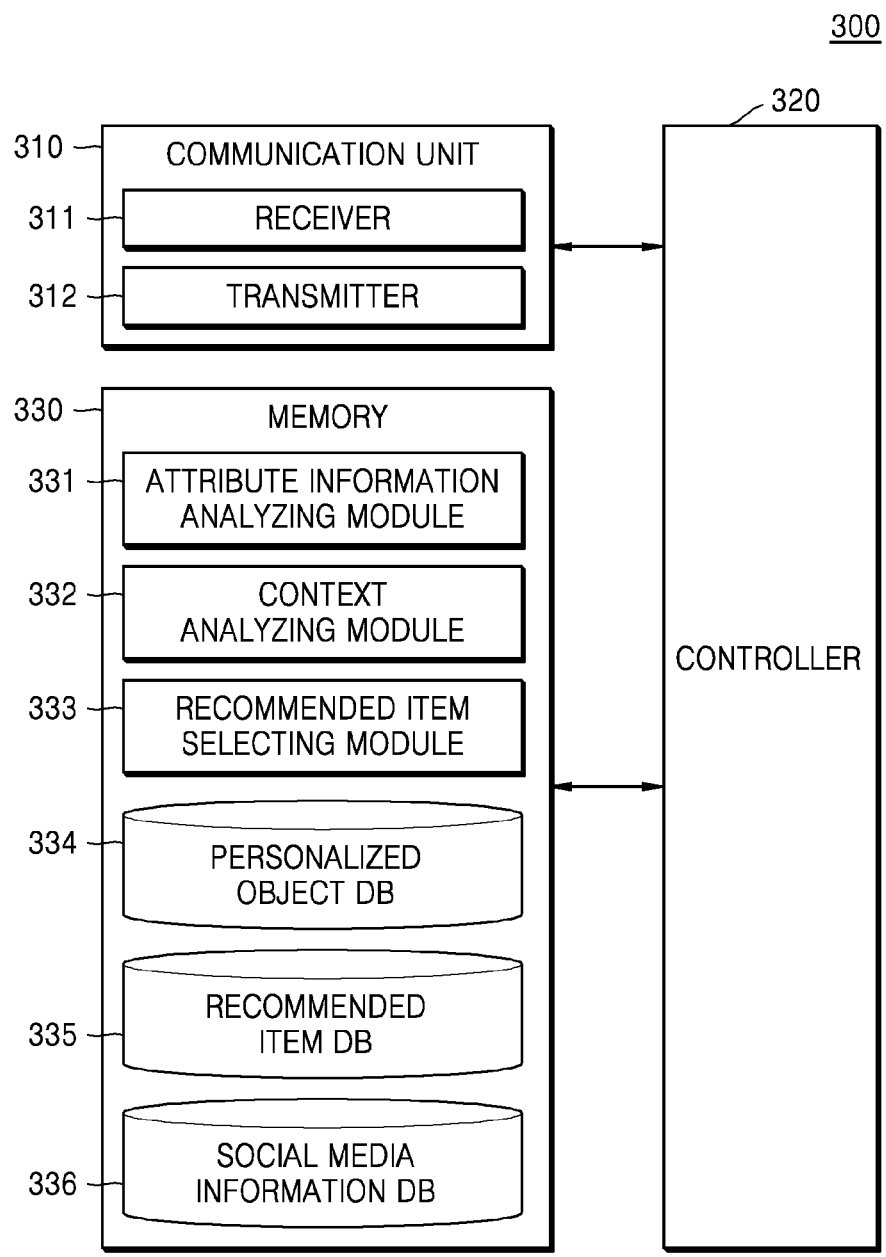
FIG. 44 is a block diagram illustrating a server according to an exemplary embodiment.

FIG. 44 is a block diagram of the server 300 according to an exemplary embodiment.

As shown in FIG. 44, the server 300 may include a communication unit 310, a controller 320, and a memory 330. However, not all components shown in FIG. 44 are essential. For example, the server 300 may include more or less components than those shown in FIG. 44.

The components of the server 300 are now described in detail.

The communication unit 310 may include at least one component that enables communication between the server 300 and the first display device 100 or between the server 300 and the second display device 200. The communication unit 310 may include a receiver 311 and a transmitter 312.

The receiver 311 may receive a first personalized object of a first user, which corresponds to a first section of content, from the first display device 100. The receiver 311 may receive a second personalized object of a second user, which corresponds to a second section of the content, from the second display device 200. The content may be simultaneously reproduced by the first and second display devices 100 and 200.

The receiver 311 may receive at least one first personalized object corresponding to the first section of the content that is being reproduced by a plurality of display devices, and at least one second personalized object corresponding to the second section of the content, from the plurality of display devices.

The transmitter 312 may transmit a recommended item corresponding to the first personalized object. For example, the recommended item may be recommended content, a recommended service, or a recommended application, but is not limited thereto.

When the first and second users requested the first and second display devices 100 and 200 to generate the first and second personalized objects regarding the first and second sections that entirely or partially overlap each other, respectively, the transmitter 312 may transmit information about the first user to the second display device 200 and transmit information about the second user to the first display device 100. The information about the first user may include at least one of ID information of the first user, information about a point of time at which the first personalized object is generated, and information about a number of personalized objects generated by the first display device 100 regarding the content. The information about the second user may include at least one of ID information of the second user, information about a point of time at which the second personalized object is generated, and information about a number of personalized objects generated by the second display device 200 regarding the content.

The transmitter 312 may transmit a combined object obtained by combining the first personalized object and the second personalized object, which are generated by the first and second users about the same content, to at least one of the first and second display devices 100 and 200.

The transmitter 312 may provide a highlighted object obtained by combining a plurality of personalized objects corresponding to sections, wherein interests of viewers are higher than a pre-set value, to at least one of a plurality of display devices.

The controller 320 may be used to control the overall operations of the server 300. For example, the controller 320 according to an exemplary embodiment may execute at least one program stored in the memory 330 to select a recommended item corresponding to a personalized object. Also, the controller 320 may select a recommended item for the first user based on the first personalized object.

The controller 320 may determine a similarity between the first section corresponding to the first personalized object and the second section corresponding to the second personalized object. For example, the controller 320 may determine whether the first and second sections overlap each other.

When the first and second sections partially or entirely overlap each other, the controller 320 may control the transmitter 312 to transmit the information about the first user to the second display device 200 and transmit the information about the second user to the first display device 100.

The controller 320 may analyze a relationship between the first and second users. For example, the controller 320 may determine whether the ID information of the first user and the ID information of the second user are connected to each other. When the first and second users are social friends, the controller 320 may generate a combined object by combining the first and second personalized objects.

The controller 320 may determine whether the number of the first personalized objects and the number of the second personalized objects are each equal to or higher than a pre-set number. When the numbers of the first and second personalized objects are each equal to or higher than the pre-set number, the controller 320 may generate a highlighted object including the first personalized objects corresponding to the first section and the second personalized objects corresponding to the second section.

The memory 330 may store a program for processes of the controller 320, and may store input or output data. For example, the server 300 may establish a personalized object DB 334, a recommended item DB 335, and a social media information DB 336. The personalized object DB 334 may store personalized objects generated according to a user. The recommended item DB 335 may store a combined object and highlighted object. The social media information DB 336 may store information about social friends of users.

Programs stored in the memory 330 may be classified into a plurality of modules based on functions. For example, the programs may be classified into an attribute information analyzing module 331, a context analyzing module 332, and a recommended item selecting module 333.

In this example, the attribute information analyzing module 331 may analyze information about the first and second personalized objects received from the first and second display devices 100 and 200 in a form of metadata.

The context analyzing module 332 may analyze a context by using event information received from the first or second display device 100 or 200.

The recommended item selecting module 333 may select at least one recommended item based on information included in a personalized object. For example, the recommended item selecting module 333 may select at least one recommended item based on information about the first section included in the first personalized object. Alternatively, the recommended item selecting module 333 may select at least one recommended item based on hardware information and/or software information of the first display device 100.

In some examples, the recommended item selecting module 333 according to an exemplary embodiment may select at least one recommended item by further considering at least one of information about a time when the first display device 100 requested for a recommended item, status information of the first user, and recommendation condition information.

According to one or more exemplary embodiments, the first display device 100 may generate and provide a personalized object regarding a section of interest of a user such that the user may quickly and simply record the section of interest while viewing content.

According to one or more exemplary embodiments, the server 300 may select a recommended item based on a personalized object such that the first display device 100 may provide the recommended item, to which interests of a user are accurately reflected, to the user.

The methods described above may be recorded on a computer readable recording medium and may be implemented in computer programs executed by using various computers. The computer readable recording medium may include at least one of a program command, a data file, and a data structure. The program commands recorded in the computer readable recording medium may be specially designed or well known to one of ordinary skill in the computer software field. Examples of the computer readable recording medium include read-only memory (ROM), random-access memory (RAM), CD-ROMs, magnetic tapes, floppy disks, optical data storage devices, etc. Examples of the computer command include mechanical codes prepared by a compiler, and high-level languages executable by a computer by using an interpreter.

While one or more exemplary embodiments have been described with reference to the figures, it will be understood by those of ordinary skill in the art that various changes in form and details may be made therein without departing from the spirit and scope as defined by the following claims.

What is claimed is:

1. A method of a display device for providing a personalized object, the method comprising:
   reproducing content;
   receiving an input from a first user selecting a first section of the content when the first section is reproduced;
   generating a first personalized object corresponding to the selected first section based on information about the selected first section, link information of the content, and information about an image corresponding to the content;
   receiving, from a server, a second personalized object generated by a display device of a second user in response to an input from the second user selecting a second section of the content when the second section is reproduced, the second personalized object corresponding to the selected second section of the content; and
   in response to determining that the second section selected by the input from the second user received when the second section is reproduced overlaps the at least a portion of the first section selected by the input from the first user received when the first section is reproduced, receiving information about the second user from the server and displaying the information about the second user among a displayed list of users watching the same content, by adding a visual indicator to the information about the second user.

2. The method of claim 1, wherein the information about the selected first section comprises at least one of information about a frame included in the selected first section, time information defining the selected first section, and additional information related to the selected first section.

3. The method of claim 1, wherein the receiving of the input from the first user comprises receiving an input from the first user selecting the first section comprising a first frame that is displayed at a point in time at which the input from the first user is received, a number of second frames that are displayed before the first frame, and a number of third frames displayed after the first frame.

4. The method of claim 1, wherein the generating of the first personalized object comprises extracting at least one of the information about the selected first section, the link information of the content, and the information about the image, from attribute information of the content.

5. The method of claim 1, further comprising:
obtaining identification (ID) information of the first user; and
mapping and storing the ID information of the first user and the first personalized object.

6. The method of claim 1, further comprising transmitting the first personalized object to the server that is connected to the display device.

7. The method of claim 6, further comprising:
receiving a recommended item related to the first personalized object from the server; and
mapping and storing the first personalized object and the received recommended item.

8. The method of claim 1, further comprising:
displaying a notification window indicating that the second personalized object is received, in response to receiving the second personalized object.

9. The method of claim 1, further comprising:
displaying a panel comprising a plurality of personalized objects;
receiving an input for selecting the first personalized object from among the plurality of personalized objects included in the panel; and
reproducing the selected first section based on the input for selecting the first personalized object.

10. The method of claim 9, wherein the displaying of the panel comprises:
displaying an indicator indicating an existence of the panel on a partial region of a screen; and
calling and displaying the panel on the screen based on an input for displaying the panel.

11. The method of claim 9, wherein the panel comprises at least one of a first tab providing a list of personalized objects related to a broadcast program being reproduced in the display device, a second tab providing a list of personalized objects generated by the first user, and a third tab providing a list of personalized objects generated by the second user.

12. The method of claim 9, wherein the displaying of the panel comprises displaying thumbnail images on the panel that respectively correspond to the plurality of personalized objects.

13. The method of claim 12, wherein the reproducing of the selected first section comprises, in response to a pointer being positioned on a thumbnail image of the first personalized object from among the thumbnail images, reproducing the selected first section in a region in which the thumbnail image of the first personalized object is displayed.

14. The method of claim 9, wherein the reproducing of the selected first section comprises:
extracting a recommended item corresponding to the first personalized object; and
displaying the extracted recommended item on the panel.

15. A display device comprising at least one hardware processor to implement:
an output unit configured to reproduce content;
a user input unit configured to receive an input from a first user for selecting a first section of the content when the first section is reproduced;
a controller configured to generate a first personalized object corresponding to the selected first section, based on information about the selected first section, link information of the content, and information about an image corresponding to the content; and
a communication unit configured to receive, from a server, a second personalized object generated by a display device of a second user in response to an input from the second user selecting a second section of the content when the second section is reproduced, the second personalized object corresponding to the selected second section of the content,
wherein the controller is configured to, in response to determining that the second section selected by the input from the second user received when the second section is reproduced overlaps the at least a portion of the first section selected by the input from the first user received when the first section is reproduced, receive, through the communication unit, information about the second user from the server and control the output unit to output the information about the second user among a displayed list of users watching the same content, by adding a visual indicator to the information about the second user.

16. A non-transitory computer-readable medium having recorded thereon a program that is executable by a computer to perform the method of claim 1.

* * * * *